United States Patent [19]

Spencer et al.

[11] Patent Number: 5,603,021
[45] Date of Patent: Feb. 11, 1997

[54] METHODS FOR COMPOSING FORMULAS IN AN ELECTRONIC SPREADSHEET SYSTEM

[75] Inventors: Percy L. Spencer, Scotts Valley; Steven R. Boye, Los Gatos; Max E. Montgomery, Santa Cruz; Michael J. Watson, Scotts Valley, all of Calif.

[73] Assignee: Borland International, Inc., Scotts Valley, Calif.

[21] Appl. No.: 300,813

[22] Filed: Sep. 2, 1994

[51] Int. Cl.⁶ .................................................. G06F 17/30
[52] U.S. Cl. ............................................. 345/604; 345/326
[58] Field of Search ..................................... 395/600, 650, 395/700, 500, 155, 157, 159; 364/490

[56] References Cited

U.S. PATENT DOCUMENTS

| | | | |
|---|---|---|---|
| 4,459,678 | 7/1984 | McCaskill et al. | 364/900 |
| 4,622,013 | 11/1986 | Cerchio | 434/118 |
| 4,648,062 | 3/1987 | Johnson et al. | 395/155 |
| 4,789,962 | 12/1988 | Berry et al. | 395/156 |
| 4,806,919 | 2/1989 | Nakayama et al. | 340/721 |
| 4,890,257 | 12/1989 | Anthias et al. | 364/900 |
| 4,899,276 | 2/1990 | Stadler | 345/113 |
| 4,905,138 | 2/1990 | Bourne | 395/650 |
| 4,964,077 | 10/1990 | Eisen et al. | 395/161 |
| 4,970,678 | 11/1990 | Sladowski et al. | 395/155 |
| 4,972,328 | 11/1990 | Wu et al. | 364/513 |
| 4,992,972 | 2/1991 | Brooks et al. | 395/155 |
| 5,029,113 | 7/1991 | Miyoshi et al. | 395/161 |
| 5,040,131 | 8/1991 | Torres | 364/521 |
| 5,123,087 | 6/1992 | Newell et al. | 395/155 |
| 5,146,583 | 9/1992 | Matsunaka et al. | 395/500 |
| 5,155,806 | 10/1992 | Hoeber et al. | 395/157 |
| 5,157,768 | 10/1992 | Hoeber et al. | 395/157 |
| 5,175,814 | 12/1992 | Anick et al. | 395/161 |
| 5,179,654 | 1/1993 | Richards et al. | 395/157 |
| 5,191,646 | 3/1993 | Naito et al. | 395/161 |
| 5,317,688 | 5/1994 | Watson et al. | 395/161 |
| 5,335,345 | 8/1994 | Frieder et al. | 395/600 |
| 5,408,660 | 8/1995 | Kitadate | 395/650 |
| 5,454,106 | 9/1995 | Burns et al. | 395/600 |
| 5,481,473 | 1/1996 | Kim et al. | 364/490 |

OTHER PUBLICATIONS

Family Origins 2.0, Parsons Technology Inc., User's Guide, 1991–1992, pp. 28–29, 80–81.
TI Scheme Language Reference Manual, Texas Instruments Incorporated, Rev. B, Jul. 1987, pp. 2–1 to 2–6 3–5 to 3–8, 4–1 to 4–25, 9–1 9–3, 9–5, 9–7, 9–9, 9–11, 9–13, 9–15 and 9–17.
Pappas et al., Unix–based editors keep syntax in check . . . , PC Week, Oct., 28, 1991, p. 107(3).

(List continued on next page.)

*Primary Examiner*—Thomas G. Black
*Assistant Examiner*—Paul R. Lintz
*Attorney, Agent, or Firm*—John A. Smart

[57] ABSTRACT

An electronic spreadsheet system of the present invention includes a Formula Composer having a preferred interface and methods for assisting a user with composing spreadsheet formulas. The Composer provides the user with simultaneous formula outline and subexpression (text) views of a given formula. Using the formula outline view, the user may isolate a particular portion (subexpression) of a formula for editing. The Formula Composer also provides a Formula Expert, which is displayed by the system upon the user selecting a spreadsheet function in a formula being edited. In addition to providing specific information about the selected spreadsheet function, the Formula Expert provides input fields which are specific for the arguments of the selected function. Moreover, the Formula Expert includes mode expressions or "templates" for assisting users in inputting correct argument information. Using pattern matching technique, the system may employ the templates for eliminating common user input mistakes. Methods are described for synchronizing the various views of the Formula Composer, so that a modification to the formula being edited by the user in one view is automatically and immediately propagated to the other views. In this fashion, all views remain synchronized during formula editing, thus allowing the user to easily switch among the views.

34 Claims, 28 Drawing Sheets

OTHER PUBLICATIONS

Simpson, A., Mastering WordPerfect 5.1 & 5.2 for Windows, Sybex, Inc., 1993, pp. 154–159.

Microsoft Visual C++ "Programming Tools User's Guide", Microsoft Corporation, 1993, p. 57.

Dayton, D. MapInfo adds geographic data analysis to Windows, PC Week, Mar. 1991, p. 35(2).

G. Gagnon, Applications Manager, Version 4.0, PC Magazine, Apr. 27, 1993, p. 151(4).

Kernighan et al., The C Programming Language, 2nd Edition, Prentice Hall 1988, pp. 24–27.

Funk Software, Inc. The Worksheet Utilities, 1987, Chapter 1, pp. 10–20 and Chapter 3, pp. 48–61, 1987.

Innovative Software, Smart Ware: The Smart Spreadsheet with Business Graphics, Ch. 2, pp. 2–1 to 2–12, Ch. 3, pp. 3–1 to 3–3, Ch. 4, pp. 4–1 to 4–16, Autohelp and Help pages, 1987.

Borland International, Inc., Quattro Pro, version 2.0, (1) User's Guide, pp. 12–16, 60–66 and 69–72, and (2) ©Functions and Macros handbook, pp. 3–17, 1990.

Microsoft Corporation, Microsoft Excel User's Guide, Ch 10, pp. 156–159, 1993.

Falkner, Funk Utilities: Lots of Lotus 1-2-3 Tricks, If You've Got the Memory, PC Magazine, Apr., 12, 1988, 38.

Young, X Window Systems: Programming and Applications with xt, Prentice Hall, 1989, Hewlett–Packard, pp. 1–42.

Scheifler et al., X Window System: C Library and Protocol Reference, Digital Press, Digital Equipment Corporation, 1988, pp. 3–117.

Tucker, Programming Languages, McGraw–Hill, 1986, pp. 230–254, 350–381.

Overstreet et al., "Program Maintenance by Safe Transformation", Proceedings of the Conference on Software Maintenance—1988, Scottsdale, Arizona, 24–27 Oct. 1988, pp. 118–123.

Yu et al., "A Fuzzy Visual Language Compiler", Proceedings of the 1990 IEEE Workshop on Visual Languages, Skokie, IL., 4–6 Oct. 1990, pp. 162–167.

Kraft et al., "The Use of Genetic Programming to Build Queries for Information Retrieval", Proceedings of the First IEEE Conference on Evolutionary Computation, Orlando Florida, 27–29 Jun. 1994, pp. 468–473.

Kim et al., "A Temporal Database Management Main Memory Prototype", Proceedings of 1994 IEEE Region 10's Ninth Annual International Conference, Theme: Frontiers of Computer Technology, Singapore, 22–26 Aug. 1994, pp. 391–396.

FIG. 4N

Formula Expert – C5

Cell Value
1028.6125969255

@PMT
— ○ 100000
  ○ / ○ 0.12
       ○ 12
  ○ × ○ 30
       ○ 12

Expression
@ @PMT(100000,0.1  →  ✻

Value
1028.61259

@PMT – Amortized payment
This calculates the monthly payment for a loan given principal, yearly interest rate and yearly term. For example:

Enter the following function to calculate the monthly payment for a 30 year loan of $150,000 at 10.5%:

Pv      @ 100000
Rate (Yearly)  @ 0.12
Nper (Years)   @ 30

○ Periodic Payment   ● Monthly Payment 496
497

FIG. 40

| FUNCTION | MODE | EXPRESSION | OUTLINE |
|---|---|---|---|
| PMT | 1 | @PMT(\1,\2,\3) | @PMT( )<br>□ \1<br>□ \2<br>□ \3 |
| PMT | 2 | @PMT(\1,\2/12,\3*12)  ← 821<br>                    ← 823 | @PMT( )<br>□ \1<br>□ \2/12<br>□ \3*12 |

MODE EXPRESSIONS (TEMPLATES) 820

FIG. 8A

METHODS FOR COMPOSING FORMULAS IN AN ELECTRONIC SPREADSHEET SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of information processing by digital computers and, more particularly, to the entry and processing of information by application programs, particularly electronic spreadsheets.

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to error. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what wordprocessors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visual calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-left hand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the data stored in spreadsheet cells. In this fashion, cell references can serve as variables in an equation, thereby allowing precise mathematical relationships to be defined between cells.

A particular advantage of electronic spreadsheets is the ability to create a multitude of "what if" scenarios from a single data model. This ability stems largely from the spreadsheet formulas, which are the means by which a user tells an electronic spreadsheet system how to manipulate and analyze one's data. After a set of mathematical relationships has been entered into a worksheet, the spread of information can be "recalculated" using different sets of assumptions, with the results of each recalculation appearing relatively quick. Performing this operation manually, with paper and pencil, would require recalculating every relationship in the model with each change made. Expectedly, electronic spreadsheets have quickly displaced their pencil-and-paper counterparts for modeling user information.

The structure and operation of a spreadsheet program, including spreadsheet formulas and "macros," are documented in the technical, trade, and patent literature. For an overview, see e.g., Cobb, D., *Using* 1-2-3, Que Corp., 1985; and Campbell, M., *Quattro Pro* 4.0 *Handbook,* 4th Ed., 1992. The disclosures of each of the foregoing references are hereby incorporated by reference.

Spreadsheet formulas are fundamental to the creation and operation of a spreadsheet data model. During creation of a particular spreadsheet or worksheet model, a user enters formulas in worksheet cells the same way he or she enters values and labels. Typically, a formula begins with a number or with a special character (e.g., +, −, (, @, ., #, or $) to distinguish the entry from raw data. More particularly, formulas are constructed from one or more of four basic components: operators, values, cell references, and @-functions. Each of these will be briefly reviewed.

Operators, which indicate how user data are to be combined and manipulated, typically include well-known operators such as −, +, *, /, and the like. Values are the information (e.g., numeric, logical, or text) which formulas are to act upon. To include a value in a formula, the user simply types it as he or she desires it to appear.

Cell references, on the other hand, allow a user to employ a value in one's current formula that is derived from another cell. For instance, if a cell having an address of B3 contains the value of 10, the formula 5+B3 placed in any other cell of the spreadsheet will evaluate to the result of 15. A referenced cell containing no value (blank) or a label is, depending on implementation, treated as zero or as an error (ERR). Much of the flexibility of electronic spreadsheets stems from this ability to establish relationships via cell references.

Spreadsheet functions or "@-functions" are built-in formulas provided for frequently-used calculations. Some @-functions perform a calculation on a single value, such as @SQRT(n) which calculates the square root of the number n. Other @-functions perform calculations on cell ranges, such as @SUM(B3 . . . B10) which sums the values stored in cells B3 to B10. @-Functions can be used in formulas where one might use a value or cell reference.

As application programs such as spreadsheets have become more developed, many new functions that users may perform on the data have been added. These functions have been added to satisfy the user's need to perform various mathematical, statistical, and financial computations. Each function has a unique name or identifier to invoke the function. Each function often requires a particular number of parameters on which to operate. However, the addition of these new functions has increased the number of functions into the hundreds for a typical spreadsheet. Thus, it has become difficult for users to remember all the different functions, as well as the parameters for each function. Hierarchial nesting of function invocations also adds complexity for the user.

One problem with many programs in the prior art is accurately entering or editing the data for use by the program. This is especially a concern when entering or editing formulas involving a function invocation in a spreadsheet. It is often difficult for the user to keep track of the portion of the formula that is being presently input or edited. The inability to identify the formula components often causes users to introduce errors into a particular cell formula, thus affecting the accuracy of the entire spreadsheet.

While there have been attempts in the prior art to eliminate these problems, existing spreadsheets are only moderately successful in increasing user access to help and other functions. Many spreadsheets presently offer on-line help, however, the information provided is only nominally helpful, and the process of getting to the help information is very difficult. With most on-line systems, the information is often limited to a single line of information and provides the user with only nominal assistance.

With the present trend of employing electronic spreadsheets to model increasingly complex data models, the ability of most users to correctly enter complex formulas using present-day electronic spreadsheet systems has become taxed. Accordingly, there is much interest in improving the process of inputting and editing cell formulas in electronic spreadsheet systems.

SUMMARY OF THE INVENTION

The present invention comprises an electronic spreadsheet system having a preferred interface and methods for assisting a user with composing spreadsheet formulas. The system includes a Formula Composer of the present invention, which is a visual tool for creating, editing, and debugging spreadsheet formulas. In this manner, users may construct spreadsheet formulas in substantially less time and with substantially fewer errors than can be done using prior art systems.

The Formula Composer includes an interface which provides multiple views of a formula, including a Formula Outline Pane, a Subexpression Field, and a Function (Expert) Pane. The Formula Outline Pane may be used by the user to examine the structure of a formula, edit parts of the formula, and trace cell references and block names. The Subexpression Edit Field, on the other hand, provides text editing facilities for editing the formula or a portion thereof. The Function Pane includes components for facilitating input of @-functions and their arguments, including providing specific input fields for the arguments. With these different views, the user can easily choose the correct @-functions and enter all necessary information correctly.

The Formula Outline Pane provides an outline view of the current formula. The outline view includes folder icons to the left of the outline for indicating whether a particular subexpression has been expanded or collapsed. The user can easily expand or collapse portions of a formula by simply clicking on the corresponding folder icon. A Cell Value Field, which is provided in conjunction with the Formula Outline Pane, displays the current results for the formula. If a formula has not been correctly completed by the user (e.g., the user is still editing the formula), the Cell Value Edit Field displays "ERR." In conjunction with this, the outline displays a red question mark icon for indicating that portion of the formula (i.e., subexpression) which is currently incomplete.

On the right hand side of the Formula Composer Dialog, the Subexpression Edit Field displays the entire formula (or selected subexpression) in text format. Next to this field is a Subexpression Value Field which displays the current value for the particular subexpression. The user can enter modifications to the formula directly into the Subexpression Edit Field; these changes, in turn, are immediately propagated to the Formula Outline, which updates accordingly. Alternatively, the user can enter modifications in the Formula Outline Pane, whereupon the changes are immediately reflected in the Subexpression Edit Field. In this fashion, the user can proceed to edit a formula by selecting a particular node or nodes for editing. Since the system isolates the selected subexpression from the rest of the formula, the user can focus on changes to a particular subexpression of the formula.

When a spreadsheet function is selected (e.g., in the Function Outline Pane or the Subexpression Edit Field), the Formula Pane (right-lower side of the Composer Dialog) changes into a Formula Expert. The Formula Expert includes information specific for the selected formula. Moreover, the Formula Expert provides input fields for receiving input for the various arguments of the selected formula. In this manner, the system can construct a custom input field for each argument, including one having a template for assisting the user with specific input. Templates, which are stored in a Mode Library of the system, include information designed to eliminate common user input mistakes. By reducing the task of inputting a series of arguments to the steps of completing specific input fields, the system of the present invention allows the user to easily and correctly input argument information for spreadsheet functions.

Methods are described for maintaining synchronization among the various views provided by the Formula Composer. A change to the formula in the Outline Pane causes the system to update the Subexpression Field and the Function Pane. In a similar manner, a change to the Subexpression Field causes the system to update the Outline Pane and the Function Pane. Finally, a change in the Function Pane, namely user-supplied information entered into input fields, causes the system to update the Outline Pane and the Subexpression Pane.

BRIEF DESCRIPTION OF THE DRAWINGS

FIGS. 4L–N are bitmap screen shots illustrating templates of the present invention for eliminating common input mistakes which users make when inputting argument information into a spreadsheet function.

FIG. 4O is a bitmap screen shot illustrating visual presentation of operator precedence by the Formula Outline Pane.

FIG. 8A is a diagram illustrating mode expressions or "templates" of the present invention for assisting the user with inputting correct argument information.

DETAILED DESCRIPTION OF A PREFERRED EMBODIMENT

The following description will focus on the presently preferred embodiments of the present invention, which are embodied in an electronic spreadsheet system operative in an Intel 80×86/80×87-compatible architecture. The present invention, however, is not limited to any particular environment or any particular application. Instead, those skilled in the art will find that the teachings of the present invention may be advantageously applied to a variety of different architectures, including Motorola 68000 series, PowerPC, Mips, and the like. Therefore, the description of the exemplary embodiments which follows is for purposes of illustration and not limitation.

General System

A. Hardware

Figure 1A:
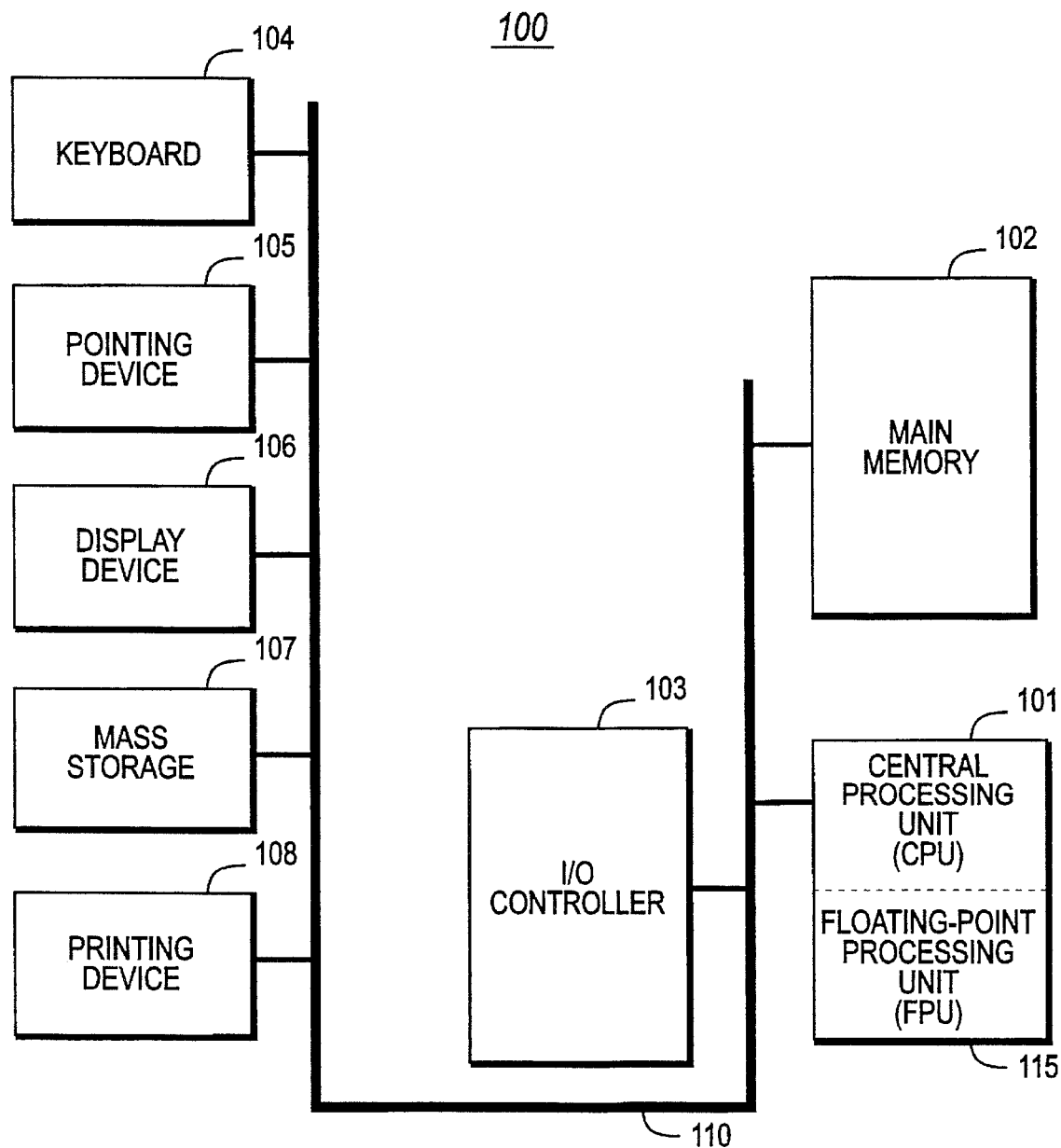
FIG. 1A is a block diagram of a computer system in which the present invention may be embodied.

As shown in FIG. 1A, the present invention may be embodied in a computer system such as the system 100, which includes a central processing unit (CPU) 101, a math coprocessor or floating-point processing unit (FPU) 115, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture.

In a preferred embodiment, the computer system 100 includes an IBM-compatible personal computer, which is available from several vendors (including IBM of Armonk, N.Y.). More particularly, the CPU 101 comprises an Intel 80×86-class microprocessor (e.g., Intel 80386), and the FPU 115 comprises a corresponding Intel 80×87-class math coprocessor (e.g., Intel 80387); both are available from Intel Corporation of Santa Clara, Calif. Compatible microprocessors and coprocessors are available from a variety of vendors, including Advanced Micro Devices (Austin, Tex.) and Cyrix (Richardson, Tex.). Preferably, the CPU 101 includes an on-chip FPU (as shown in FIG. 1A), as is available with an Intel 80486DX-class microprocessor (or later, such as Pentium® class).

B. Software system

1. Overview

Figure 1B:
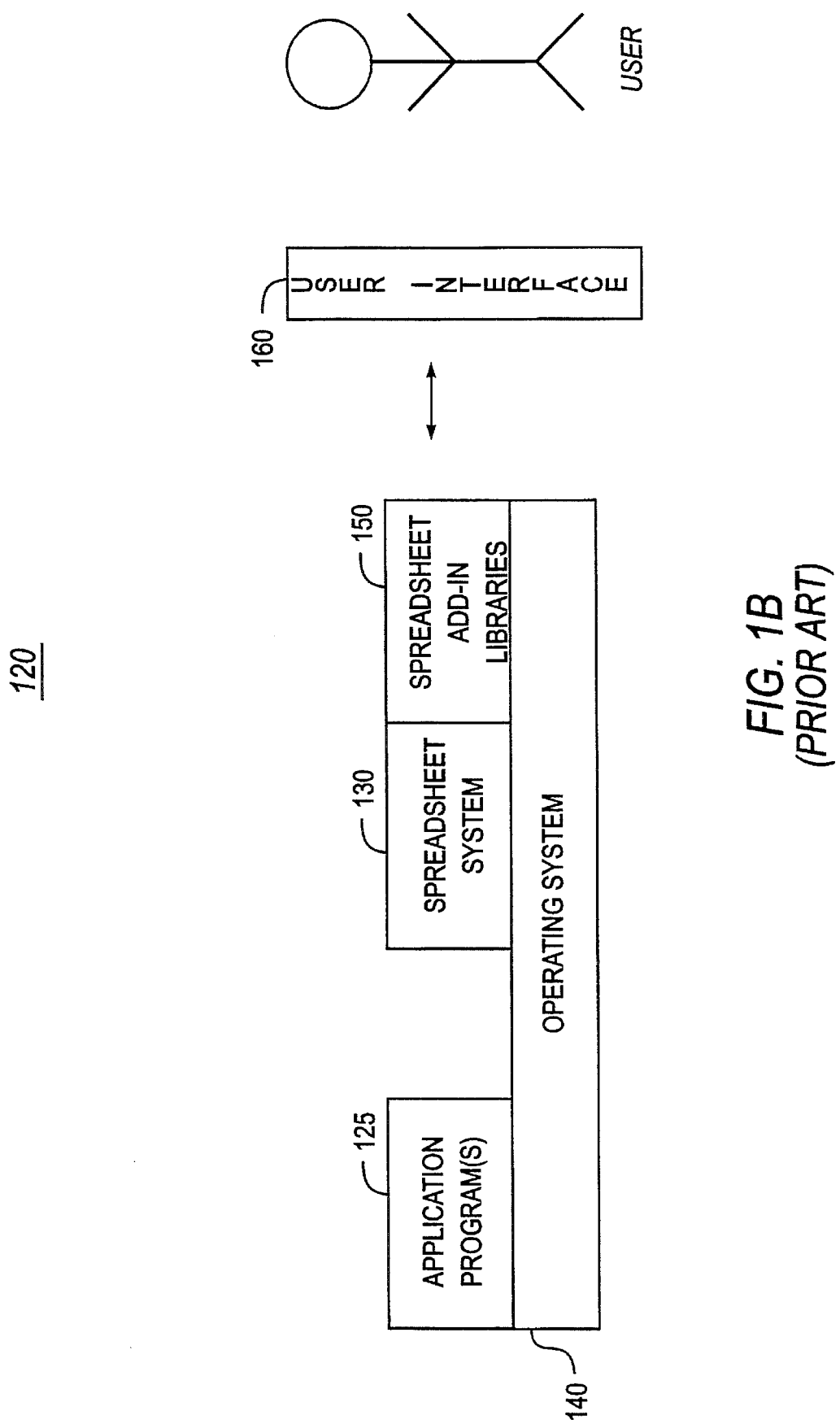
FIG. 1B is a block diagram of a software system of the present invention, which includes operating system, application software, and user interface components.

Illustrated in FIG. 1B, a computer software system 120 is provided for directing the operation of the computer system 100. Software system 120, which is stored in system memory 102 and on disk memory 107, includes a kernel or operating system 140 and an interface 160. One or more application programs, such as application software 125, may be "loaded" (i.e., transferred from storage 107 into memory 102) for execution by the system 100. The system 100 receives user commands and data through user interface 160; these inputs may then be acted upon by the system 100 in accordance with instructions from operating system module 140 and/or application module 125. The interface 160, which may support a character-based and/or preferably a graphical user interface (GUI), also serves to display results, whereupon the user may supply additional inputs or terminate the session. In a preferred embodiment, operating system 140 comprises MS-DOS® operating in conjunction with Microsoft® Windows; both are available from Microsoft of Redmond, Wash. Interface 160, on the other hand, is typically provided by the application programs and spreadsheet system 130, which will now be described.

2. Electronic Spreadsheet

As shown, system 120 also includes a spreadsheet system 130 of the present invention. The spreadsheet system 130 interfaces with the system 100 through the operating system 140. Spreadsheet system 130 may also be operably coupled to one or more spreadsheet add-in libraries 150, which are commercially available.

Figure 1C:
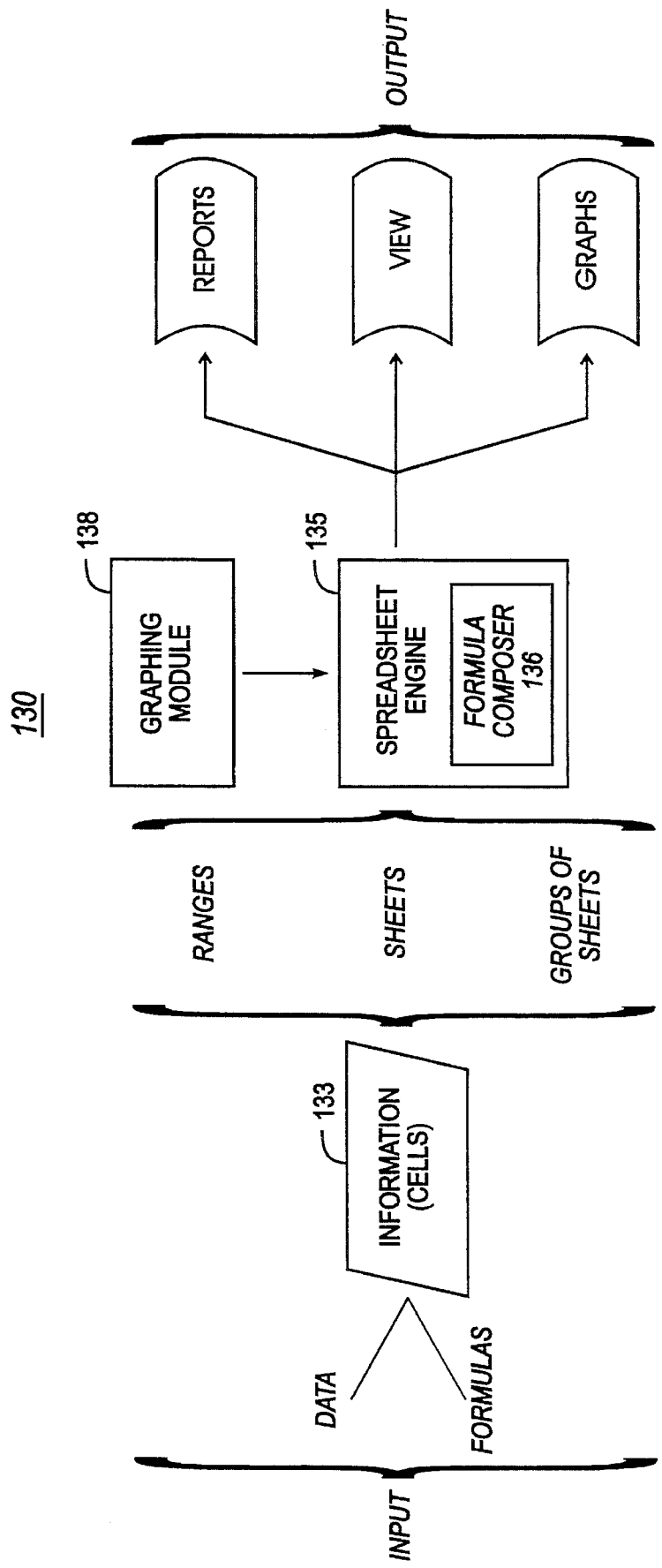
FIG. 1C is a block diagram of an electronic spreadsheet system of the present invention.

The spreadsheet system 130 of the present invention is shown in further detail by a simplified block diagram of FIG. 1C. The system 130 includes a spreadsheet engine or module 135 and a graphing module 138. In operation, the system 130 maintains a matrix or "spread" of information cells 133, each cell being an atomic unit maintained and processed by the module 135. Data and formulas for the cells are received from an input device (e.g., keyboard, mouse, disk, and the like) for storage and processing by the system 130. From the cells, larger groupings, such as ranges (including blocks), sheets (including 2-D spreads), and groups of sheets (including 3-D spreads, linked sheets, and pages of sheets or "notebooks") may be defined. The graphing module 138 provides the system 130 with the capability of displaying the spread of information cells visually, such as in various graphs.

As shown, the spreadsheet engine 135 includes a Formula Composer 136 of the present invention. The Formula Composer 136 processes the user input of various formulas which are to be stored in a spreadsheet. Of particular interest are methods of the Formula Composer for assisting user input of spreadsheet formulas, for increasing the efficiency and accuracy with which spreadsheet formulas may be input into the system 100. Operation of the Formula Composer 136 is described in greater detail hereinbelow.

In a preferred embodiment, the spreadsheet system 130 includes Quattro® Pro for Windows, available from Novell of Provo, Utah. A description of the general features and user operation of system 130 is available in the documentation which accompanies Quattro® Pro for Windows.

3. Notebook interface

Figure 2A:
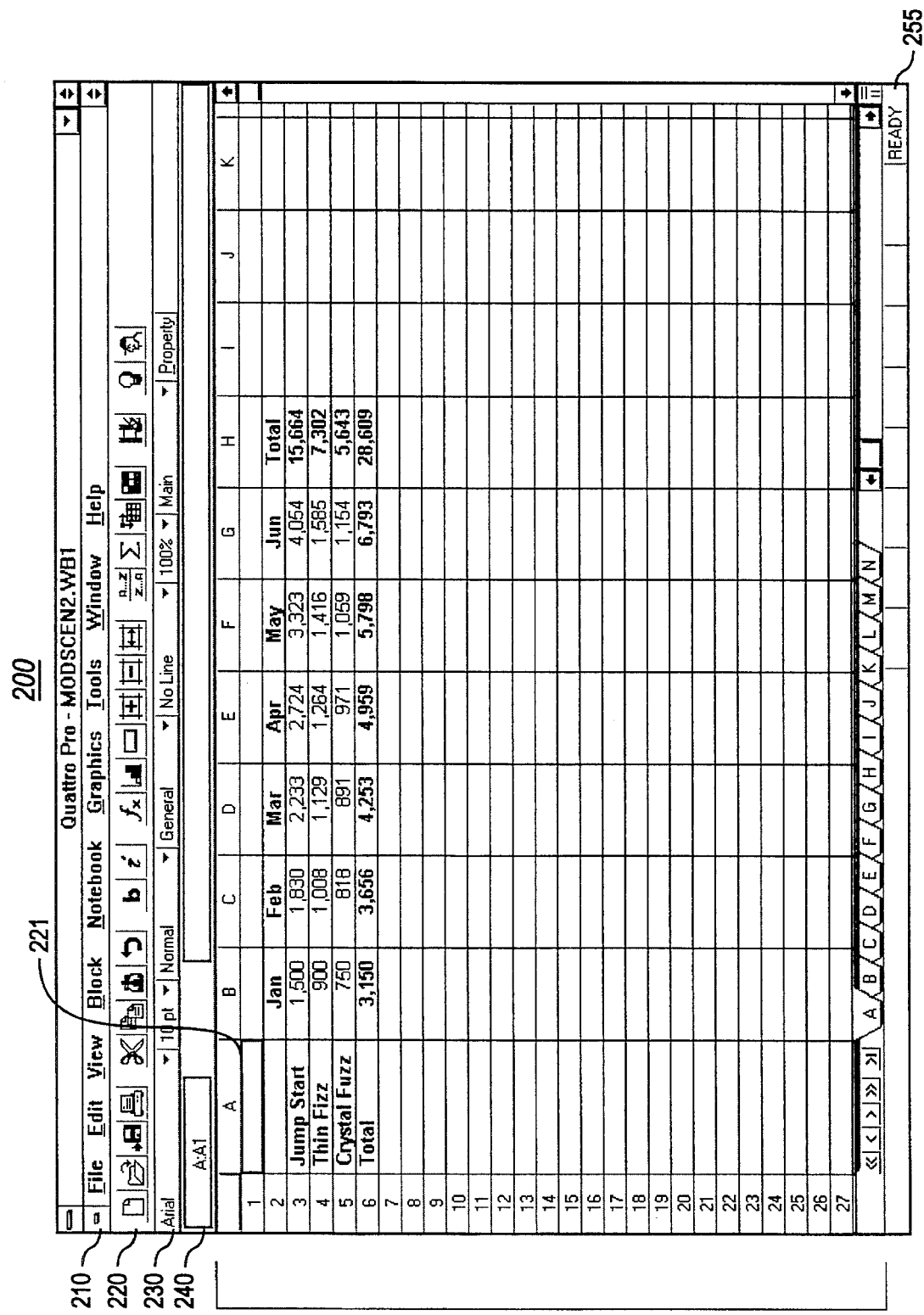
FIG. 2A is a screen bitmap illustrating a spreadsheet notebook interface employed in a preferred embodiment of the present invention; a sample "spreadsheet" has been loaded.

The spreadsheet system 130 includes a preferred spreadsheet notebook interface 200, shown in FIG. 2A, for receiving, processing, and presenting information, including alphanumeric as well as graphic information. Notebook workspace 200 includes a menu bar 210, a toolbar 220, a current cell indicator 221, a property bar 230, an input line 240, a notebook workspace 250, and a status line 255. The menu bar 210 displays and invokes, in response to user inputs, a main level of user commands. Menu 210 also invokes additional pulldown submenus, as is known in windowing applications. Property bar 230 displays and invokes a list of user-settable properties, for screen objects. Input line 221 accepts user commands and information for the entry and editing of cell contents, which may include data, formulas, macros, and the like. Indicator 240 displays an address for the current cursor (i.e., active cell) position. At the status line 255, system 100 displays information about the current state of the workbook; for example, a "READY" indicator means that the system is ready for the user to select another task to be performed.

Figure 2B:
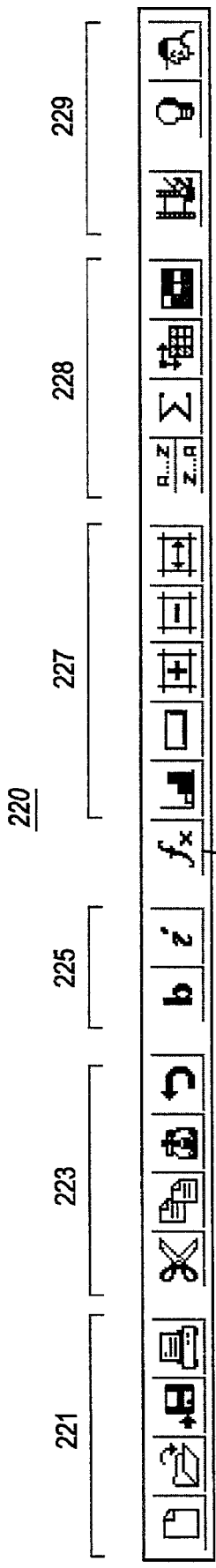
FIG. 2B is a bitmap of a toolbar component of the interface of FIG. 2A.

The toolbar 220, shown in further detail in FIG. 2B, comprises a row or palette of tools which provide a quick way for the user to choose commonly-used menu commands or properties. In an exemplary embodiment, toolbar 220 includes New Notebook, Open Notebook, Save Notebook, and Print buttons 221, Cut, Copy, Paste, Undo/Redo buttons 223, Bold, Italic buttons 225, Formula Composer button 226, Graph, SpeedButton, Insert, Delete, and Fit buttons 227, Auto Sort, Sum, Fill, and Format buttons 228, and Slideshow, Expert, and Coach buttons 229. The functions of these buttons are suggested by their names. For instance, buttons 223 cut, copy, and paste data and objects to and from Windows' clipboard. In a similar fashion, the Graph button or tool creates floating graphs that appear above spreadsheet cells.

The spreadsheet notebook, which provides an interface for entering and displaying information of interest, includes a plurality of spreadsheet pages. Each page, such as page A shown in notebook workspace 250 (of FIG. 2A), may include conventional windowing features and operations, such as moving, resizing, and deleting. In a preferred embodiment, the notebook includes 256 spreadsheet pages with one Graphs page, all of which are saved as a single disk file on the mass storage 107. Workspace 200 may display one or more notebooks, each sized and positioned (e.g., tiled, overlapping, and the like) according to user-specified constraints.

Each spreadsheet page, in turn, includes a 2-D matrix of spreadsheet cells, arranged as a rectangular grid comprising columns and rows. At the intersection of a column with a row is a single cell. A cell is a location where the user can enter data, formulas, and the like. Each cell is identified by an address determined by the column and row that contain it; in other words, the letter and number that make up the address are the cell's coordinates. Each column of cells is identified by a letter. Columns are marked with letters A–Z, then AA–AZ, BA–BZ and the like, up to IA–IV in a preferred embodiment. Each row of cells is identified by a number. Rows are marked with numbers ranging from 1 to 8192, in a preferred embodiment. Thus, for example, the cell in the top left corner is cell A1.

The highlighted rectangle or "cell selector" 221 is provided for indicating a currently active one (i.e., the cell that is currently selected). This is the cell that will be affected by the next action, such as entering a value. The column containing the cell selector appears on the border in reverse video (or in a contrasting color on a color screen); the row containing the cell selector appears in reverse video or a contrasting color, depending on the monitor. The user can move the selector to any cell in the spreadsheet.

To enter information in the spreadsheet, the user typically moves the selector to a desired cell (e.g., with pointing device 105 or keyboard 102) and types in the entry. The characters typed in appear on the input line. When the entry is complete, the user presses Enter or an arrow key (Right arrow, Left arrow, PgUp, or the like). The system 130 writes the value into the current cell, erasing any previous entry. If the user enters the data by pressing an arrow key, the selector moves in the appropriate direction.

Multiple cells may be selected for aggregate operations. In particular, a cell "block" is defined as a rectangular group of cells identified by the cell addresses of two opposite corners—usually the upper left and bottom right cells. In response to user movement signals from the pointing device 105, the cursor may be "dragged" across a range of cells for selecting a block, as is known in the art. Blocks may include contiguous or adjacent cells or ones which are non-contiguous. Once selected, blocks may be used in commands and formulas to act on several cells at once.

Figure 2C:
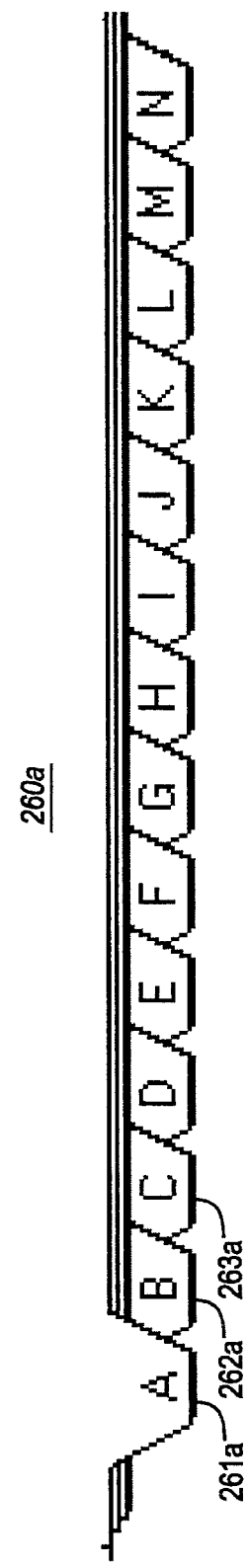
FIG. 2C–D are bitmaps illustrating page identifiers for rapidly accessing and manipulating individual pages of the notebook interface.
Figure 2D:
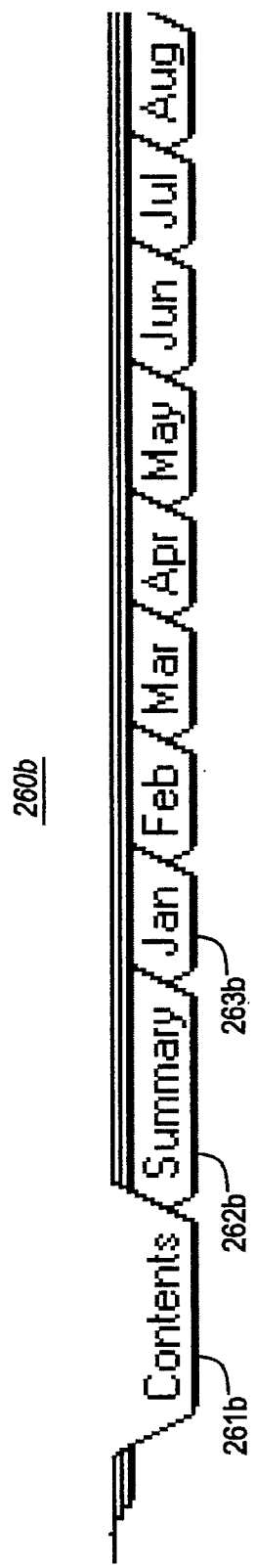

Since a notebook may include a plurality of 2-D spreadsheets or pages, the notebook interface includes an identifier for each page. As shown in FIGS. 2C–D, individual notebook pages are identified by page identifiers 260, preferably located along one edge of a notebook. In a preferred embodiment, each page identifier is in the form of a tab member (e.g., members 261a, 262a, 263a) situated along a bottom edge of the notebook. Each tab member may include representative indicia, such as textual or graphic labels, including user-selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: he or she simply selects the tab corresponding to the page (as one would do when selecting a page from a paper notebook).

A general description of the features and operation of the spreadsheet notebook interface may be found in Quattro® Pro for Windows (*Getting Started, User's Guide* and *Building Spreadsheet Applications*), available from Borland International; additional description may be found in U.S. patent application Ser. No. 07/866,658, commonly owned by the present assignee.

Spreadsheet Formulas

A. Formula basics

In an exemplary embodiment, the system works with three different kinds of formulas: arithmetic formulas, text formulas, and logical formulas. Arithmetic formulas, such as +B3+421.3, calculate numeric values. These are the most commonly used formulas. Text formulas are any formulas that have a textual result. For example, +C4&"Review" enters the text in cell C4 and adds a space and the word Review. Text formulas include those created with string @-functions or an @IF function that results in a text string. Logical formulas are true/false statements concerning values in other cells; for example, +C3<10. The system checks the spreadsheet to see if the statement is true or not. If true, it enters a 1 in the cell; if false, it enters a 0.

Users can use numbers, cell coordinates, or block names for the values in formulas. For example,

+A1–3 subtracts three from the value in cell A1. The result of a formula appears in the cell. The formula appears on the input line when the user selects the cell, and on the status line when the user is editing the entry. Although the user can include spaces between operators and values, the system deletes these when the user completes input of the formula.

A formula generally must begin with one of the following characters: 0 1 2 3 4 5 6 7 8 9 . + – ( @ # $ =. To begin a formula with a letter, such as for a cell address or block name, the formula is preceded with a plus sign so the entry is considered a value, not a label. By default, the system calculates formulas when the user enters them, and recalculates them each time the user changes the data involved.

B. Spreadsheet @-functions

Spreadsheet @-functions are built-in command features that can be used in spreadsheet formulas to perform calculations and return values. Some of the most commonly used @-functions are mathematical @-functions like @SUM and @AVG. @SUM totals the contents of the blocks referenced, and @AVG counts the number of values in the referenced block and returns the average of the values.

@-Functions comprise a function name, argument(s), commas, and parentheses. The name of the @-function, such as @SUM or @AVG, uniquely identifies the function. The arguments comprise the values, blocks, or text strings to be operated on by the function; this is the information required by a given @-function. The comas separate arguments, if multiple arguments are present. Finally, the arguments are surrounded by parentheses. All of these parts and the order in which they are used are called the syntax. Each @-function has its own particular syntax.

Many different categories of @-functions are available in a preferred embodiment, including:

Database @-functions perform analytic calculations on records in a database—to find the average value for a file, for example.

Date and time @-functions calculate date and times, or perform calculations involving business days. For example @NOW returns the current date or time (depending on the numeric format).

Engineering @-functions perform such operations as number conversation, Boolean operations, and calculations involving complex numbers and Bessel functions.

Financial @-functions primarily calculate investments and cash flow, such as annuity and mortgage payments.

Logical @-functions are used mostly in conditional formulas, where the results are based on the validity of a logical expression, such as +A3>0.

Mathematical @-functions are used in mathematical formulas, for example, to determine the trigonometric sine or square root.

Miscellaneous @-functions provide current information. For example, @HOOKUP, @INDEX, and @VLOOKUP return values in a lookup table.

Statistical @-functions perform analytic calculations on a list of values—for example, to find the average in a block of cells.

String @-functions manipulate character or labels—to insert characters in the middle of a string, for example.

Typical examples of @-functions include:

@SUM (A1 ... A4, B1) is equivalent to +A1+A2+A3+A4+B1.

@AVG (A5 ... A8) finds the average of the values in A5 through A8.

@ROUND (A9,2) rounds the value in A9 to two decimal places.

@ROUND (@AVG (A5 ... A8) rounds the average of the values in A5 through A8 to three decimal places.

An @-function formula is a complete command string, including arguments and punctuation. A user enters an @-function formula in a cell just as he or she would enter any other data: by selecting the cell and typing the entry. The @-function appears on the input line. Upon the user pressing "Enter," the result of the @-function appears in the cell. If the result is a numeric value, it becomes a value entry for the cell. If, on the other hand, the result is a string, it becomes a label entry for the cell.

C. @-Function Syntax Rules

Generally, formulas employing @-functions must conform to syntax rules. For instance, the formulas generally must begin with a leading @, +, or =. Also, any required arguments to an @-function must be enclosed in parentheses. Multiple arguments must be separated by a semicolon, or other argument separator (as specified by the implementation). Further, multiple arguments must be entered in a specific order. If an optional argument is specified for an @-function, the user must also specify all preceding optional arguments for the function. If a user fails to follow the specified format for entering an @-function formula, a spreadsheet system will refuse to process the formula further and, instead, display a syntax error message.

In general, users must adhere to the following prescribed format for functions:

@-FUNCTION (Argument1, Argument2, ... )

The type of information required to be provided as arguments depends on the specific @-function. Arguments can be divided into three general types: numeric values, block values, and string values (text). Most arguments require one of these types of values. Some accept a combination or a choice of types. For instance, @SUM and other statistical @-functions accept a "list," which can be a block value (i.e., block coordinates or block name) used alone or with numeric values.

Users can use more than one @-function in a single formula, with one @-function serving as the argument or parameter to another @-function. This is called "nesting" @-functions. Generally, a user can nest as many @-functions as desired, several layers deep. For example, the following calculates the average values in cell block C14 . . . F24, then rounds the average to two decimal places:

@ROUND (@AVG (C14, , F24), 2)

Nested @-functions evaluate from inside out. In the above example, for instance, the @AVG is calculated before the @ROUND.

When formula syntax and arguments are correct, most @-functions and formulas evaluate to a numeric value (including dates) or string value (label or text). If a value cannot be calculated, a spreadsheet "ERR" value is returned, for indicating an error condition. If, on the other hand, information is not available, a spreadsheet "NA" is returned.

Any @-function or other formula that references an ERR or NA cell also returns ERR or NA. The @-functions @ERR and @NA allow users to enter these values directly into cells. If ERR and NA both apply, ERR takes precedence, for instance, ERR+NA=ERR.

Formula Composer

A. Composer overview

Formula Composer 136 is a visual tool for creating, editing, and debugging spreadsheet formulas. One can use the Formula Composer to build a formula from scratch or to edit an existing formula. The Formula Composer 136 includes a Formula Composer Dialog providing multiple views of a formula, including: (1) a Formula Outline Pane to examine the structure of a formula, edit parts of the formula, and trace cell references and block names; (2) a Subexpression Edit Field for text editing of a formula or portion thereof; and (3) a Function Panel to facilitate input of @-functions and their arguments. With these different views, the user can easily choose the right @-functions and enter all necessary information correctly.

Figure 3A:
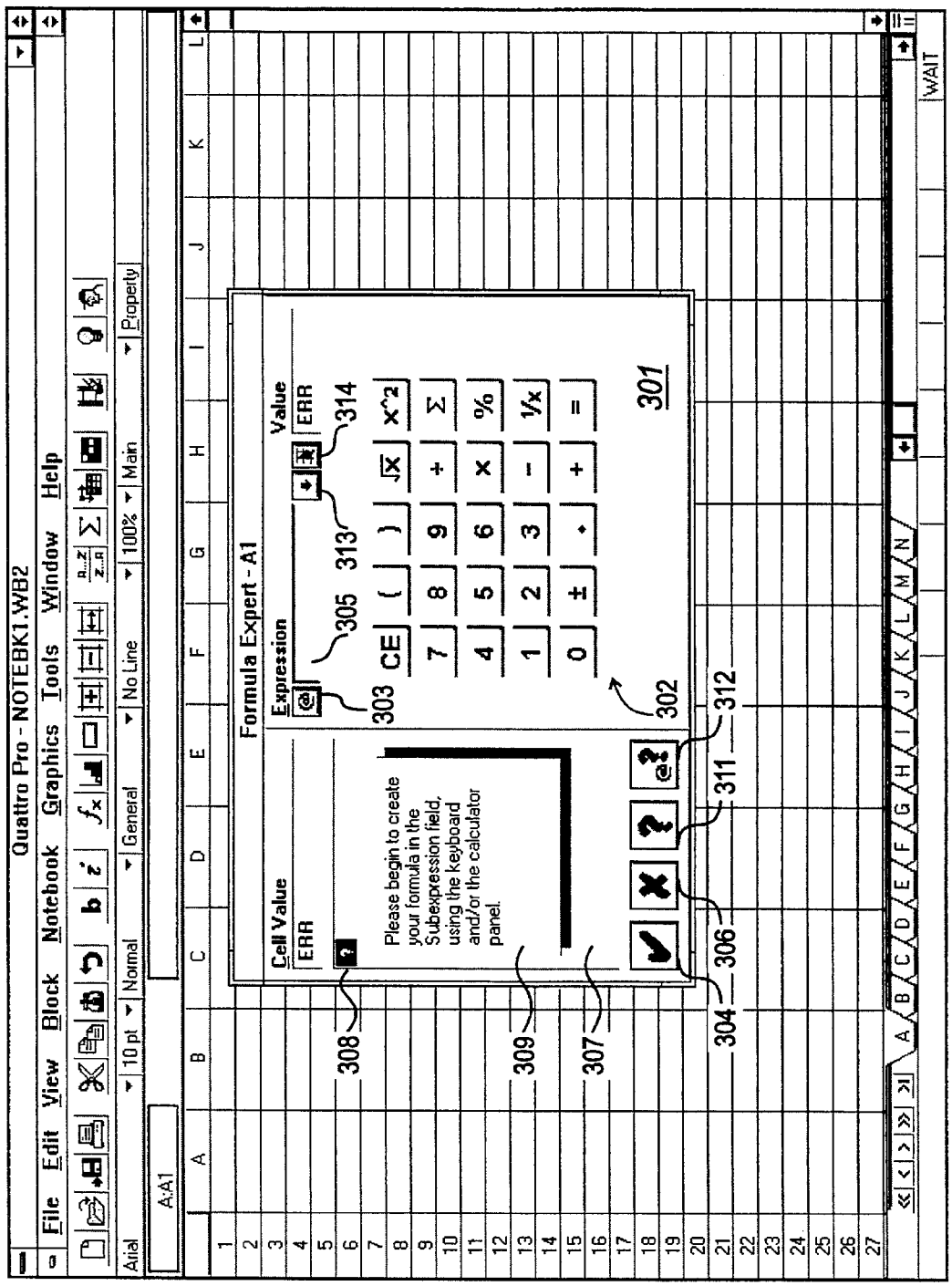
FIGS. 3A–E are bitmap screen shots illustrating a preferred interface for the Formula Composer and its use by the user.

FIGS. 3A–D illustrate the general features of the Formula Composer. The Formula Composer Dialog 301, shown in FIG. 3A, is launched by the user selecting (clicking) the Formula Composer button on the main tool bar (i.e., button 226 on toolbar 220). If the cell selector lies at a cell that does not contains a formula, the Composer will create a new formula. In FIG. 3A, for instance, the user has selected blank cell A:A1 and clicked the Formula Composer button. If the selected cell already contains a formula, the Composer will display it for editing.

The Formula Composer Dialog 301 provides specific areas corresponding to the above-mentioned "views": Formula Outline Pane 307, Subexpression Edit Field 305, and Formula Pane 302. The user employs these views for creating and revising formulas. In the Formula Outline Pane 307, the user can instruct the system to select part of a formula, expand or collapse a formula outline, or go to cells referenced by the formula. The Pane 307 can be used to quickly add new @-functions to the formula. Since Dialog 301 of FIG. 3A was invoked without an existing formula, Formula Outline Pane 307 displays a Placeholder 308 (red question mark icon) and Help text 309. Similarly, since no function is active, the Formula Pane defaults to displaying a Formula Calculator 302, which the user may use to perform calculations within the formula.

To revise a formula, the user can simply start typing in the Subexpression Edit Field 305. The user can create or revise formulas, or parts of a formula, directly in this field. A "subexpression" is any isolated part of a formula. To edit the entire formula, the user selects the first subexpression in the Formula Outline Pane 307. To edit part of a formula, the user selects any other subexpression in the outline.

Buttons 313, 314, which appear to the right of the Subexpression Field, assist the user with editing a formula. Drop-down Button 313 allows the user to insert a block name in the formula, by clicking the down arrow and selecting a block name from a drop-down list; similar drop-down range buttons are provided for the Formula Input Fields. Users will often employ range names in spreadsheet formulas. When entering a formula into an input field, however, users have not had ready access to range names with prior art systems. By coupling the drop-down range name list with the Subexpression Edit Field and Formula Input Fields, the Formula Composer of the present invention allows users to instantly access available range names. To enter a particular range, the user need only select from the list.

Point button 314 allows the user to insert a cell or block reference. The user clicking the Point button invokes a point mode whereby the Formula Composer dialog is temporarily removed from view while the user points to a cell or range of cells which are to serve as input. After the user has selected the cell or cells, the Formula Composer dialog returns with the selected cell or cells inserted as input.

Figure 3B:
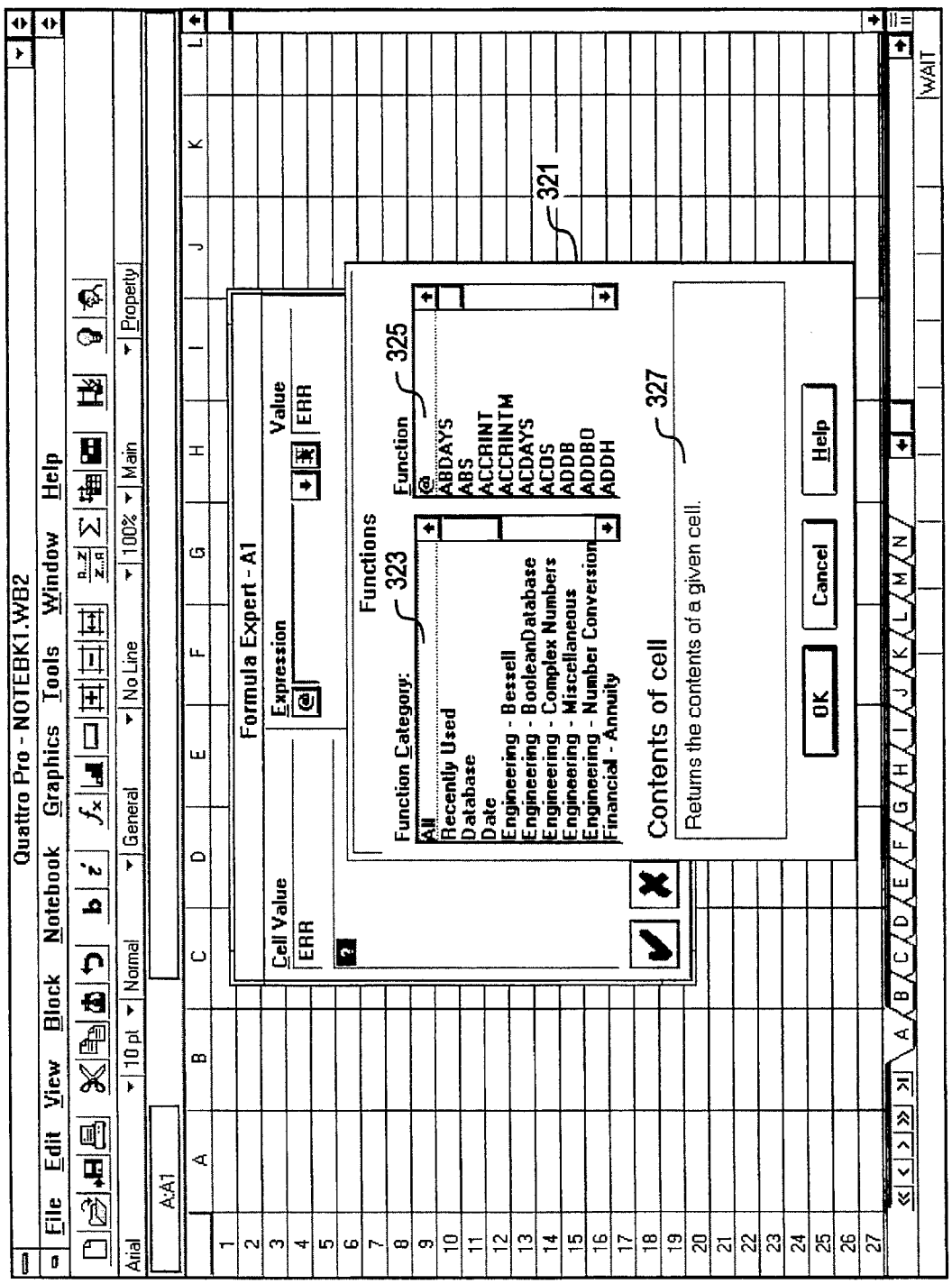
Figure 3C:
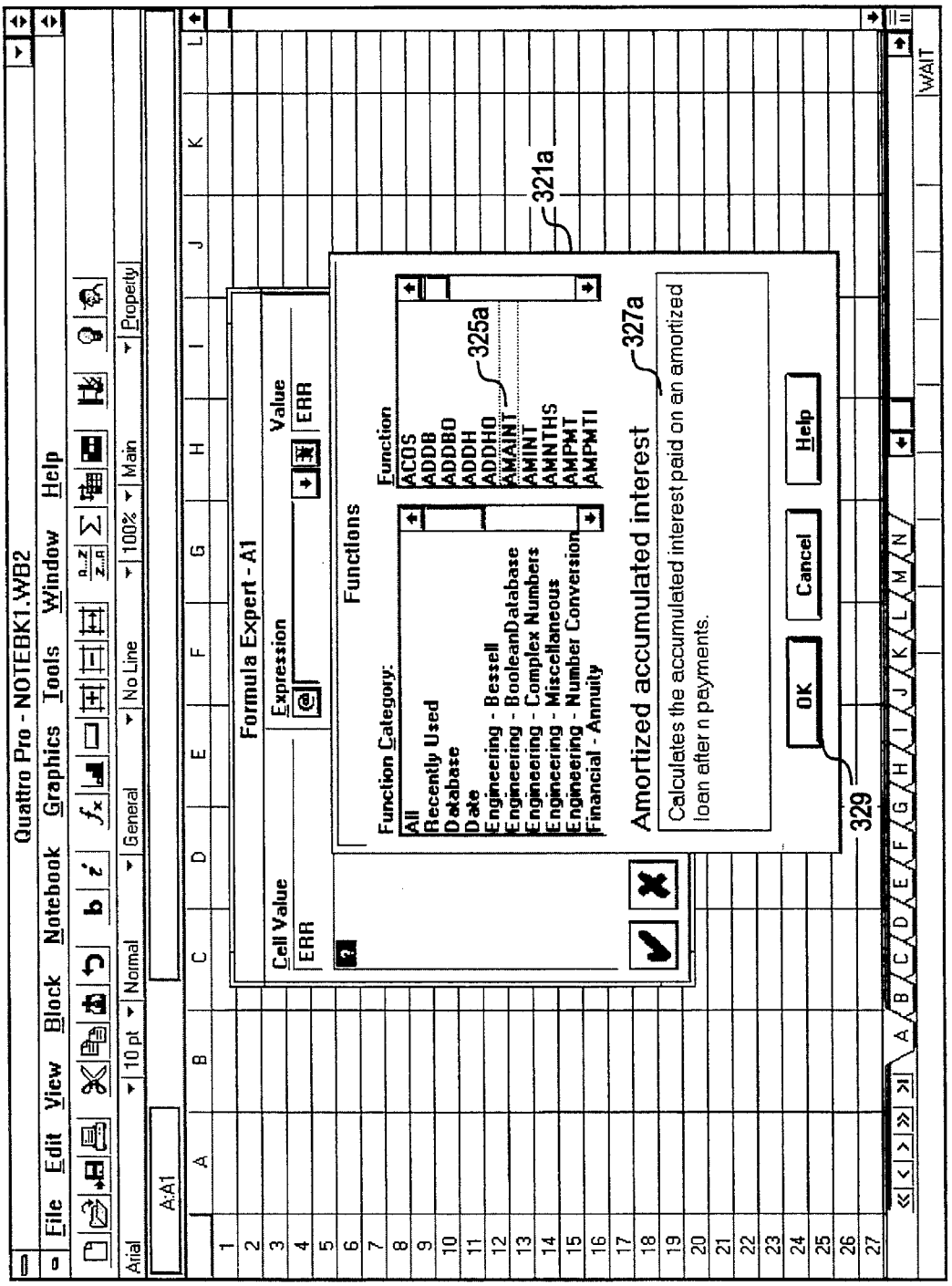

The "@" button 303, which appears to the left of the Subexpression Field, displays Functions Dialog 321, as shown in FIG. 3B. The Dialog 321 includes a Function Category List 323 and a Function (name) list 325. Information Panel 327 displays a descriptive message, which informs the user of the purpose of a user-selected function. Suppose, for example, that a user has selected the "Amortized Accumulated Interest" (AMAINT) function from the list 325. In response, the system updates the Dialog 321, as shown by the Dialog 321a in FIG. 3C. The AMAINT function is shown selected, at 325a. The information panel has been updated accordingly, shown at 327a. Upon the user selecting the OK button 329, the AMAINT @-function will be placed in the Subexpression Edit Field, as shown by the Dialog 301a of FIG. 3D. The user may now proceed to further change the formula using the Formula Outline Pane.

At the completion of formula editing, the user can close the Formula Composer Dialog 305 by selecting "OK" button 304 or "Cancel" button 306, in FIG. 3A. At any time during formula entry the user can select help. Help button 311 provides help for each part of the Formula Composer Dialog. Help button 312 (i.e., the one with the "@") provides help on the currently-selected @-function in the Subexpression Edit Field 305.

B. Working with Formula Composer components

Figure 3D:
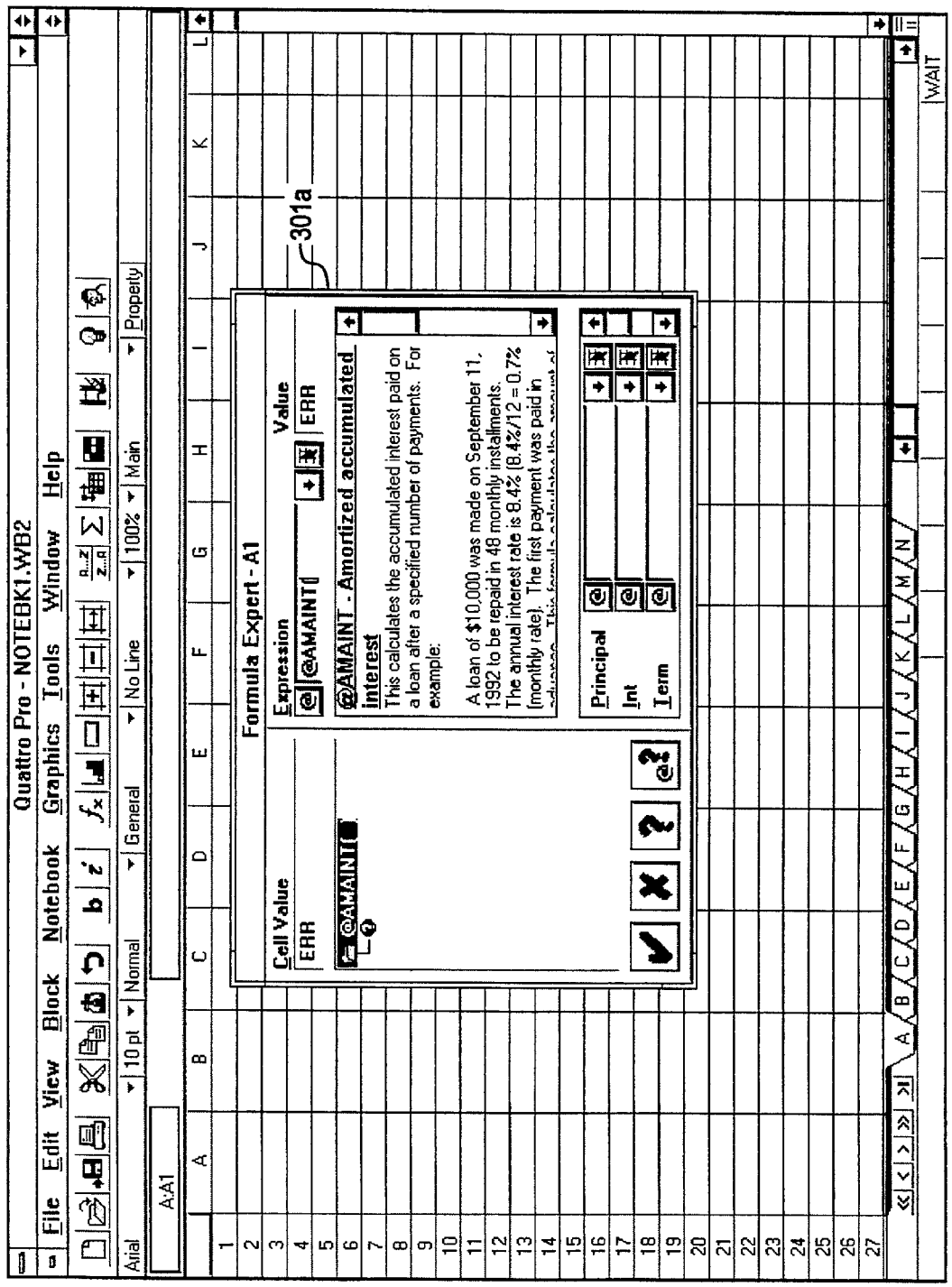
Figure 3E:
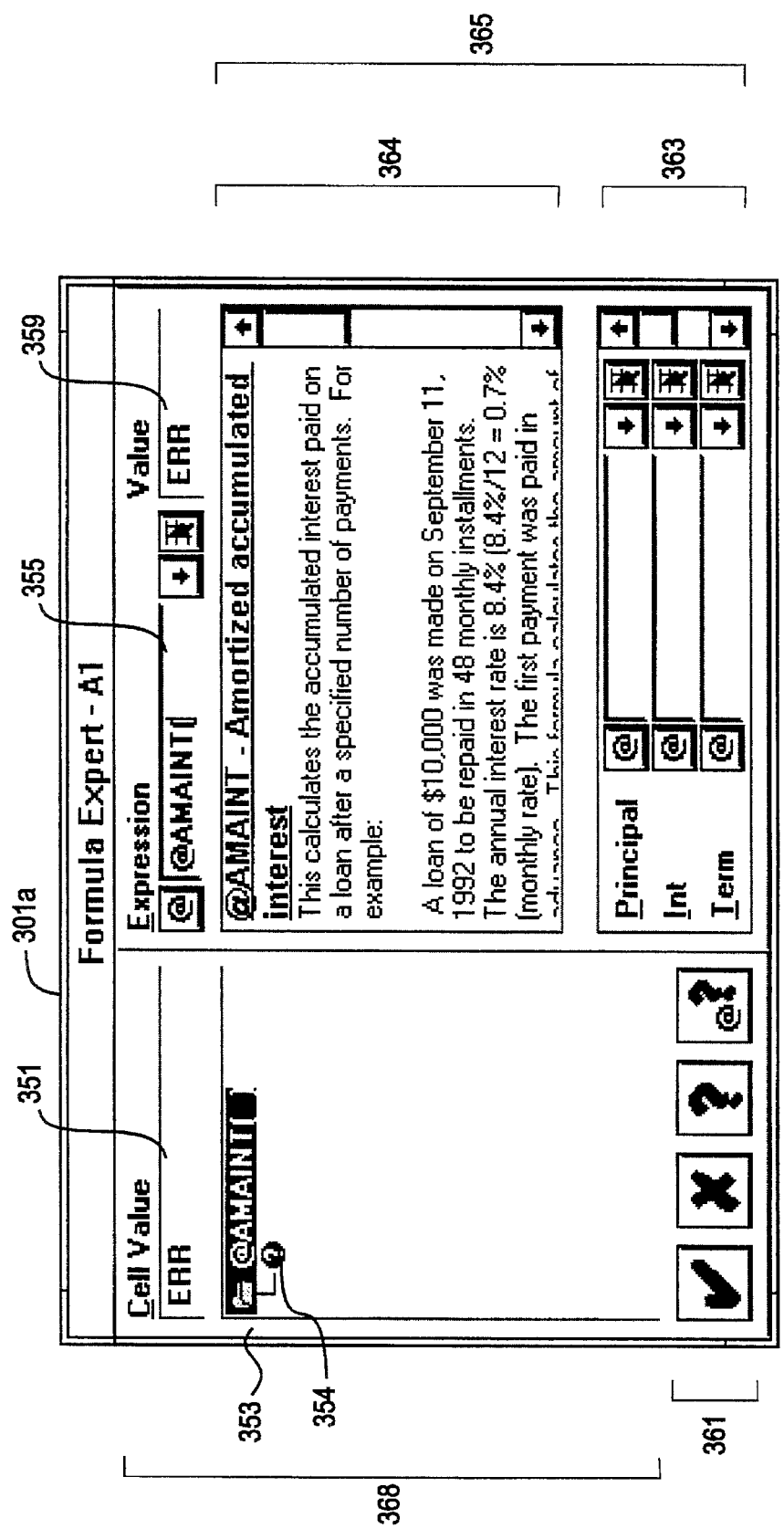

FIG. 3E presents a more detailed view of the Formula Composer Dialog 301a which was shown in FIG. 3D. As shown, Formula Outline Pane 368 provides an outline view of @AMAINT(), the current formula. The outline includes folder icons to the left of the outline for indicating whether a particular subexpression has been expanded or collapsed. For instance, the user can expand or collapse portions of a formula by clicking on the folder icon 353. The outline can include several levels, with each level containing a different subexpression. By default, the Formula Outline Pane shows one expanded level of the outline. Cell Value Field 351 displays the current result for the formula. Since the formula has not been correctly completed by the user at this point in the example (i.e., the user has not supplied values for the arguments to the formula), Cell Value Field 351 displays ERR. Similarly, the red question mark icon 354 is appended to the outline, for indicating that the formula is currently incomplete.

To select part of the Formula Outline, the user can click on a desired subexpression in the outline. Alternatively, the user can press the "Tab" key until the outline is the focus of the dialog box; then he or she can use the up or down arrow keys of the keyboard to select a particular part of the outline. When a desired part of the Formula Outline is selected, the Subexpression Edit Field 355 and Formula Pane 365 are updated to show the exact subexpression selected. For the instant example, Subexpression Edit Field 355 displays "@AMAINT(". Value Field 359, which always displays the current value for the selected subexpression, displays "ERR" since input for the subexpression has not been completed sufficiently to form a syntactically correct subexpression. Formula Pane 365 displays descriptive formula text 364 and Formula Input Fields 363, all specific to this particular function. Functionality of the various components will be demonstrated in further detail by following specific user examples.

Figure 4A:
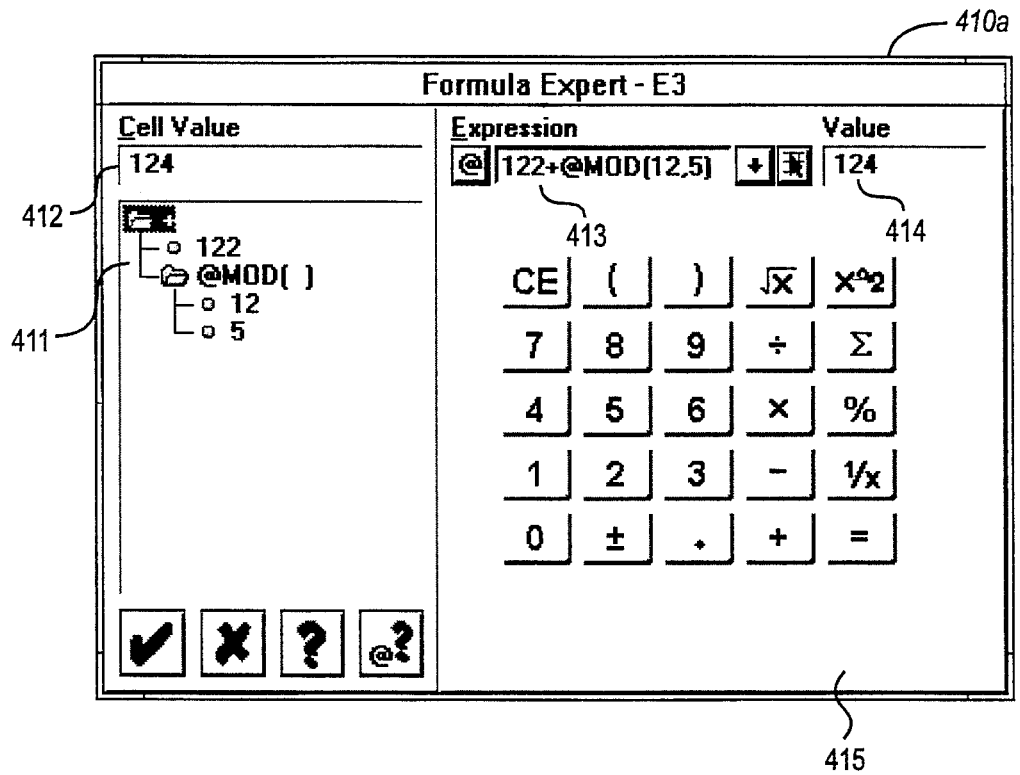
FIGS. 4A–I are bitmap screen shots illustrating interaction between the Formula Outline Pane of the Formula Composer and other components, particularly the Subexpression Field and Formula Expert.

Referring now to FIGS. 4A–O, features of the Formula Composer will be further illustrated using a simple formula: 122+@MOD(12,5). Upon invoking the Formula Composer button (button 226 in FIG. 2B), the Formula Composer appears as shown by the Composer Dialog 410*a* in FIG. 4A. A formula outline 411 is presented in the Formula Outline Pane. The value for the formula (i.e., the cell value), here the value of 124, is displayed at the Cell Value Field 412. On the right-hand side of the dialog, the Subexpression Edit Field 413 displays the entire formula, and the Subexpression Value Field 414 displays the current value for this subexpression (again, the value of 124). Since a function has not been selected by the user from the Formula Outline Panes the right side of the Composer defaults to displaying Formula Calculator 415, instead of a Function Expert (described below).

Figure 4B:
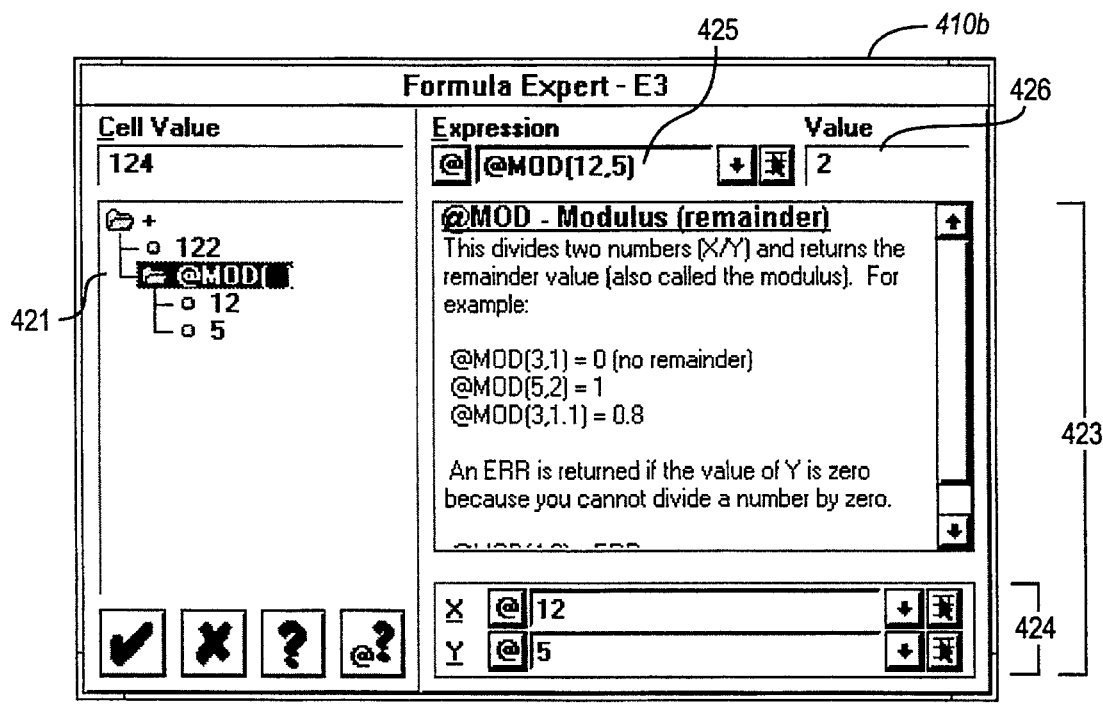

As shown at FIG. 4B, the user can select various nodes of the formula outline using conventional cursor positioning technique (e.g., with a mouse device). In the Dialog 410*b*, for instance, the user has selected the @MOD function, at 421. In response to the selection, the right side of the dialog changes to display Formula Expert 423, which includes Function Input Fields 424 specific for the currently selected function. Moreover, the right pane is updated so that the Subexpression Field contains only the selected node (i.e., the @MOD function) at 425, and the Formula Value Field displays the value for the expression (here, the value of 2), shown at 426.

Figure 4C:
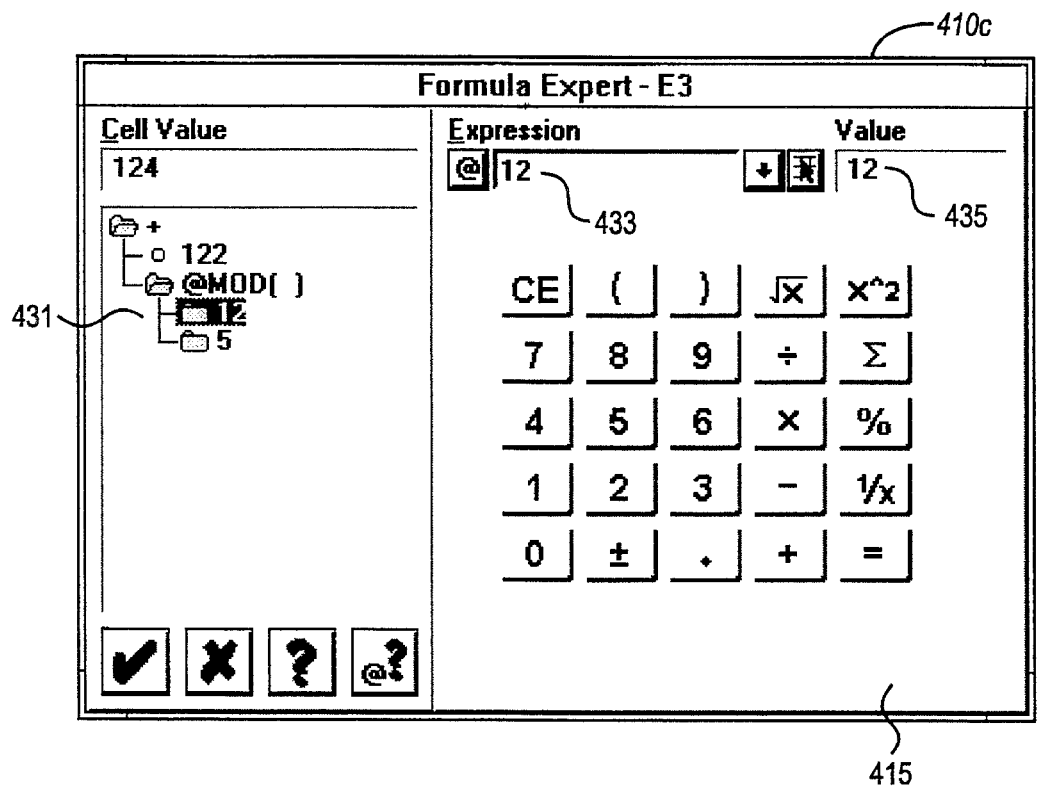

Continuing in this manner, the user may select other nodes for isolation. In Dialog 410*c* of FIG. 4C, for instance, the user has selected node 431—the first argument to the @MOD function. In response, the right side of the Composer changes to redisplay the Calculator 415 (instead of the Function Expert). The Subexpression Edit Field displays the number 12, shown at 433, since the currently selected node (i.e., node 431) consists only of the literal number 12. As before, the Value Field, shown at 435, displays the value for the current expression (again, the value of 12).

Figure 4D:
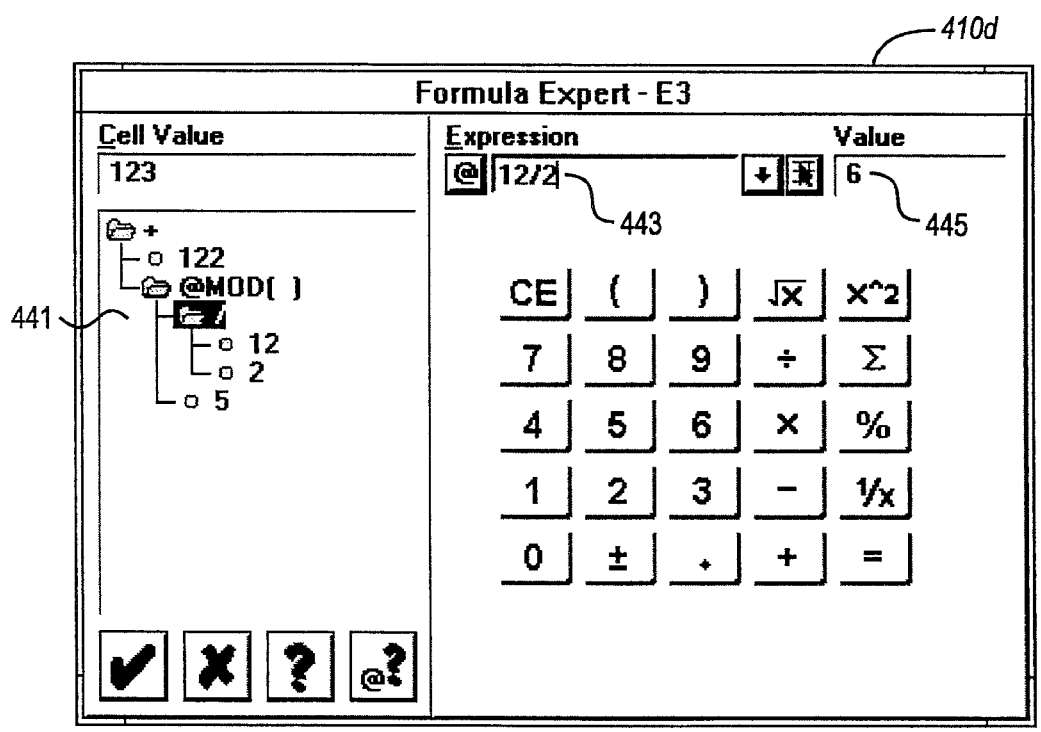

Continuing with the example, the user can proceed to edit the selected node (i.e., node 431 of FIG. 4C), such as typing "12/2" to replace the value of 12 (in the Subexpression Field 433). Dialog 410*d* of FIG. 4D illustrates the effect of the change. Specifically, the subexpression "12/2" now appears in the Subexpression Field, shown at 443, and the value for the expression now evaluates to 6, shown at 445. Moreover, what was once node 431 is now binary node 441, which comprises a parent node having two child nodes—that is, a binary operator ("/") node having one operand node storing the value of 12, and another operand node storing the value of 2. In this manner, the user can edit particular subexpressions in a formula in isolation—that is, focusing on a particular subexpression of the formula.

At Dialog 410*e*, the user has again selected the @MOD function node, shown at 451. This should be compared with the selection of the node at FIG. 4B (i.e., node 421). In particular, the Subexpression Field, shown at 453, has been updated to show the new parameter (i.e., "12/2"). Moreover, the Expression Value, shown at 455, is updated with its new value. Also, the Function Input Fields, shown at 454, have been updated by the system for the newly-entered argument (i.e., "12/2").

Figure 4E:
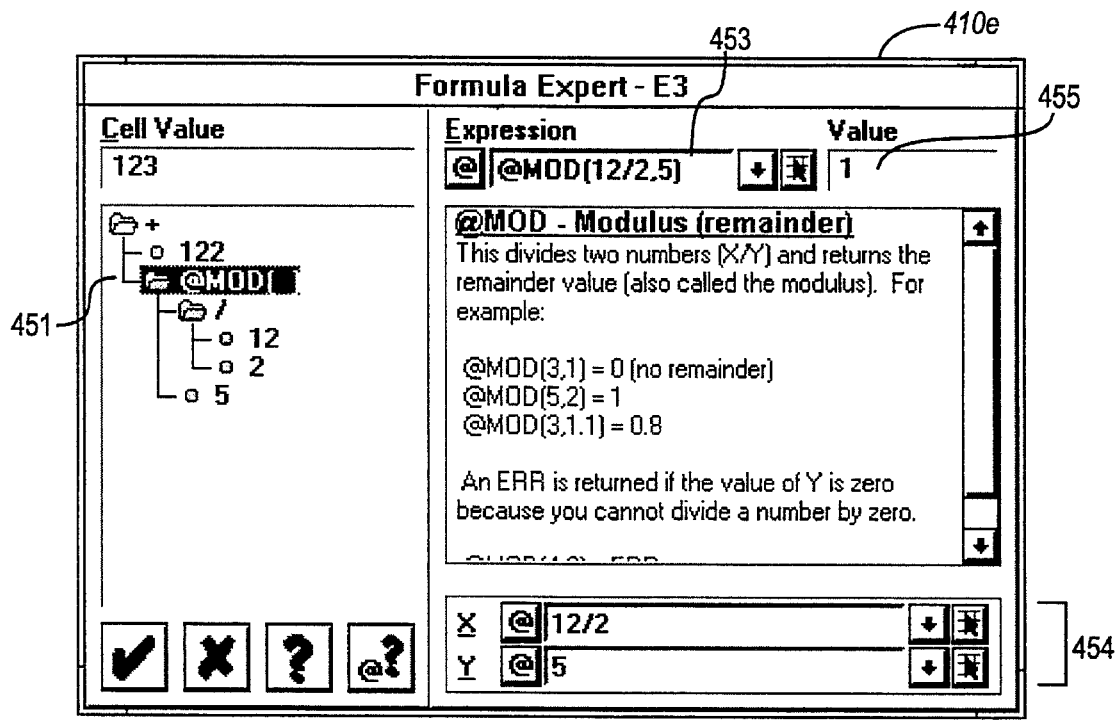

As shown by the comparison between FIGS. 4B and 4E, the Formula Composer of the present invention maintains synchronization between its various components, so that a change entered by a user at one component is automatically updated to other, dependent components. A change is the Formula Outline Pane, for instance, will automatically be reflected in the Subexpression Field, Subexpression Value Field, and the Formula Expert Pane (with its input field(s), if any). The relation holds true in reverse as well: changing something in the Subexpression Field causes an update to be posted to the Formula Outline Pane and the Formula Input Fields (if applicable). In a preferred embodiment, the components are synchronized so that updates occur automatically and immediately with each user input.

Figure 4F:
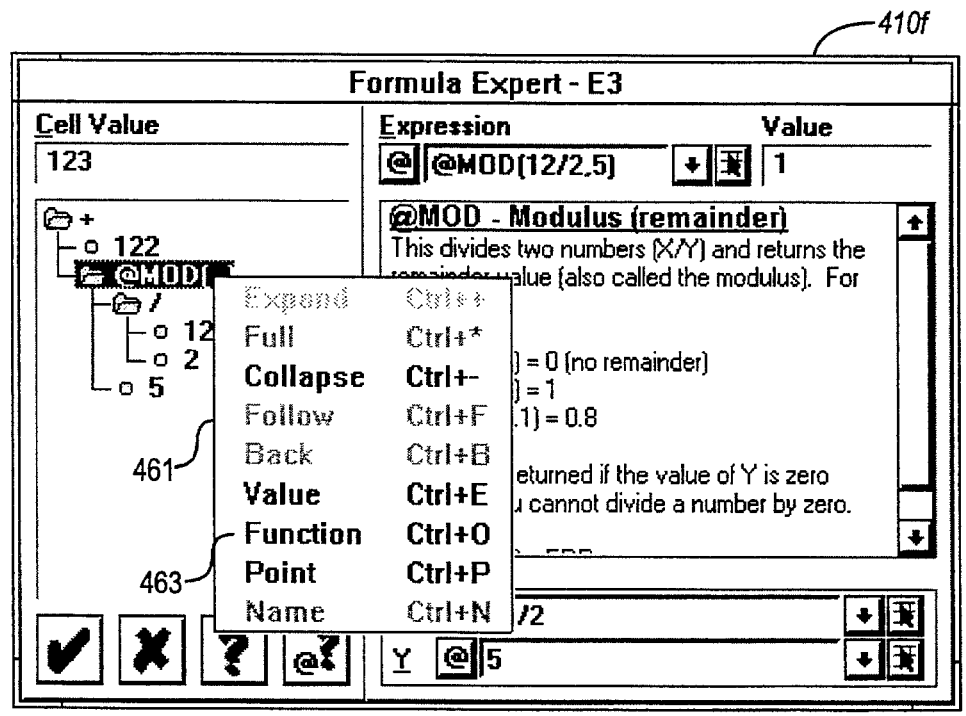

As shown at FIG. 4F, the user may invoke a context-sensitive pop-up menu for a selected node of the outline. When the user "right-clicks" part of the formula outline, a "quick menu" appears showing several available commands. Right mouse clicking the @MOD node, for instance, invokes local menu 461. In a preferred embodiment, the local menu in the Formula Outline Pane includes the following commands:

| Command | Description |
| --- | --- |
| Expand | Expands the outline one level; equivalent to double-clicking a collapsed subexpression. |
| Full | Expands all levels of the Formula Outline. |
| Collapse | Collapses the current subexpression of the outline; equivalent to double-clicking an expanded subexpression. |
| Follow | Goes to a referenced cell in the formula. |
| Back | Returns to the previous cell containing a formula that references the current cell. |
| Value | Converts the current subexpression to a value. |
| Function | Replaces the current subexpression with an @-function. When a user chooses Function, a dialog box appears that lets a user select an @-function from a list. |
| Point | Switches to Point mode to specify a cell reference by pointing to a cell (or cells) on a notebook page. In Point mode, the Formula Composer dialog box is reduced to show only its title bar until a user makes a selection. |
| Name | Replaces the current subexpression with a block name. When a user chooses Name, a dialog box appears that lets a user select a block name from a list. |

Using the "follow" and "back" menu commands, the user can examine a cell's relationship with other cells on the spreadsheet. When the user traces cell references using these commands, he or she can determine how cells that are referenced in the formula depend on other cells. For complex formulas with nested levels of cell references, the "follow" and "back" commands serve as basic spreadsheet auditing tools. In a preferred embodiment, the "follow" and "back" quickmenu commands are disabled (e.g., "grayed-out") if a cell reference is not selected in the Formula Outline.

Figure 4G:
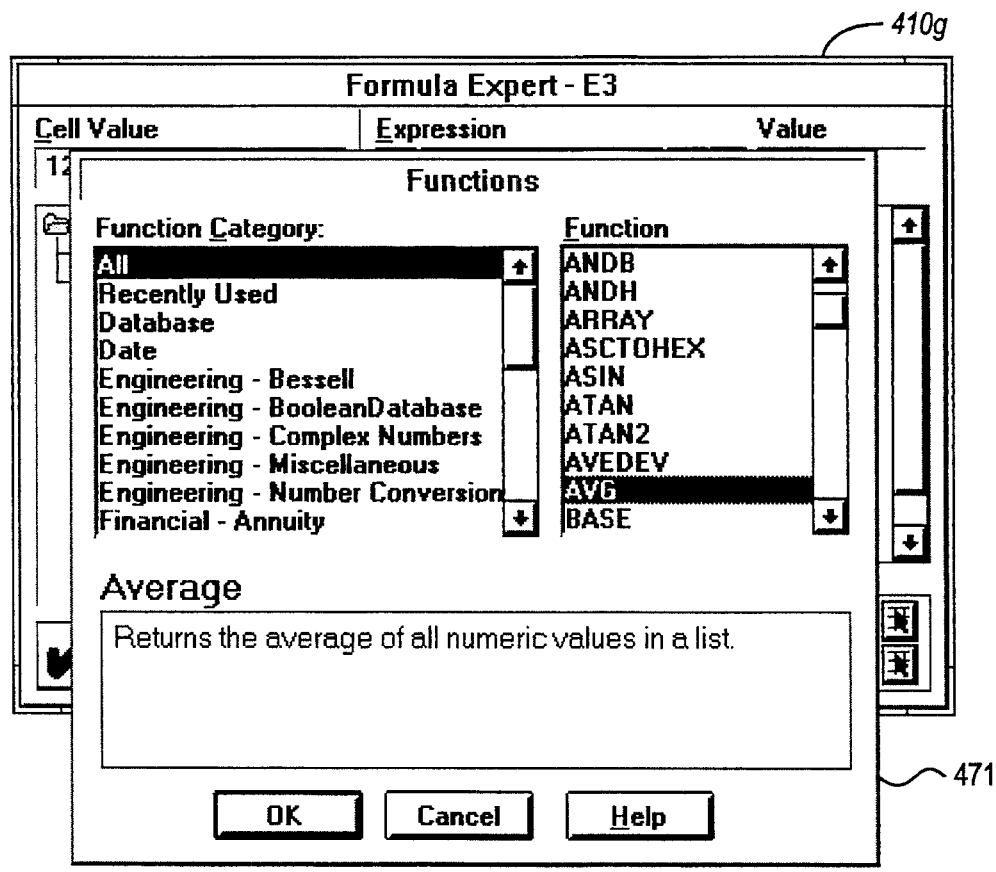
Figure 4H:
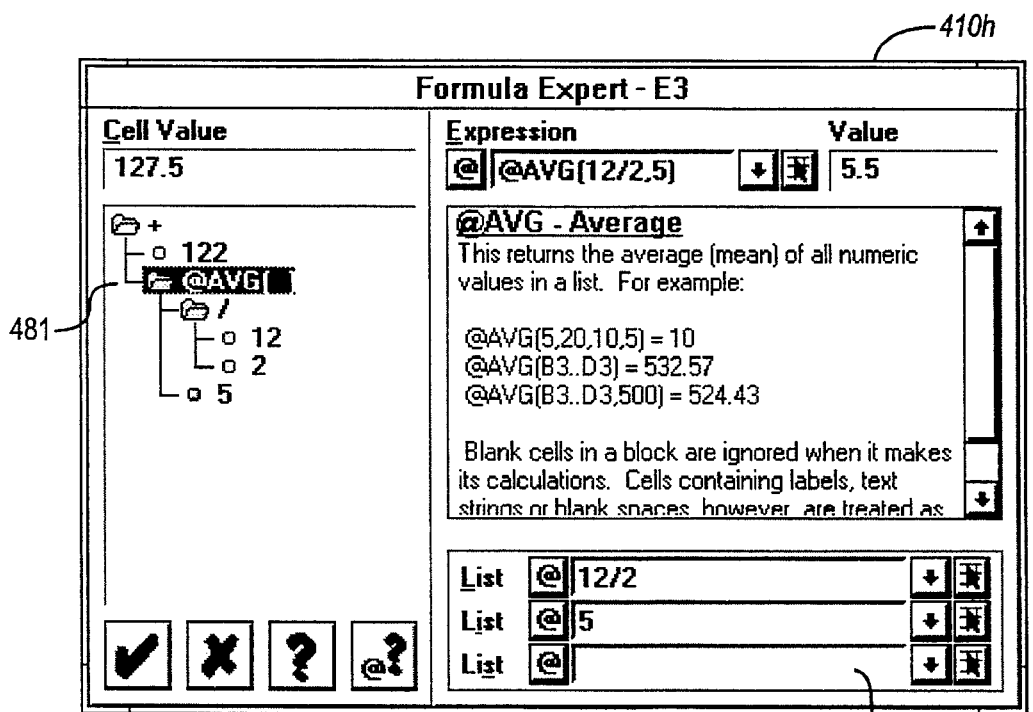

For the instant example, suppose the user selects "Function" choice 463 from the menu 461. As shown by dialog 410*g* of FIG. 4G, the system responds with a "Functions" dialog 471. Here, the user may select a new function for replacing the existing function at the current node. For this example, the user selects the "Average" function, @AVG(). The result is shown by dialog 410*h* of FIG. 4H. Specifically, the @MOD node has been replaced with an @AVG node, shown at 481. Note particularly that the other components (e.g., Subexpression Field and Input Fields) are automatically updated. Further, since the @AVG function takes a "list" of parameters (i.e., one or more parameters), the Input Fields are updated to add an additional input field, shown at 483.

Figure 4I:
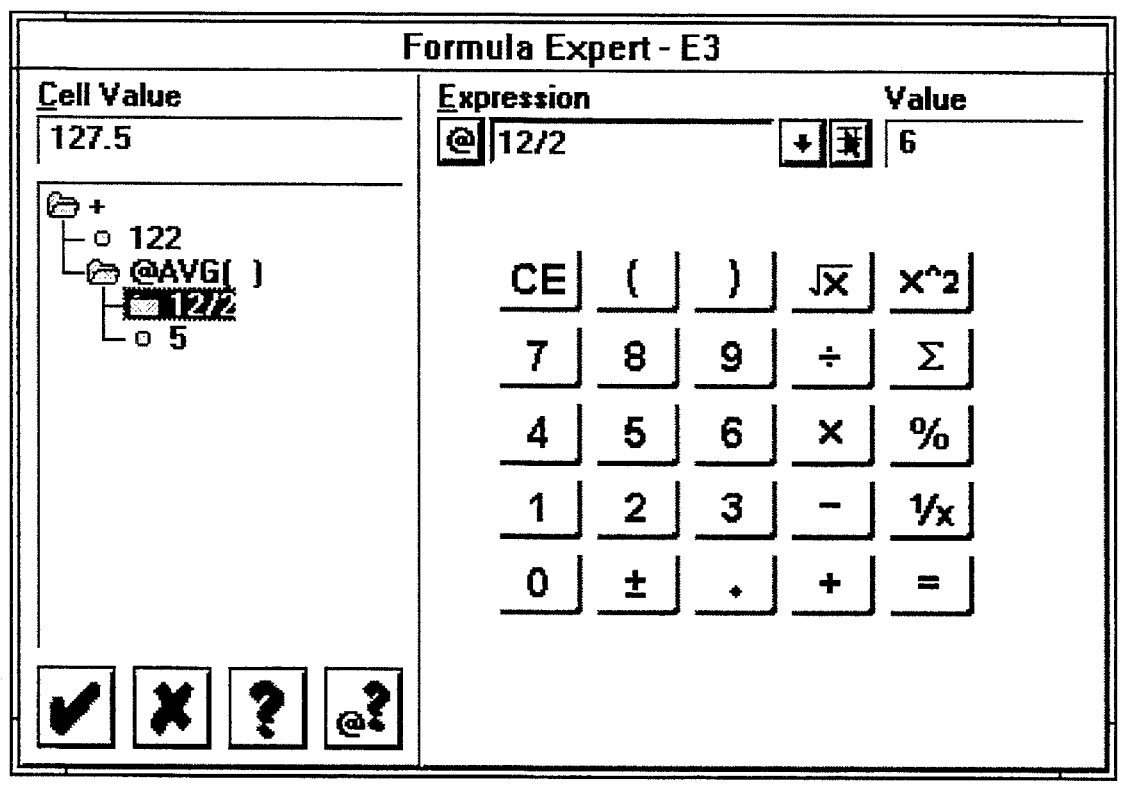

With a non-formula node selected, such as the "12/2" node shown in FIG. 4I, the Formula Pane switches back to display the Formula Calculator. Specifically, to display the calculator in the right pane of the Formula Composer Dialog, the user selects a subexpression that is a value, operator, cell reference or block name. The Formula Calculator allows the user to perform calculations within a formula. The calculator includes many buttons for writing mathematical expressions, including buttons for arithmetical, string, and logical (true/false) operators. The default action of the calculator is to replace the selected subexpression with a different value. To replace only part of a subexpression, the user can use the mouse to choose an insertion point within the subexpression.

In an exemplary embodiment, the calculator contains the following functionality/buttons:

| Button | Description |
| --- | --- |
| CE | Clear expression. |
| ( | Inserts a left parenthesis. |
| ) | Inserts a right parenthesis. |
| √x | Returns the square root of x. |
| x 2 | Returns the square of x. |
| 0,1,2, . . . 9 | Inserts the corresponding digit. |
| ÷,x,+,− | Inserts the corresponding arithmetic operator. |
| Σ | Returns the sum of the values. |
| % | Returns the percentage of the number; inserts a percent sign. |
| 1/x | Returns the reciprocal of the number. |
| +/− | Changes the sign of the displayed number; inserts a decimal point. |
| = | Displays the result of the calculation. |

Figure 4J:
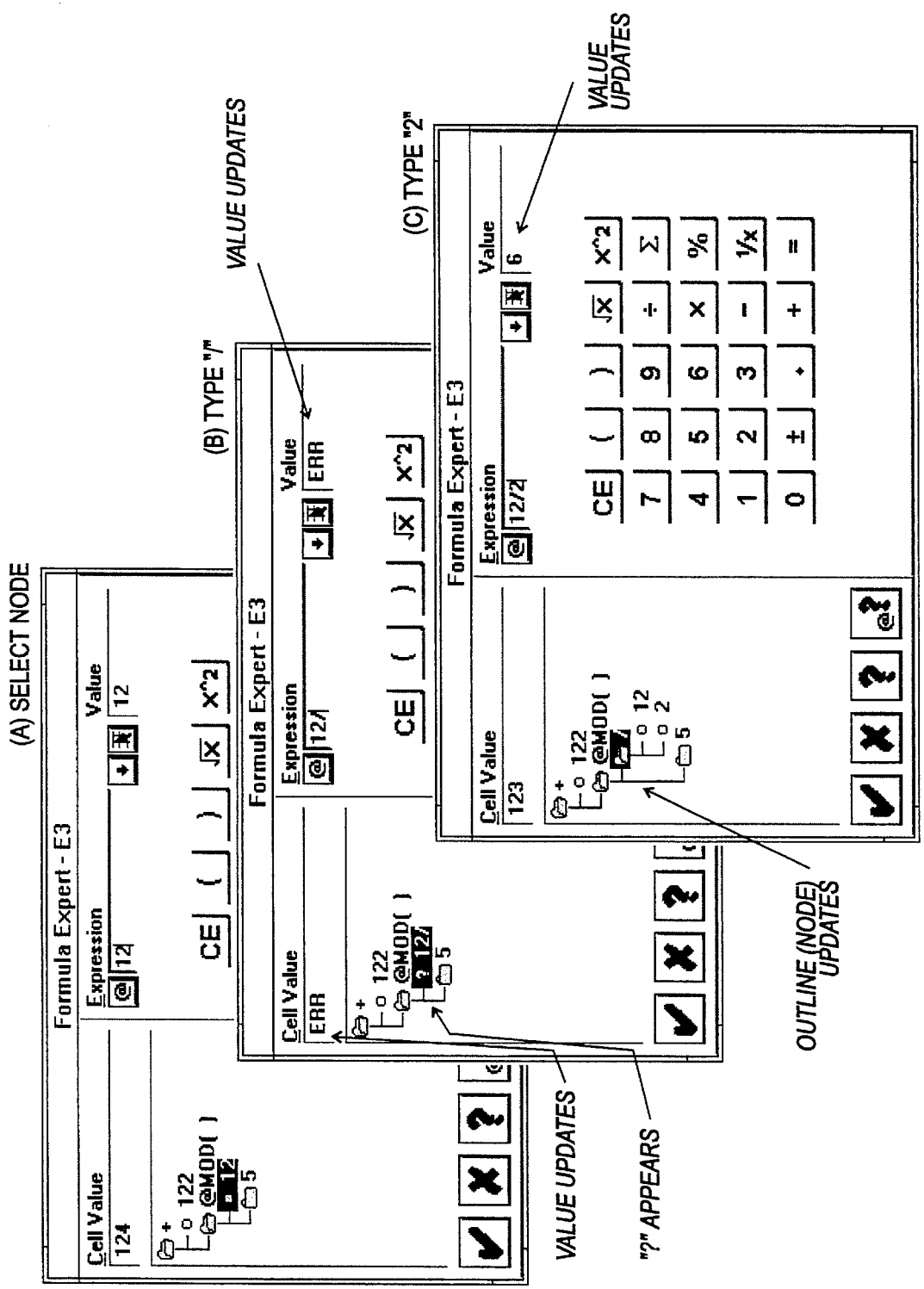
FIGS. 4J–K are bitmap screen shots illustrating use of the Formula Calculator for editing a formula, and its interaction with the Formula Outline Pane.
Figure 4K:
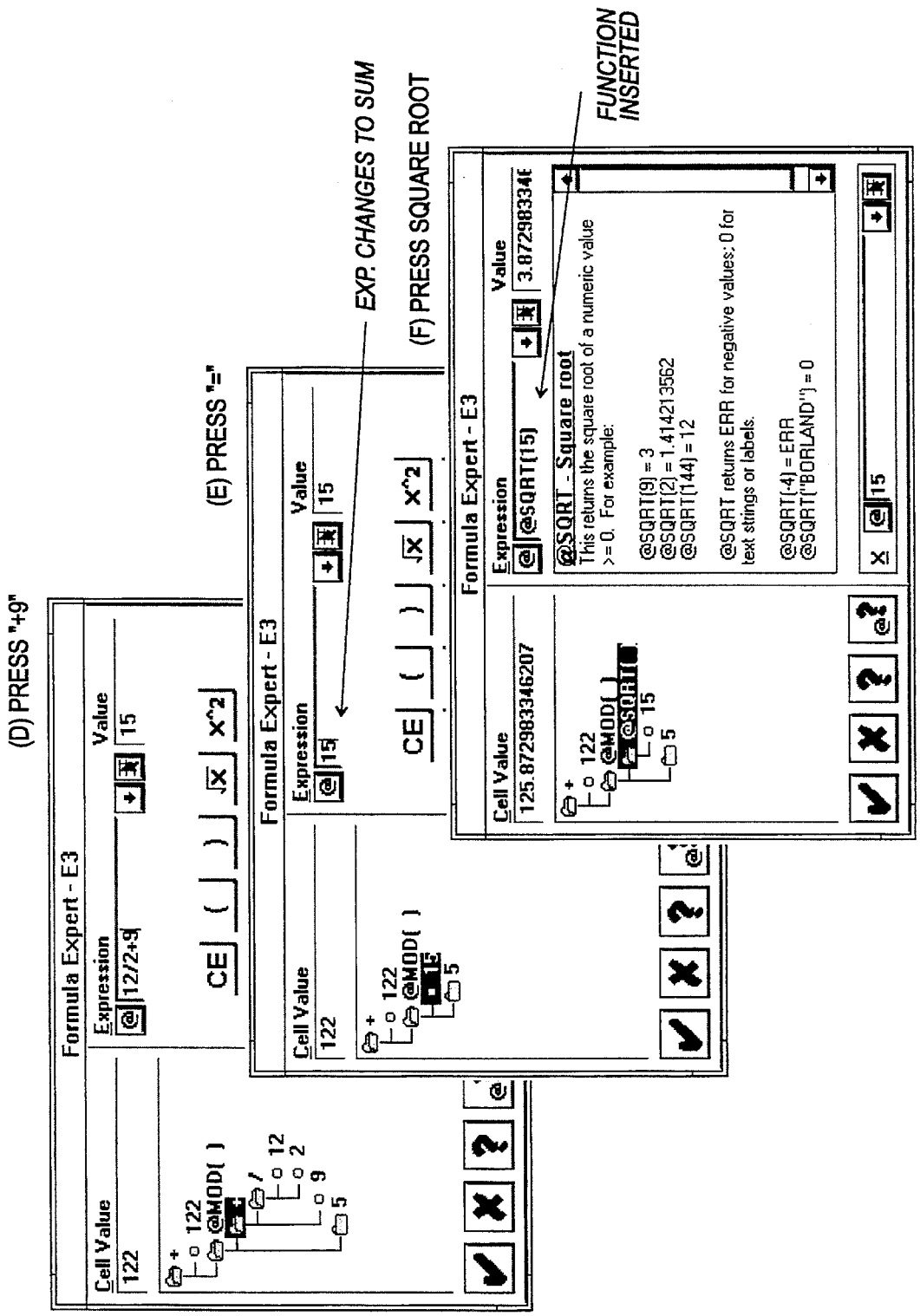

Use of the Formula Calculator is demonstrated in FIGS. 4J–K. In FIG. 4J, the user begins at selecting at node, at step (A). Next, the user enter "/" at step (B), using either the keyboard device or pointing device. As shown, the other panes are automatically updated to reflect the calculator entry. Continuing on to (C), the user presses "2". The subexpression value shows the numeric result, 6.

In FIG. 4K, the user continues editing the expression. At (D), the user enters "+9"; all views update immediately. At (E), the user presses "=". Here, the existing subexpression (i.e., "12/2/+9) is replaced with "15"—the literal result. Again, all views update accordingly. Finally, at (F), the user presses the square root key. As shown, the square root (SQRT) function is inserted into the formula. The Outline Pane is automatically updated to show the new function. Moreover, the Formula Calculator is replaced with the Formula Expert (for the SQRT function) and the appropriate input field.

C. Simplifying input: Formula templates

Figure 4L:
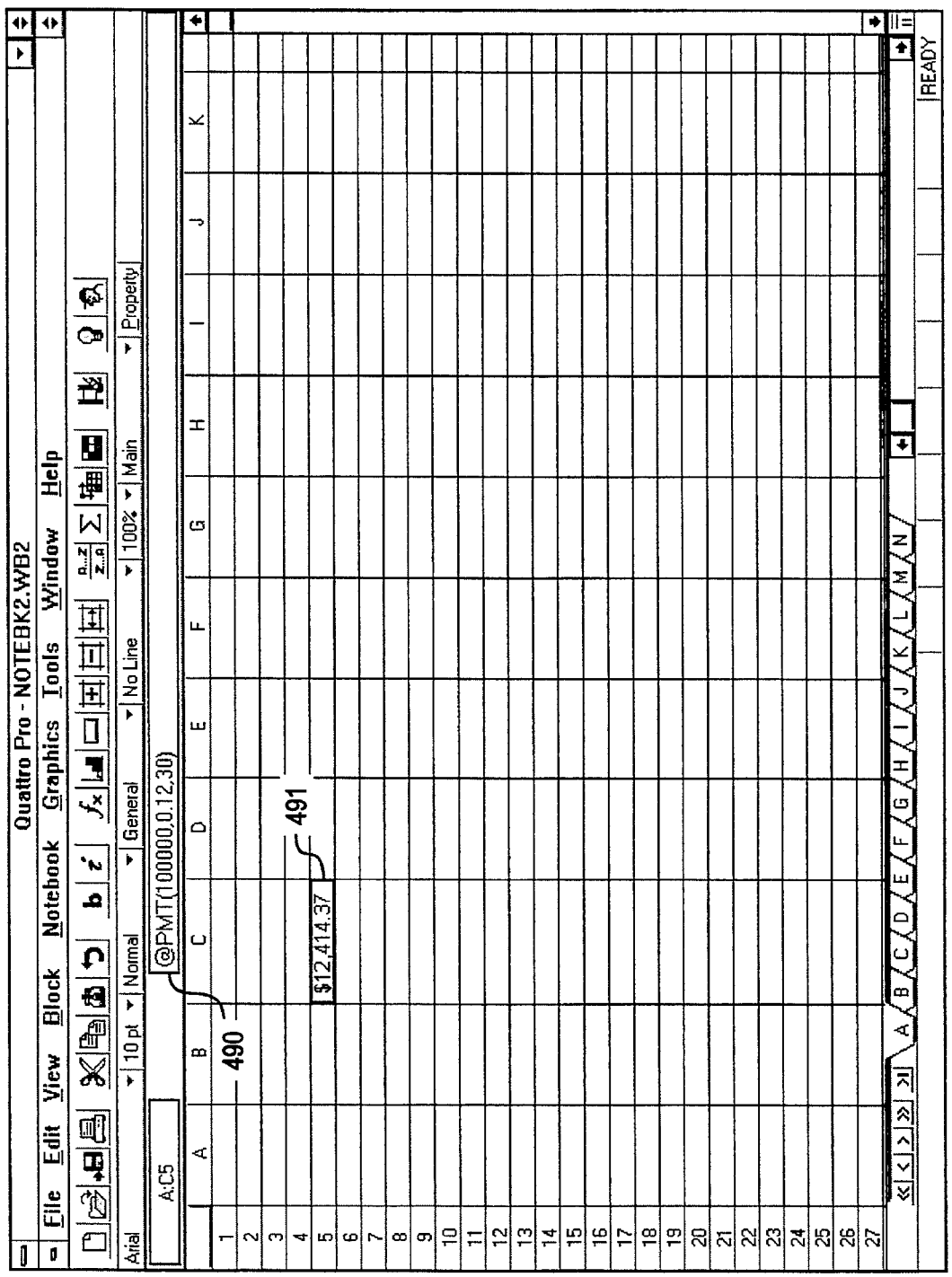
Figure 4M:
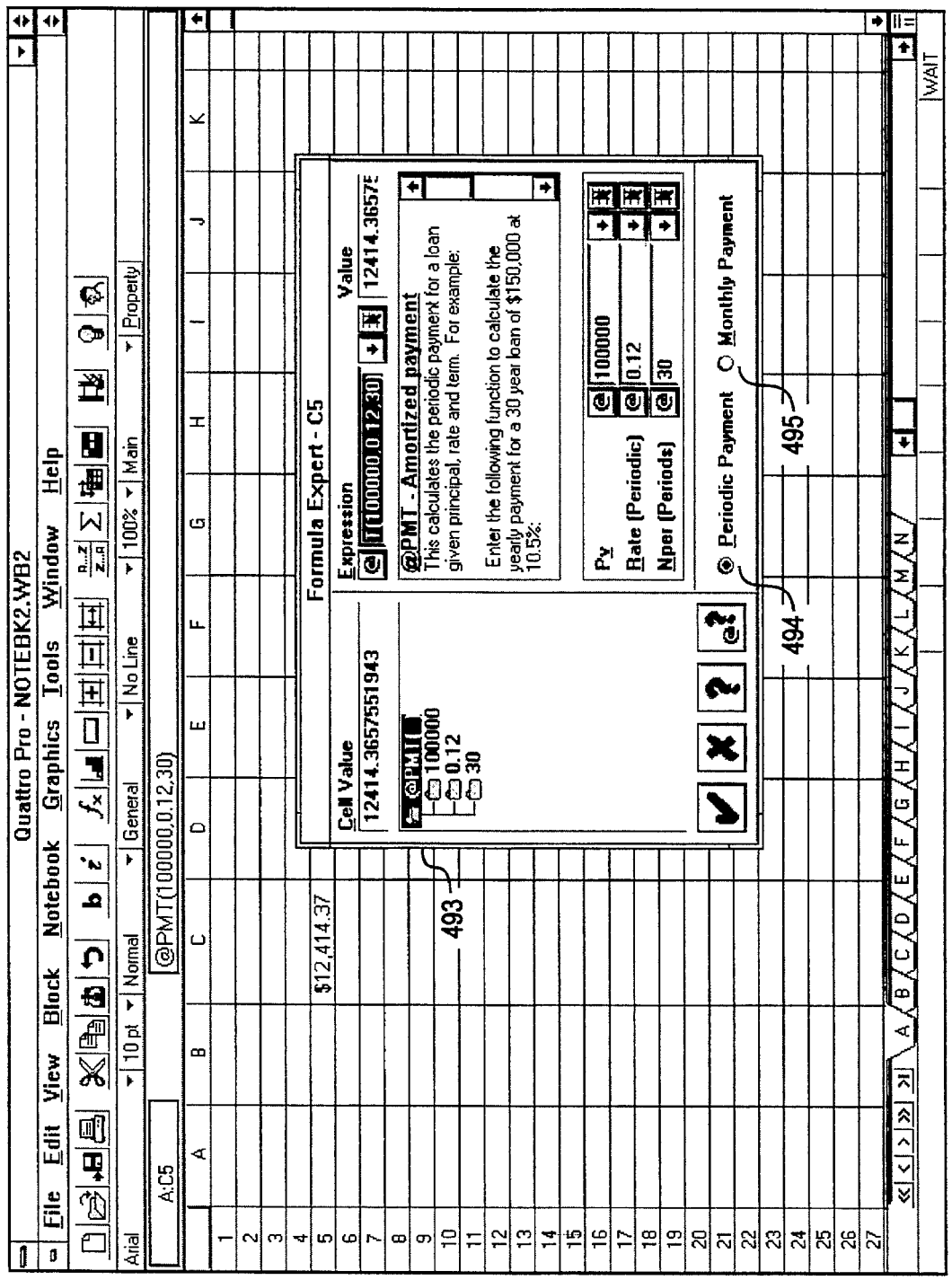

With reference to FIGS. 4L–N, formula templates provided by the Formula Composer will be illustrated. Consider, for instance, the spreadsheet shown in FIG. 4L. Here, the user desires to calculate payment information for a loan of one hundred thousand dollars ($100,000.00) for a period of thirty years and at an interest rate of twelve percent (12%). In the input line, shown at 490, the user enters @PMT($100,000, 0.12,30), thus thinking he or she has entered the correct formula. As shown at 491, however, the value expressed by the cell, $12,414.37, is far too high; the user has entered the formula incorrectly. The user should have, instead, divided the interest rate by 12 and multiplied the term by 12. This illustrates just one of many common user input mistakes.

The Formula Composer provides templates to correctly handle common user input mistakes. Use of the Formula Composer to correct the mistake of the foregoing example will now be illustrated. FIG. 4M illustrates the Formula Composer dialog 493, which is displayed for entry of the formula of the foregoing example. As previously described, the Formula Composer contains an Outline Pane, Subexpression Field and Value Fields, and a Function Expert (with input fields). As shown, however, the Composer Dialog also includes template radio buttons 494, 495. These will now be described.

The template radio buttons 494, 495 aid in the correct entry of information as arguments to the spreadsheet function. Since the most common mistake of users when inputting information for the @PMT function is forgetting to convert the payment information to a monthly basis, the template radio buttons 494, 495 include functionality to facilitate correct entry. Upon the user selecting the monthly payment radio button 495 (e.g., clicking on it), the information is automatically converted to a monthly basis as shown in FIG. 4N. Specifically, the interest rate is divided by 12 and the period is multiplied by 12, both shown by the formula outline at 496. Thus the formula template for the @PMT function serves to correct users' most common input mistakes.

D. Visual display of precedence

The Formula Composer shows the user operator precedence—that is, the order in which parts of a formula are evaluated. Consider, for instance, the express 2+3*4. As shown at 498 of FIG. 4O, the multiplication operation occurs before the addition operation, since the multiplication operator has precedence. In the past, users could only discern precedence information by looking up the precedence order of the various operators in user manuals. In the Formula Outline Pane, however, operator precedence is always indicated to the user visually, so that he or she can tell at a glance what part of a formula is being evaluated and when. This is particularly helpful in debugging complex formulas.

Internal Operation

A. General architecture

Figure 5:
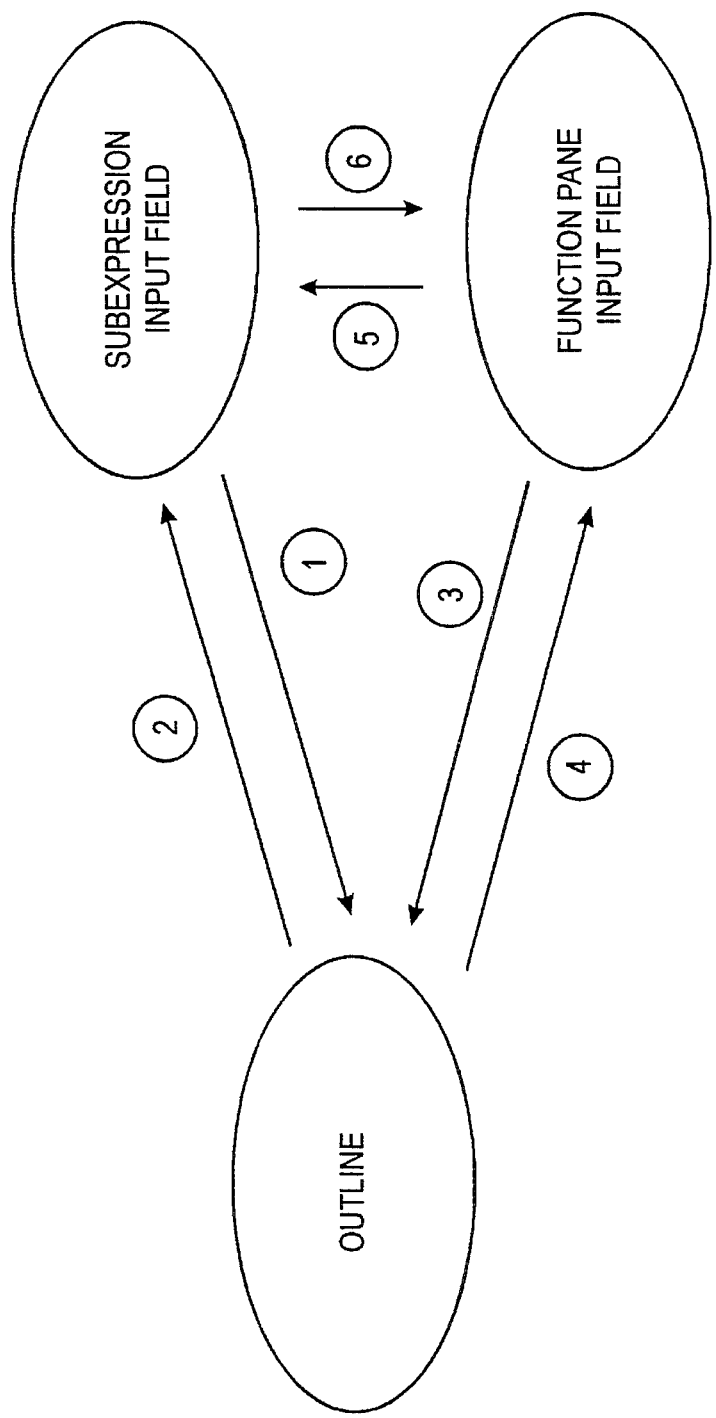
FIG. 5 is a block diagram illustrating architecture underlying the Formula Composer of the present invention.

FIG. 5 presents a conceptual view of the architecture underlying the Formula Composer. The Composer's architecture is divided along the three main areas of the user interface: Formula Outline Pane, Subexpression Edit Field, and Function Pane Input Field(s). As previously demonstrated by above examples, these modules maintain communication links, so that all the components of the Formula Composer remain synchronized at all times.

Changes propagate as follows. A change to the formula in the Outline Pane causes the system to update the Subexpression Field and Function Pane. The communication links which accomplish this are represented by path #2 and path #4. In a similar manner, a change to the Subexpression Field causes the system to update the Outline Pane (via path #1) and the Function Pane (via path #6). Finally, a change in the Function Pane, namely user-supplied information entered into input fields, causes the system to update the Outline Pane (via path #3) and the Subexpression Field (via path #5). The discussion which follows will focus on servicing of the various communication paths which tie together the modules which comprise the Formula Composer.

B. Formula opcodes

Typically, "life" for a formula begins at the Subexpression Field where either the user has typed in a new formula or the system has copied in a new formula (from one of the spreadsheet cells). The expression which comprises the formula is passed to the spreadsheet engine (135 of FIG. 1C) so that it may be tokenized or "compiled" into a byte sequence of opcodes. Thus, the Formula Composer defers the process of parsing formula expressions to the underlying spreadsheet engine, as that component of the system is best suited to the task.

Formulas, which are stored in system memory at runtime as Formula Cell Information records, are represented internally as opcodes or "p-code," in familiar Reverse-Polish Notation (RPN) form. The opcodes may be converted back into text strings ("de-parsed") for easy on-screen editing of formulas by the user. In an exemplary embodiment, a Formula Cell Information Object is created in system memory, the object being instantiated from the following C++ class:

```
class_CEXPORT_FmlCellInfo : public SSCellInfo
{
    double          value;        // formula's values
    SSCellRef       loc;          // formula's location
    FmlCellInfo     *next,-       // the next formula cell
                                  in the chain
    FmlCellInfo     *prev;        // the prev formula cell in
                                  the chain
    void (*feval) ( );            // ptr to compiler formula (pCF)
    WORD            state;        // formula's state
    WORD            wLen;         // length of formula
    WORD            wRefPos;      // starting position of references
    char            formula[ ];   // formula bytecodes of
                                  variable length
};
```

As shown, an instantiated Formula Cell Information Object includes a value member and a formula[] array. The byte-code formula is stored in formula[]. The calculated result for the cell, on the other hand, is stored as value. Once the formula expression is compiled into opcode or p-code, the Formula Composer may then decompile it into a formula outline.

Literature describing cell record and/or opcode formats for Lotus 1-2-3®, Microsoft Excel®, and Borland Quattro® Pro are available from the respective vendors. Additional description for Quattro® Pro may be found in U.S. patent application Ser. No. 08/205,922, commonly owned by the present assignee.

C. Composer data structures

Before describing specific methods of the Composer, it is helpful to first review the underlying data structures which the methods employ.

1. FormulaNode

In an exemplary embodiment, a FormulaNode is defined for storing a subtree of the outline. One FormulaNode exists for each line presented to the user in formula outline view. In an exemplary embodiment, FormulaNode may be implemented as a C++ class, as follows:

```
/*
*FormulaNodes contain other FormulaNodes
*/
class FormulaNode {
public:
    NodeType Type;              // node type
    DynamicString NodeText;     // pointer to expression
                                // text for this node
    // pointer to the parent
    composer
    LPFormulaOutline pOutline;  // pointer to the composer
    // subNodes are described by these two variables:
    LPFormulaNode pParent;      // pointer to our parent
    LPFormulaNode pChildren;    // pointer to first child
    LPFormulaNode pSibling;     // pointer to our siblings
    WORD LineNumber;
    WORD LineLevel;
    FormulaNode(LPSTR p, NodeType T,
        LPFormulaOutline pFC);
    // create a new formula Node
    FormulaNode(LPSTR pBuf, WORD Size, WORD *pWhere,
        LPFormulaOutline pFC);
    // read a new formula node from a buffer
    ~FormulaNode ( );
    BOOL Write(LPSTR pBuf, WORD Max, WORD *pWhere);
    // write self and children to a buffer
    BOOL ReadChildren(LPSTR pBuf, WORD Size,
        WORD *pWhere);
    // read Children from a buffer
    void AppendChild(LPFormulaNode pFO);
    // append a child to the end of the children
    void PrefixChild(LPFormulaNode pFO);
    // append a child to the end of the children
    void DeleteNodeText( );
    // delete the current expression
    void ReplaceNodeText(LPSTR pStr);
    // replace node text with a new string
    void ChangeFunction(LPSTR pNewExpression);
    void DeleteChildren( );
    // delete all the kids
    void Expand(BOOL ExpandKids = FALSE);
    // expand iff the Node is collapsed and the
    // expression is expandable
    LPSTR GetExpression( );
    // get the subexp text for a particular node
    void ChangExpression(LPSTR pNewExpression);
    // change the subexp text
    void Collapse( );
    // collapse iff the Node is expanded
    void ReExpand( );
    // expands (collapses first if already expanded)
    void Replace(LPFormulaNode pFO);
    // replace with a new node
    BOOL Expandable( );
    // tests to see if the current expression can be expanded
    void GainFocus( );
    // called when this part of the Node gets focus
    // (also causes all subNodes to get focus)
    void LoseFocus( );
    // called when this part of the Node loses focus
    BOOL Focus( );
    // returns TRUE if the Node has focus
    BOOL IsFullyExpanded( );
    // return TRUE if the outline substructure is fully expanded
    // fill out a portion of a template
    BOOL TemplateFill (LPSTR pStr, WORD Which,
        LPAppliedMode pAM);
    // clean out empty parameters
    BOOL TemplateCleanUp( );
    BOOL TestForAutoParen(BOOL IsBinary);
};
```

As shown, each FormulaNode has a type, NodeType, which describes the type or kind of node. NodeType types are set forth in the following data structure.

```
/*
* Node Types
*/
typedef enum {
    NodeTypeUnknown,
    // possibly could expand - syntax is unknown
    NodeTypeSyntaxError,
    // definitely can not expand - syntax incorrect
    NodeTypeCollapsed
    // definitely can expand - syntax is okay
    NodeTypeLeaf,
    // definitely can not expand - syntax is okay
    NodeTypeBinary,
    // expanded binary operation
    NodeTypeUnary,
```

```
    // expanded unary operation
    NodeTypeFunction,
    // expanded function call
    NodeTypeParens,
    // expanded parenthesis
    NodeTypeZero,
    // special: used for blank optional parameters
    NodeStartChildren,
    // special: used for reading/writing outlines
    NodeEndChildren,
    // special: used for reading/writing outlines
    NodeFocusHere
    // special: used to indicate branch has focus
} NodeType;
```

The types are largely self-evident. "Unknown" means that the system cannot discern a particular type for the node. "Syntax error" means that the node is not syntactically correct; the system will display a red question mark icon for nodes of this type. "Collapsed" is a node which is syntactically correct and which can be expanded. "Leaf" is a node which is syntactically correct but cannot be expanded. "Binary" is a node storing a binary operator (e.g., +, −, and the like). "Unary" is a node storing a unary operator. "Function" is a node storing a function. A binary node will have exactly two children nodes, while a unary node will have exactly one child node. A function node, on the other hand, may have a variable number of children nodes (one for each argument). "Parens" is a node type having one child. In a sense, parentheses can be viewed as a function having no name and taking only a single parameter.

"Zero" is a node type for use with financial functions. Some financial functions take optional arguments. Thus, a special node type is provided for optional financial arguments; the default value for the arguments is zero. Finally, "StartChildren", "EndChildren", and "FocusHere" are special node types provided for reading and writing outlines to a cache memory.

Continuing with the description of the FormulaNode data structure, the next data member is NodeText, which stores a pointer to expression text for the node. NodeText is followed by pOutline, which is a pointer back to the FormulaOutline—the data structure storing information about the overall outline. The node next stores pointers to its parent and any children or siblings it might have. If the node is the topmost node, its parent pointer, pParent, is set equal to NULL. For children nodes, pChildren points to the very first child, or stores NULL if no children are present. In a similar manner, the node stores a pointer to any sibling, if present. A sibling is any node which is at the same level in the outline as the node. The final two data members, LineNumber and LineLevel, are provided for optimization of screen drawing. They are not necessary for the basic operation of the node.

Following the data members of the FormulaNode class are various class methods. Exemplary methods include: "Write" to write self and children to a buffer; "ReadChildren" to read Children from a buffer; "AppendChild" to append a child to the end of the children' "PrefixChild" to append a child to the end of the children; "DeleteNodeText" to delete the current expression; "ReplaceNodeText" to replace node text with a new string; "ChangeFunction" to change to a new function; "DeleteChildren" to delete all children; "Expand" which expands if the Node is collapsed and the expression is expandable; "GetExpression" which gets the subexpression text for a particular node; "ChangeExpression" to change the subexpression text; "Collapse" to collapse if the Node is expanded; "ReExpand" to reexpand after collapse; "Replace" to replace with a new node; "Expandable" to test whether the current expression can be expanded; "GainFocus" is called when this part of the Node gets focus (and also causes all subNodes to get focus); "LoseFocus" is called when this part of the Node loses focus; "Focus" returns TRUE if the Node has focus; "IsFullyExpanded" returns TRUE if the outline substructure is fully expanded; "TemplateFill" fill out a portion of a template; "TemplateCleanUp" clean out empty parameters; and "TestForAutoParen" test for parens. Particular steps of pertinent methods are described in further detail below.

3. FormulaOutline

A FormulaOutline data structure is also defined for storing information about the outline itself; only one FormulaOutline is created per session. In an exemplary embodiment, FormulaNode may be implemented as a C++ class, as follows:

```
class FormulaOutline : public TTIOutLine<unsigned short> {
public:
    LPFormulaNode Table[MAXLABEL];    // large table
    // pointer to the base cell
    LPSSCellRef pBase;
    // there is *always* the first level of an outline
    LPFormulaNode pNodes;
    // this points to the current focus (or NULL if no focus)
    LPFormulaNode pFocus;
    // remember if the formula text begins with an '='
    BOOL StartsWithEqual;
    // this points back to the dialog box that owns us . . .
    ComposerDialog *pComposerDialog;
    // the follow-cell-reference stack
    SSCellRef FollowStack[MAX_FOLLOW];
    WORD FollowSize;
    // Indicates if user has changed the current formula
    BOOL FormulaChanged;
    // pointer to the comment for this formula
    LPSTR pComment;
    BOOL AllowCommentInstallation;
    BOOL FirstUndo;
    BOOL Dirty;
    WORDLineCount;
    // constructor
    FormulaOutline( );
    ~FormulaOutline( );
    // set pComposerDialog
    void SetDialog(ComposerDialog *pD),
```

-continued

```
// call this function to change the subexpression text
// called by the subexpression edit text, the calculator pane,
// and by the function expert when the user applies changes
void ChangeSubExpression(LPSTR pNewSubExpression);
// . . .
// load the formula from a cell at a particular location
BOOL LoadFormula(LPSSCellRef pBaseCell, LPSTR pDefault = NULL);
// store the current formula in the cell - return FALSE if error
BOOL StoreFormula(LPSTR pF);
// return the text for the entire expression
void GetExpression (LPSTR pText, WORD Max);
// return the text for the expression which currently has focus
void GetSubExpression (LPSTR pText, WORD Max);
// return the text for the entire expression
void EvaluateString(LPSTR EvString, LPSTR pText, WORD Max);
// compute the value of the whole formula, return it as a string
void GetValue (LPSTR pText, WORD Max);
// compute the value for the expression which currently has focus
void GetSubValue (LPSTR pText, WORD Max);
// calculate a line number given a particular node
WORD LineNumber(LPFormulaNode pFO);
// find the outline that corresponds to a line number -
// return level too
LPFormulaNode FindLine(WORD line, LPWORD pLevel);
// return the number of lines in the outline
WORD GetLineCount( );
// get the current follow string
void GetFollowString(LPSTR pFS, WORD Max);
// dispatch to a command
void Dispatch(WORD Which);
// dispatch to a command
BOOL AskDispatch(WORD Which);
// write the outline to a buffer
WORD Write (LPSTR pBuf, WORD Max);
// read the outline from a buffer
BOOL Read(LPSTR pBuf, WORD Size);
// compare two strings
BOOL CompareCacheStrings(LPSTR pCe, LPSTR pCa);
// find an an entry in the cache
BOOL FindCacheEntry(
    LPSTR pText,
    LPSSCellRef pFooCell,
    WORD *pWhere
    );
// delete an entry in the cache
void DeleteCacheEntry(WORD WhichEntry);
// allocate space in the cache
WORD AllocateCacheEntry( );
// write an entry to the cache
void WriteCacheEntry(LPCacheEntry pCE);
// write the current outline to the cache
void WriteToCache(LPSTR pF);
// Create a new subtree based on a template (mode string)
void Template(LPSTR pStr);
// fill out a portion of a template
void TemplateFill(LPSTR pStr, WORD Which, LPAppliedMode pAM);
// finish filling out a template
void TemplateCleanUp( );
// check for an open notebook
BOOL NoteBookIsOpen (SSRange r);
// convert a range to a string
void RangeToString(LPSSRange pRange, WORD Max, LPSTR pBuf);
// install a comment into the outline
void InstallComment(LPSTR pChars, WORD Length);
// return TRUE if the outline contains any error nodes
BOOL ContainsError( );
void SetDirty( );
void RebuildLookupTable( );
// for scanning
void ScanInit(LPScanParams pSP);
void ScanNext(LPScanParams pSP);
};
```

As shown, the data structure essentially comprises a large array, with each element of the array storing a FormulaNode. The array is maintained for speed of display. Two techniques are available for accessing a particular FormulaNode. The node may be accessed by line number, when the formula outline is being displayed. Alternatively, a FormulaNode may be accessed by traversing the tree of FormulaNodes (which are linked via the above-described parent/child pointers).

There are several local variables for the FormulaOutline. pBase stores a pointer to the base cell (i.e., the cell being edited). pNodes stores a pointer to the top level of the outline (i.e., the first level). pFocus is a pointer to the current focus in the outline (which is also the current subexpression being edited). StartsWithEqual is a boolean for flagging formula text which begins with a "=". Next, pComposerDialog stores a pointer to the current dialog. FollowStack is a stack for following (tracing) back to cells which are referenced in the formula.

With a basic understanding of the core data structures of the Composer, the reader may better understand the methods of the present for implementing the Composer.

D. Composer methods

Figure 6A:
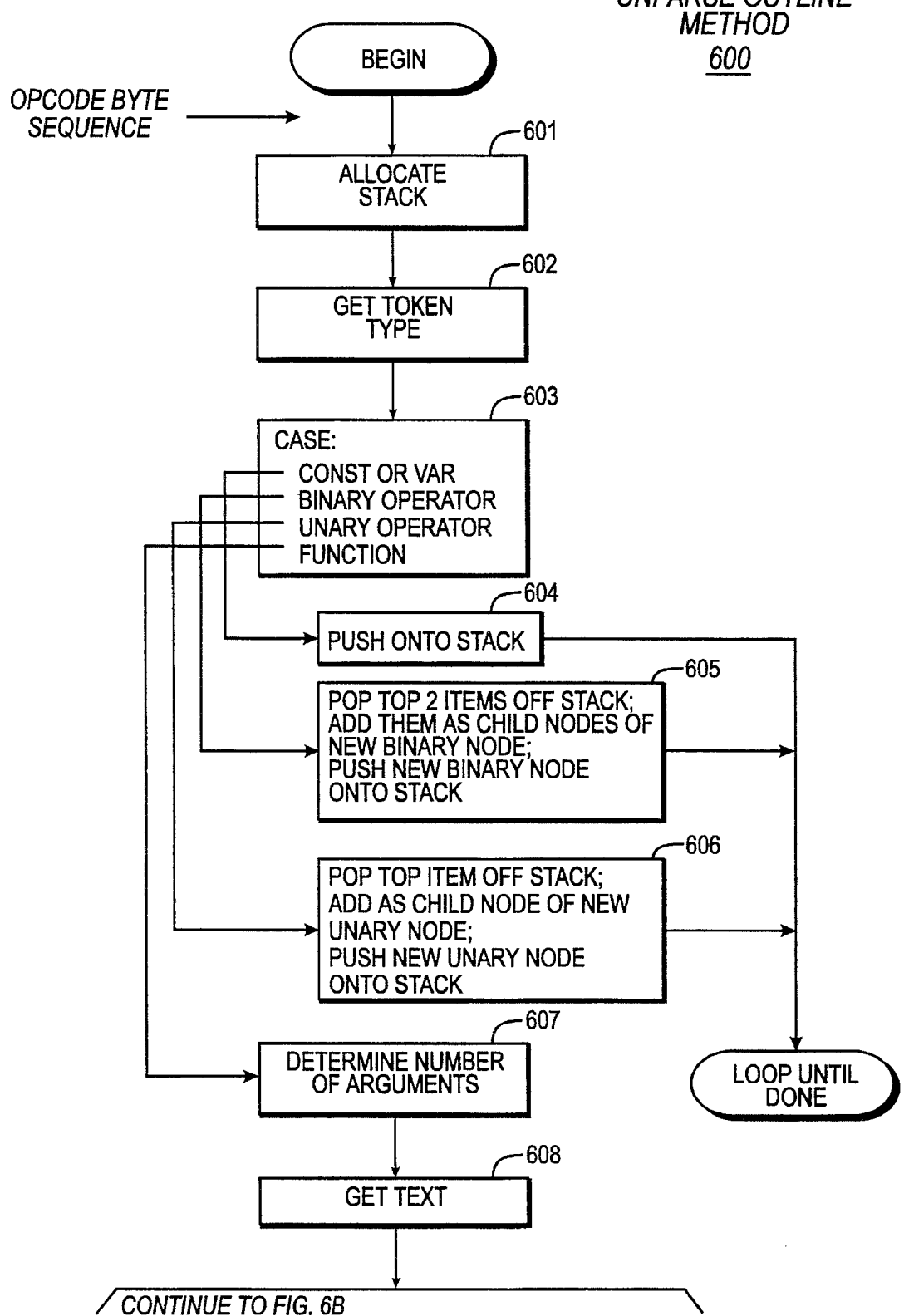
FIGS. 6A–B are a flow chart illustrating a method of the present invention for unparsing information to form a formula outline.
Figure 6B:
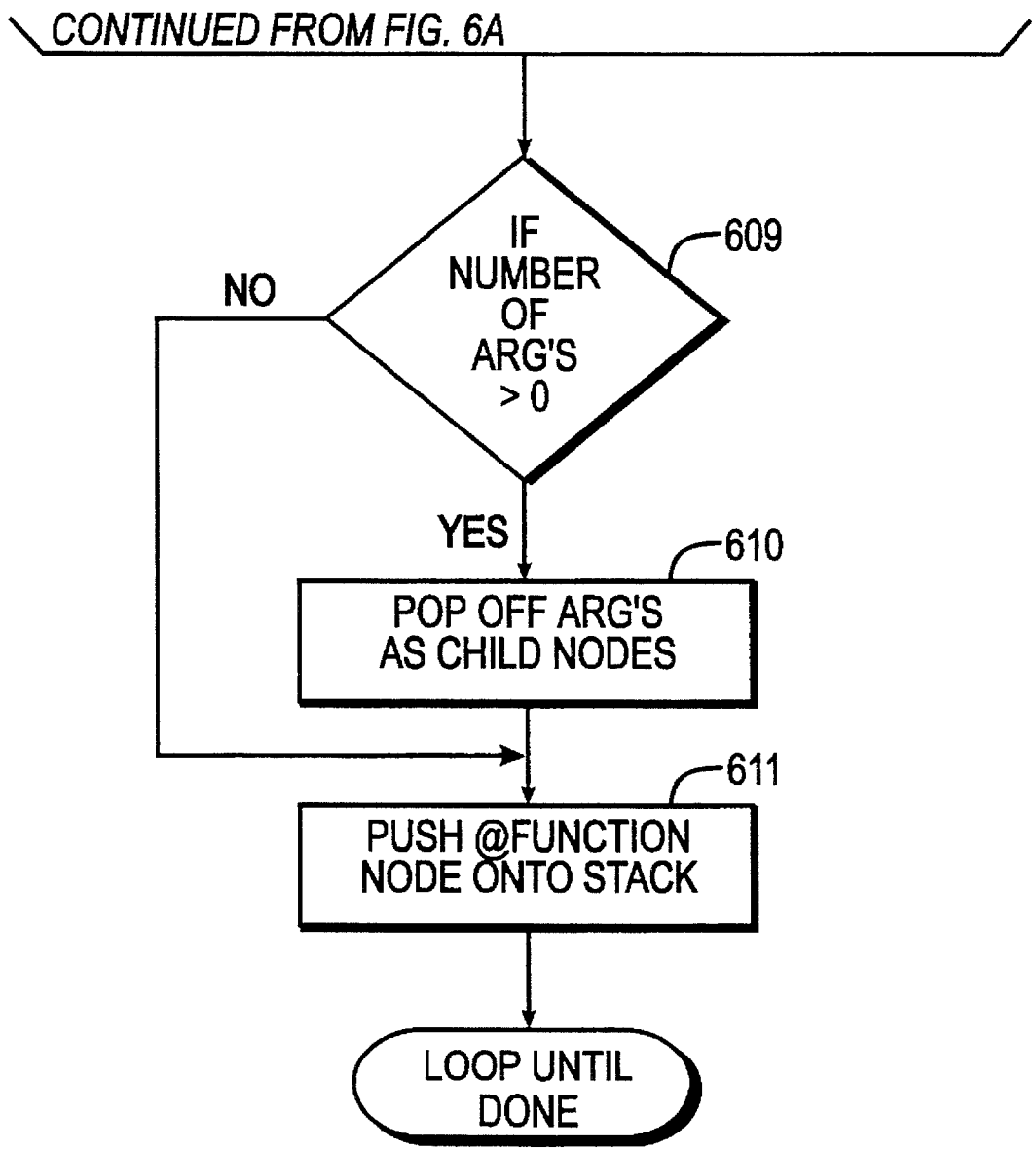

Exemplary methods of the Composer which implement the communication paths will now be described. In FIGS. 6A–B, Unparse Outline method 600 is illustrated. The method, which corresponds to path #1, takes a compiled expression (i.e., opcode byte sequence from the spreadsheet engine) and produces a formula outline. In general, the method sequentially processes the byte code stream produced by the spreadsheet engine and produces a tree structure of formula nodes, fully expanded, that reflect the instant formula expression. That tree of nodes might be the entire outline, or it might be just a subtree.

In a preferred embodiment, a change to the formula expression does not necessarily result in parsing/unparsing of the entire expression; instead, the process is usually isolated to the subexpression of interest. Not only is this more efficient, in terms of computational resources, but the approach also allows the system to maintain the formula outline even though a particular subexpression is syntactically incorrect. That portion which is incorrect is flagged with the red question mark icon, for indicating the problem to the user. By limiting parsing/unparsing to the parts which have changed, portions of the formula which are already syntactically correct are isolated from portions which are not syntactically correct (due to user editing).

The method proceeds as follows. Since the method is stack based, a portion of system memory is allocated for the stack, at step 601. The stack is used to push nodes onto the stack and then later pop off those nodes as sibling or children nodes of the current node of the tree being built. At step 602, the type of the next token is determined. Processing from this point on is dependent upon the token type. At step 603, if the token type is a constant (const) or variable (var), then a formula node corresponding to the token is pushed onto the stack at step 604. Constant is a literal number, such as a floating point or integer number. Variable is a cell reference (i.e., cell address).

If, on the other hand, the token type is a binary operator at step 603, then at step 605 the top two items are popped off the stack and are added as children nodes of a new binary node. This new binary node is then pushed onto the stack. For a unary operator at step 603, the process is generally the same, except that a single item is popped off the stack at step 606 and added as a child node of a new unary node; that new unary node is then pushed onto the stack.

If the token type at step 603 is a function, then the method proceeds to step 607 to determine the number of arguments for the function. This may be done using table lookup technique, or by fetching the next byte in the opcode stream (depending on what function the current function is). At step 608, the text (e.g., "@AVG(") is retrieved, for example, using a lookup table. At step 609, if the number of arguments for the function is greater than zero, then at step 610 the method pops that number of arguments off the stack and makes them children nodes of a new function node. At step 611, the function node is pushed onto the stack. At the conclusion of step 604, 605, 606, and 611, the method loops back to step 602 to get the next token, until all tokens have been processed. At the conclusion of the method, a tree structure has been created which represents the current formula expression (or selected portion).

Figure 7:
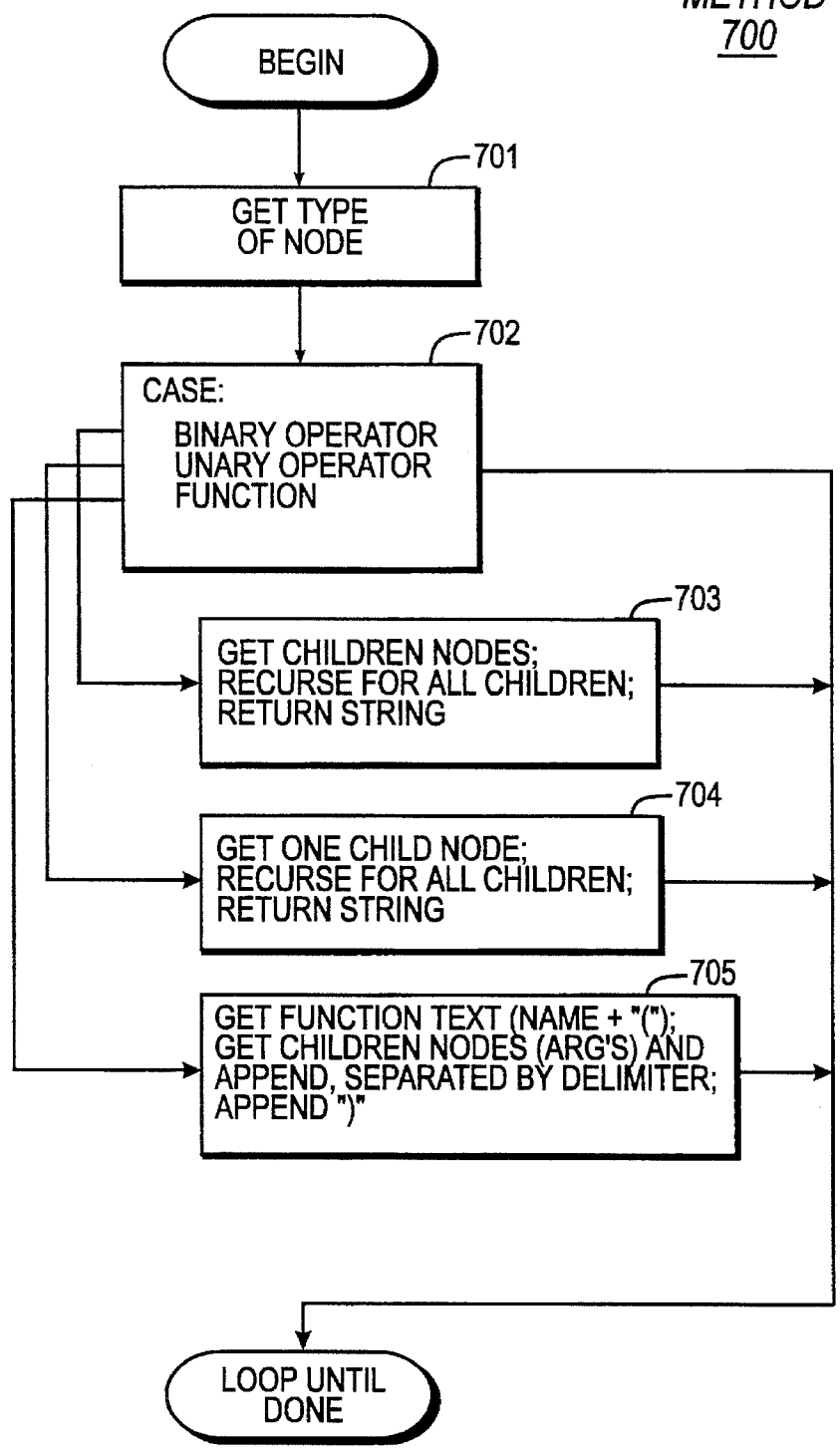
FIG. 7 is a flow chart illustrating a method of the present invention for creating a formula expression from a given formula outline (which is stored internally as a tree of formula nodes).

Referring now to FIG. 7, the reverse process—taking the formula outline and converting it into an expression—is illustrated. Get Expression method 700, which corresponds to path #2 of FIG. 5, traverses the tree recursively for generating the formula expression. Each node (C++ object) knows how to represent itself. Thus, the method may proceed recursively through the tree asking each node to represent itself.

The steps are as follows. At step 701, the type for the next node is determined. At step 702, the method proceeds down different paths based on node type. For a binary operator at step 702, the method proceeds to step 703 to get the children nodes (exactly two). As the children nodes may themselves have children nodes, the method proceeds recursively to enumerate all descendants. Once all have been enumerated, a string for the expression may be constructed, by effectively "gluing together" the substring text for the various children. If, on the other hand, the node is a unary operator at step 702, then at step 704 the method retrieves exactly one child node. Again, this child may itself have other children; therefore, the method proceeds recursively to enumerate all descendants. After all have been enumerated, an expression string may be constructed, as before.

If the node type at step 702 is a function, then at step 705 the method proceeds to retrieve the function name (e.g., from a lookup table), Then at step 705, children nodes for the function (i.e., nodes corresponding to the arguments for the function) are enumerated. Appropriate text for the arguments is then appended to the function name, with the individual arguments being separated by a delimited (e.g., ","). Finally, the expression for the function is completed by appending ")". The method proceeds to process other nodes in the tree until the appropriate expression has been generated. This expression may then be passed to the subexpression field for presentation to the user.

Before describing the next method, it is first necessary to review a Mode Library of the system, which provides support for the templates previously described. The Mode Library is a source file which is compiled and then preferably compressed (e.g., using commercially available compression utilities, which are available from several vendors). The Mode Library comprises information describing the various functions. At the highest level, the functions are organized by category (e.g., financial, statistical, and the like). Each entry for a function stores the text name of the function, such as "PMT", "IRR", and the like. At a third level, the Mode Library stores "modes." Each mode corresponds to a particular template for the function. The PMT function, for instance, has two modes: PMT1 and PMT2. If a function has only one mode, then only one mode is listed. The Mode Library file is indexed by mode (which is particularly important for path 6).

The modes operate as follows. For a given subexpression (from the Subexpression Field), the system proceeds to the Mode Library to look up the mode which fits that subexpression. The modes themselves basically comprise text strings. With reference to FIG. 8A, the construction of mode strings will be described. As shown, the PMT function has two modes and, thus, two mode expressions. As shown, mode 1 has the general format of:

@PMT(\1, \2, \3)

"\1" is an escape sequence character serving as a place holder for the first input field. Similarly, "\2" and "\3" are second and third input place holders, respectively. For mode 1, therefore, placement of argument information in the function is achieved by simple substitution of an escape sequence character with its corresponding input expression.

As shown in mode 2 for the PMT function, however, the mode expression may include addition information for each argument. Specifically, the second argument for the mode 2 expression also includes "/12" shown at 821. In a similar fashion, the third argument includes "*12" shown at 823. As before, the escape sequence characters are substituted for input field information. Note particularly that escape sequence characters correspond to particular input fields, but not necessarily arguments. Information separated by delimiters (e.g., "\2/12"), on the other hand, correspond to arguments.

The general approach to matching a subexpression with a mode expression may be done using conventional pattern matching technique, such as scoring. A subexpression which exactly matches a mode expression receives the highest score. For example, to match mode 2 of the PMT function, a method would first look for an "@PMT(", and then look for a "," followed by a "/12,". Finally, the method looks for an "*12)". In this manner, the Mode Library serves as a knowledge base for storing various templates—one designed to eliminate common user input mistakes. Applying conventional heuristic technique, subexpressions may be matched to the most appropriate template (mode expression) for that function. Those skilled in the art will appreciate that other pattern matching methodology may be applied in this manner, as taught by the present invention.

For path #6, therefore, the system determines the mode based on the above-described pattern matching. Each mode entry in the Mode Library, in turn, contains all the information necessary for constructing the relevant function pane. In particular, a mode entry stores a name of the function, paragraph (descriptive) text, and input fields (using the above-described escape sequence characters).

Figure 8B:
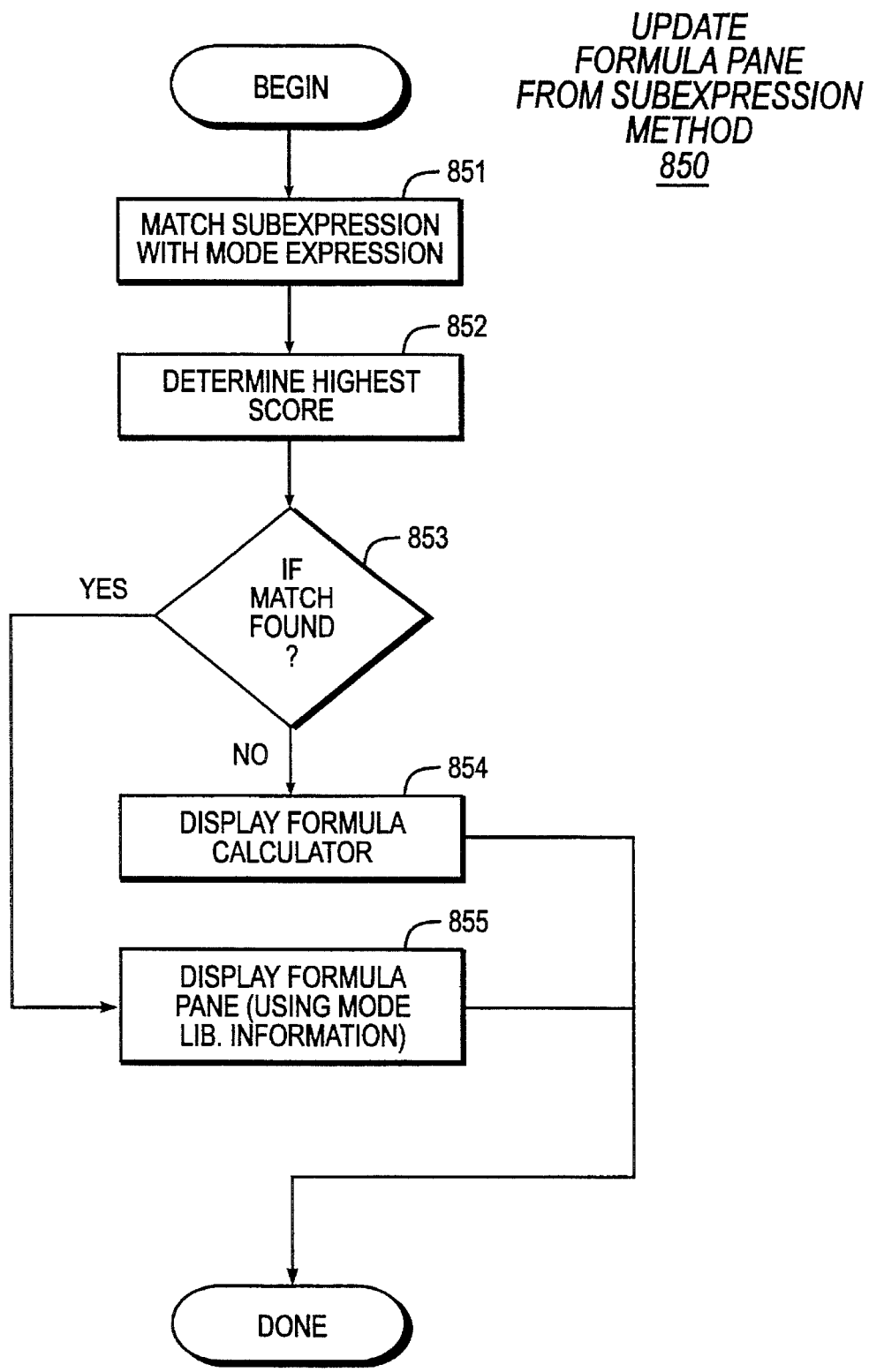
FIG. 8B is a flow chart illustrating a method of the present invention for updating the Formula Pane from a formula expression which is stored in the Subexpression Edit Field.

The method, Update Formula Pane from Subexpression method 850, may be summarized by the steps shown in FIG. 8B. At step 851, the subexpression is matched against the various mode expressions in the Mode Library. At step 852, the best match is determined based upon the highest score of matching (i.e., correlation between substrings). If a match has not been found at step 853, then the method proceeds to step 854 to display the Formula Calculator (in the area normally occupied by the Formula Expert). In other words, if a formula cannot be identified in the subexpression, the system defaults to just displaying the Formula Calculator. If, on the other hand, a match is found at step 853, then the method proceeds to step 855 to display the appropriate Formula Expert for this formula, using the Mode Library information (described above). At the conclusion of step 854 or 855, the method has completed.

Path #5 is essentially the reverse of path #6. In other words, when the user changes information in a formula input field (in the Formula Pane), the system need only take that information and substitute it for the appropriate escape sequence character in the current mode expression (template). Once this has been done, the system may then simply return the expression from the Formula Pane to the Subexpression Field, for display to the user.

Finally, path #3 and path #4 will be described. In a preferred embodiment, path #4 is actually performed by simply combining path #2 with path #6. In other words, a change to the Formula Outline Pane is propagated to the Function Pane by first propagating the change to the Subexpression Field (path #2). From there, the change is then propagated to the Function Pane (path #6).

Figure 9:
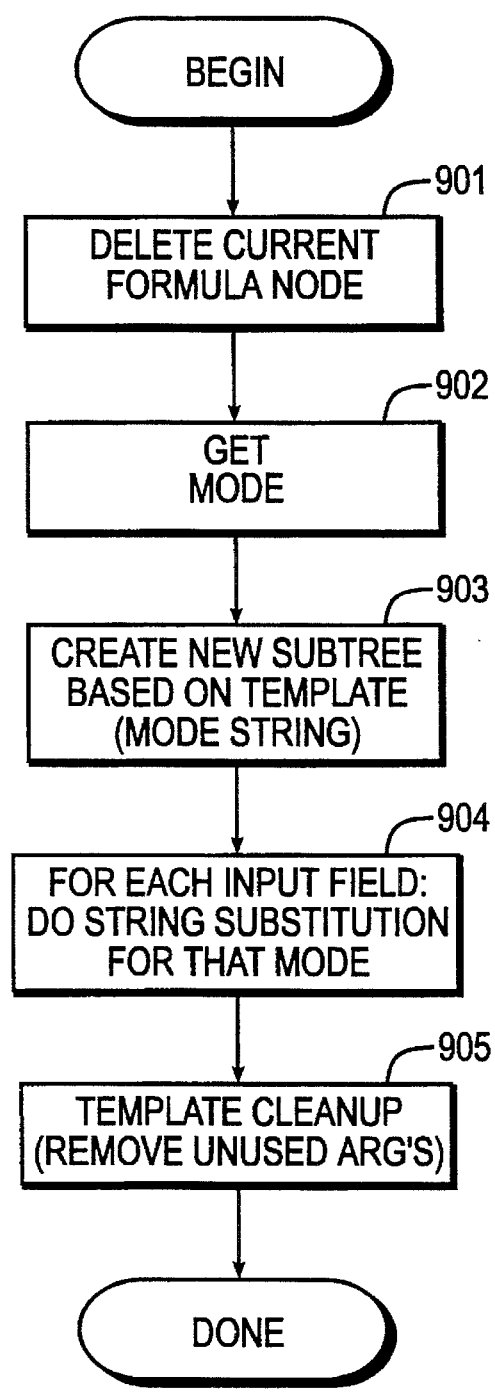
FIG. 9 is a flow chart illustrating a method of the present invention for updating a formula outline from a change which has occurred in the Formula Pane.

Path #3, on the other hand, is not a combination of path #5 and path #1. Instead, the method is implemented as illustrated in FIG. 9. As previously illustrated in FIG. 8A, for some functions the input fields do not necessarily correspond to the arguments for the function. In mode number 2 for the PMT function, for instance, the input fields correspond to \1, \2, and \3. The arguments, however, correspond to \1, \2/12, and \3*12. Hence, there is not necessarily a one-to-one correspondence between function input fields and function arguments. As a result, path #3 cannot be achieved by simply using path #5 in conjunction with path #1.

Path #3 is implemented to focus on the current node (i.e., function) being edited by the user. Since the change is occurring in a Function Pane, a current mode (i.e., particular mode expression) is active and is known to the system. Therefore, the approach adopted by the system is to rewrite the active node in the outline using the current mode expression.

Referring now to FIG. 9, an Update Outline from Pane method 900 will now be described. At step 901, the method deletes the current formula node from the outline, since this node will be essentially regenerated entirely from the mode expression. At step 902, the method gets the current mode which is active. At step 903, a new subtree is created based upon the template (mode expression) for the current mode. Next, at step 904, for each input field, the method performs a string substitution, for that argument. At step 905, template cleanup is performed, removing any arguments which were not used. At this step, any exception conditions (e.g., invalid arguments) may be handled accordingly. At the conclusion of the step, the method is done.

Attached hereto is a Source Code Appendix containing C/C++ source code listings, providing further description of the invention. A suitable C/C++ development environment for compiling and linking the code is available from several vendors, including Borland International of Scotts Valley, Calif.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

Source Code Appendix
Borland Atty. Doc. No. 142
Copyright © 1994 Borland International Copyright © 1994 Borland International

```
/*
 * UnparseO.CPP
 * Formula Unparser/Outine - creates outline used by Formula Composer
 * Copyright (c) 1994, Borland International, Inc.
 */ ifndef UNPARSEO_FILE
define UNPARSEO_FILE
#    include "QPW.SEG"
endif include "usual.hpp"
include "ssusual.hpp"
#include "ssrefO.hpp"
#include "sscref.hpp"
#include "ssrange.hpp"
#include "ssname.hpp"
#include "ssentry.hpp"
#include "notebook.hpp"
#include "strutil.hpp"
#include "formula.hpp"
#include "Parser.HPP"
#include "parsetab.hpp"
#include "eval.hpp"
#include "FunK.HPP"
#include "EvalChar.HPP"
#include "Toast.HPP"

#ifndef _OUTLINE_HPP
include "Outline.HPP"
endif ifndef _FOUTLINE_HPP
include "FOutline.HPP"
endif ifndef _UNPARSER_HPP
include "UnParser.HPP"
endif define DSMAX (((MAXLABEL*3)/2)+1)

// outline unparser class definition
class OutlineUnparser {
    public:

private:
        INDEX DS;
        LPFormulaNode NodeStack[DSMAX];
        OutlineUnparser();

void PushNode(LPFormulaNode pFO);
        LPFormulaNode PopNode();

public:
        LPFormulaNode Unparse(
                        LPFormulaOutline pFO,   // pointer to formula
        composer        LPSTR p,
                        LPSSRef r,
                        LPSSCellRef pCR,
                        BOOL DisplayNames);
};

/*---------------------------------------
 * Constructor for OutlineParser
 */
OutlineUnparser::OutlineUnparser()
{
    DS = 0;
}
/*---------------------------------------
 * Push an outline onto the NodeStack
 */
void OutlineUnparser::PushNode(LPFormulaNode pFO)
{
    NodeStack[DS++] = pFO;
}
/*---------------------------------------
 * Pop an outline from the NodeStack
 */
```

Copyright © 1994 Borland International

```
LPFormulaNode OutlineUnparser::PopNode()
{
    return NodeStack[-DS];
}
/*
 * Convert a character to a string - somewhat dangerous due to
 * use of static buffer
 */
LPSTR tostr(char c)
{
    static char twoc[2];
    twoc[0] = c;
    twoc[1] = '\0';
    return &twoc[0];
}
//----------------------------------------------------------------
LPFormulaNode OutlineUnparser::Unparse(
        LPFormulaOutline pFO,
composer
        LPSTR p,                        // pointer to formula
        LPSSRef r,
pointer to formula byte codes
pointer to reference byte codes
        LPSSCellRef pCR,
base cell address
        BOOL DisplayNames)
{
    LPSTR MyText;
    unsigned char OpCode;
    BOOL done = FALSE;
    unsigned long Template;
    WORD i;
    char *s;
    char WorkBuffer[MAXSTRL];
    BOOL DisplayAsRanges;
    LPSTR Saver = (LPSTR) r;

LPFormulaNode pTop,pNew;

while(!done) switch(OpCode = *p++) {
        case OpHalt:
            assert(FALSE);
            break;

case OpPushZero:
            pNew = new FormulaNode("", NodeTypeZero, pFO);
            PushNode(pNew);
            break;

case OpPushIntConstant:
            WorkBuffer[0] = CHEOS;
            p = UnparseIntegerConstant(p, WorkBuffer, MAXSTRL);
makeAnOutline:
            pNew = new FormulaNode(WorkBuffer, NodeTypeLeaf, pFO);
PushNode:
            if(pNew) {
                PushNode(pNew);
            }
            break;

case OpPushFloatConstant:
            WorkBuffer[0] = CHEOS;
            p = UnparseDoubleConstant(p, WorkBuffer, MAXSTRL);
            goto makeAnOutline;

case OpPushStringConstant:
            WorkBuffer[0] = CHEOS;
            p = UnparseStringConstant(p, WorkBuffer, MAXSTRL);
            goto makeAnOutline;

case OpPushVarByValue:
            DisplayAsRanges = FALSE;
            goto UnparseEitherReference;

case OpPushVarByReference:
            DisplayAsRanges = TRUE;

UnparseEitherReference: {
            LPSSRef pThisRef = r;
            (LPSTR)r += SSREF_SizeOf( r );
```

Copyright © 1994 Borland International

```
                    if(DisplayNames) {
                        if(ConvertToBlockOrCellName(pThisRef, pCR,
WorkBuffer,                                    MAXSTRL, TRUE) {
                            goto makeAnOutline;
                        }
                    else {   // !DisplayNames
                        if(ConvertFromBlockOrCellName(pThisRef, pCR,
DisplayAsRanges, WorkBuffer)) {
                            goto makeAnOutline;
                        }
                    }
                    LPSTR pLastCh = SSREF_String(pThisRef, pCR, WorkBuffer,
MAXSTRL) - 1;
                    if((*WorkBuffer == CHLPREN) && (*pLastCh == CHRPREN))
                    {
                        *pLastCh = CHEOS;
                        pNew = new FormulaNode(WorkBuffer+1,
NodeTypeLeaf, pFO);
                    }
                    else {
                        pNew = new FormulaNode(WorkBuffer,
NodeTypeLeaf, pFO);
                    }
                    goto PushNode;

case OpParenthesis:
                    // get the top item on the stack and append a paren to it
                    pNew = new FormulaNode(tostr(CHLPREN),NodeTypeParens,
pFO);
                    pTop = PopNode();
                    pNew->AppendChild(pTop);
                    PushNode(pNew);
                    break;

case OpNegate:
                case OpPlus:
                case OpNot:
                                            pTop = PopNode();
                                            pNew = new FormulaNode(OText[OrdTabl[OpCode -
OpOperatorBase]],
                                                    NodeTypeUnary, pFO);
                                            pNew->AppendChild(pTop);
                                            PushNode(pNew);
                                            break;

case OpAdd:
                case OpSubtract:
                case OpMultiply:
                case OpDivide:
                case OpPower:
                case OpEqual:
                case OpNotEqual:
                case OpLessEqual:
                case OpGreaterEqual:
                case OpLess:
                case OpGreater:
                case OpAnd:
                case OpOr:
                case OpConcatenate:
                                            pNew = new FormulaNode(OText[OrdTablOpCode -
OpOperatorBase]],
                                                    NodeTypeBinary, pFO);
                                            pTop = PopNode();
                                            pNew->PrefixChild(pTop);
                                            pTop = PopNode();
                                            pNew->PrefixChild(pTop);
                                            PushNode(pNew);
                                            break;

case OpEOF:
                                            done = TRUE;
                                            break;

case OpDLLFun: {
                                            i = *p++;                       // get arg
count
```

3

Copyright © 1994 Borland International

```
#if (TRANS_VERSION)
                DLLFunctionHandle FunHand( *(LPNRHandle)p );
                p += sizeof(NRHandle);
                LPSTR pName = FunHand.TranslatedName();
#else
                LPSTR pName = FunHand.FunName();
#endif
                StrCopy(WorkBuffer, MAXSTRL, tostr(CHATSIGN));
                if((FunHand.FunPtr()->Flags & FunFlagInternal) == 0) {
                    StrCat(WorkBuffer, MAXSTRL, FunHand.DLLName());
                    StrCat(WorkBuffer, MAXSTRL, tostr(CHDOT));
                }
                StrCat(WorkBuffer, MAXSTRL, pName);

// at this point, pNew = "@FOO" or "@FOO.BAR"
                if(i > 0)
                    goto AppendArguments;
                else {
                    pNew = new FormulaNode(WorkBuffer,
                                            NodeTypeLeaf, pFO);
                    PushNode(pNew);
                    break;
                }

// ignore all extended, no-operand opcodes:
            case OpExtendedNoOperands:
                p += 1;
                break;

case OpExtendedOperands: {
                unsigned char EOpCode = *p++;
                LPSTR pData = p;
                WORD ByteCount = *((WORD *)p)++;
                p += ByteCount;
                if(EOpCode == ExOpPushArrayConstant) {
                    WorkBuffer[0] = CHEOS;
                    UnparseArrayConstant(pData, WorkBuffer, MAXSTRL);
                    pNew = new FormulaNode(WorkBuffer,
                                            NodeTypeLeaf, pFO);
                    PushNode(pNew);
                }
                break;
            }
            case OpAvailable_4:
            case OpAvailable_5:
                assert(FALSE);
                break;

default:
                // here for functions
                assert(OpCode <= (FordLast + OpAtFunctionBase)); // last legal
                                                                  // opcode
                // determine number of arguments
                Template = FuncTemplates[OpCode-OpAtFunctionBase];
                if(Template & LISTFUNC) {
                    i = *p++;
                }
                else {
                    i = (Template & MAXARGS) >> 16;
                }

// get text for this function
                MyText = FText(OpCode-OpAtFunctionBase);
                StrCopy(WorkBuffer, MAXSTRL, tostr(CHATSIGN));
                StrCat(WorkBuffer, MAXSTRL, MyText);

// here for functions which take no arguments
                if(i == 0) {
                    pNew = new FormulaNode(WorkBuffer,
                                            NodeTypeLeaf, pFO);
                    PushNode(pNew);
                    break;
                }

AppendArguments:
                // input here is Workbuffer - which needs to a a left paren
                // added and ')' which has the argument count
```

4

Copyright © 1994 Borland International

```
              StrCat(WorkBuffer, MAXSTRL, tostr(CHLPREN));        delete pU;
              pNew = new FormulaNode(WorkBuffer, NodeTypeFunction,  }
pFO);                                                             return pRet;
              while(i-- > 0) {                                    }
                   pTop = PopNode();
                   if(pTop->Type != NodeTypeZero) {
                        pNew->PrefixChild(pTop);
                   }
                   else {
                        // delete optional argument:
                        delete pTop;
                   }
                   PushNode(pNew);
                   break;
              }

// Do something with comment
pFO->InstallComment(p, Saver - p);

return PopNode();
}
//
// Convert a formula to a string.
//      Return the pointer to the end of the conversion.
//      Where wMax is the max size of string pointed by pStr.
//      Assert: pCR != NULL; pStr != NULL; wMax >= 1;
LPFormulaNode Formula::UnparseOutline(
              LPSSCellRef pCR,                          // base cell
reference
              BOOL DisplayNames,                        // TRUE if we should
display names
              LPFormulaOutline pFO)                     // pointer to formula
composer
{
OutlineUnparser *pU = new OutlineUnparser();
LPFormulaNode pRet = NULL;
if(pU) {
              pRet = pU->Unparse(pFO, &formula[0],
(LPSSRef)&formula[wRefPosI, pCR, DisplayNames];
```

```
/*
 * FOutLine.CPP
 * Copyright (c) 1994, Borland International, Inc.
 */ define FOUTLINE_FILE
include "QPW.SEG"

#ifndef _PROGRAM_HPP
#include "Program.HPP"
endif ifndef _PROPERTY_HPP
include "Property.HPP"
endif ifndef _USUAL_HPP
include "Usual.HPP"
endif ifndef _SSCREF_HPP
include "SSCRef.HPP"
endif ifndef _OUTLINE_HPP
include "Outline.HPP"
endif ifndef _FOUTLINE_HPP
include "FOutline.HPP"
endif ifndef _STRUTIL_HPP
include "StrUtil.HPP"
endif ifndef _ERRMSG_HPP
include "ErrMsg.HPP"
#endif

Copyright © 1994 Borland International ifndef _EVALCHAR_HPP
include "EvalChar.HPP"
endif ifndef _PARSETAB_HPP
include "ParseTab.HPP"
endif ifndef _FORMULA_HPP
include "Formula.HPP"
endif ifndef _NOTEBOOK_HPP
include "Notebook.HPP"
endif ifndef _EDITTEXT_HPP
include "EditText.HPP"
endif ifndef _SSENTRY_HPP
include "SSEntry.HPP"
endif ifndef _CMDCOMPO_HPP
include "CmdCompo.HPP"
endif ifndef _CMDUTIL_HPP
include "CmdUtil.HPP"
endif ifndef _COMPODLG_HPP
include "CompoDlg.HPP"
endif ifndef _CUI_HPP
include "CUI.HPP"
#endif
```

Copyright © 1994 Borland International

```
#define STRINGS
#include "resource.h"

// return range names in a list
extern void GetRangeNames(WORD nbldx, SList *pList, BOOL AppendDefs);

// convert a character to a single character string
extern LPSTR tostr(char c);

union ParserReturn {
    DWORD dword;
    struct {
        WORD errorsize;
        FML_FMLSTATE fmlstate;
    } parts;
};

CacheEntry *FormulaOutlineCache = NULL;
extern BOOL bUndefinedOkay;
extern BOOL bIgnoreNB;        // from SSRef0.cpp /*------------------------------------------------
 * construct a dynamic string
 */
DynamicString::DynamicString(LPSTR pStr)
{
    pString = NULL;
    if(pStr) {
        Replace(pStr);
    }
}
/*------------------------------------------------
 * return a LPSTR
 */
LPSTR DynamicString::p()
{
    return pString;
}
/*------------------------------------------------
 * destroy a dynamic string
 */
```

```
#ifndef _CUIQUERY_HPP
#include "CUIQuery.HPP"
endif ifndef _CMDCELL_HPP
include "CmdCell.HPP"
endif ifndef _CURRENT_HPP
include "Current.HPP"
endif ifndef _SLIST_HPP
include "SList.HPP"
endif ifndef _MODELIB_HPP
include "ModeLib.HPP"
endif ifndef _POINTMDE_HPP
include "PointMde.hpp"
endif ifndef _CMDSVC_HPP
include "cmdsvc.hpp"
endif ifndef _NBWIN_HPP
include "nbwin.hpp"
endif ifndef _CFRAME_HPP
include "cframe.hpp"
endif ifndef _CDESK_HPP
include "cdesk.hpp"
#endif
```

Copyright © 1994 Borland International

```
DynamicString::~DynamicString()
{
    Delete();
}
/*
 * delete the dynamic string
 */
void DynamicString::Delete()
{
    if(pString) {
        delete pString;
        pString = NULL;
    }
}
/*
 * replace the current dynamic string with another
 * different string
 */
void DynamicString::Replace(LPSTR pStr)   // replaces with a
{
    if(pString) {
        Delete();
    }
    if(pStr) {
        WORD Len = min(StrLen(pStr), MAXLABEL) + 1;
        pString = new char [Len];
        if(pString == NULL) {
            ThrowErr(eid_MemFull);
        }
        StrCopy(pString, Len, pStr);
    }
}
/*
 * Append a string to a dynamic string
 */
void DynamicString::Append(LPSTR pAppend)
{
    if(pString) {
        WORD Len = min(StrLen(pString) + StrLen(pAppend), MAXLABEL) + 1;
        LPSTR pNew = new char [Len];
        if(pNew == NULL) {
            ThrowErr(eid_MemFull);
        }
        StrCopy(pNew, Len, pString);
        StrCat(pNew, Len, pAppend);
        delete pString;
        pString = pNew;
    }
    else {
        Replace(pAppend);
    }
}
/*
 * Prefix the expression with a string
 */
void DynamicString::Prefix(LPSTR pPrefix)
{
    if(pString) {
        WORD Len = min(StrLen(pString) + StrLen(pPrefix), MAXLABEL) + 1;
        LPSTR pNew = new char [Len];
        if(pNew == NULL) {
            ThrowErr(eid_MemFull);
        }
        StrCopy(pNew, Len, pPrefix);
        StrCat(pNew, Len, pString);
        delete pString;
        pString = pNew;
    }
    else {
        Replace(pPrefix);
    }
}
/*
 * move a dynamic string to a LPSTR
 */
LPSTR DynamicString::RelinquishString()
{
    LPSTR pStr = pString;
    pString = NULL;
    return pStr;
}
/*
 * Create a new node
```

Copyright © 1994 Borland International

```
/*
*/
FormulaNode::FormulaNode(
    LPSTR pStr,                    // pointer to string for this node
    NodeType T,                    // the type of node
    LPFormulaOutline pFC)          // pointer to the formula composer
{
Type = T;
NodeText.Replace(pStr);
pOutline = pFC;
pSibling = NULL;
pChildren = NULL;
pParent = NULL;
}
/*
* read a new formula node from a buffer
*/
FormulaNode::FormulaNode(
    LPSTR pBuf,                    // pointer to the buffer we read
from
    WORD Size,                     // size of buffer
    WORD *pWhere,                  // pointer to current offset inside
buffer
    LPFormulaOutline pFC)          // pointer to outline
{
Type = (NodeType)pBuf[*pWhere];
if(Type == NodeFocusHere) {
    pFC->pFocus = this;
    (*pWhere) += 1;
    Type = (NodeType)pBuf[*pWhere];
    }
pOutline = pFC;
pSibling = NULL;
pChildren = NULL;
pParent = NULL;
LPSTR p = pBuf + (*pWhere) + 1;
NodeText.Replace(p);
(*pWhere) += (2 + StrLen(p));
}

/*
 * write all the children
 */
BOOL FormulaNode::Write(LPSTR pBuf, WORD Max, WORD *pWhere)
{
// make sure there is enough room for us in the buffer
WORD TextLen = StrLen(NodeText.p());
if((*pWhere + TextLen + 1 + 1 + 1 + 1) < Max) {

// do we have focus?
    if(this == pOutline->pFocus) {
        pBuf[(*pWhere)++] = (char) NodeFocusHere;
        }

// write this node
    pBuf[(*pWhere)++] = (char) Type;
    StrCopy(pBuf + *pWhere, Max - *pWhere, NodeText.p());
    *pWhere += TextLen + 1;

// are there children?
    if(pChildren) {
        LPFormulaNode pKid = pChildren;
        pBuf[(*pWhere)++] = (char) NodeStartChildren;
        for(pKid = pChildren; pKid != NULL; pKid = pKid->pSibling) {
            if(!pKid->Write(pBuf, Max, pWhere)) {
                return FALSE;
                }
            }
        pBuf[(*pWhere)++] = (char) NodeEndChildren;
        }
    return TRUE;
    }
return FALSE;                      // not enough room in the buffer
}
/*
 * read all the children into a formula node
 */
BOOL FormulaNode::ReadChildren(LPSTR pBuf, WORD Size, WORD *pWhere)
{
if(*pWhere < Size) {
    // the very next thing in the buffer should be NodeStartChildren
```

Copyright © 1994 Borland International

```
    if((NodeTypelpBuf[(*pWhere)++] == NodeStartChildren) {
        while(*pWhere < Size) {
            LPFormulaNode pNew = new FormulaNode(pBuf, Size,
pWhere, pOutline);
            if(pNew == NULL) {
                ThrowErr(eid_MemFull);
            }
            AppendChild(pNew);
            if((NodeTypelpBuf[*pWhere] == NodeStartChildren) {
                if(!pNew->ReadChildren(pBuf, Size, pWhere))
                    return FALSE;
            }
            if((NodeTypelpBuf[*pWhere] == NodeEndChildren) {
                (*pWhere) += 1;
                return TRUE;               // yes, the kids are
well read
            }
        }
        return FALSE;                      // premature end of
buffer
    }
    return FALSE;                          // didn't start with start
children
    }
    return TRUE;                           // there were no kids in the
buffer
}
/*
* destroy a formula node (and all children)
*/
FormulaNode::~FormulaNode()
{
    Collapse();                            // deletes the kids
}
/*
* append a child to the end of the children
*/
void FormulaNode::AppendChild(LPFormulaNode pFN)
{
    pFN->pParent = this;
    // are there any kids?
    if(pChildren == NULL) {
        pChildren = pFN;
    }
    else {
        LPFormulaNode pKids = pChildren;
        while(pKids->pSibling != NULL) {
            pKids = pKids->pSibling;
        }
        pKids->pSibling = pFN;
    }
}
/*
* add a child to the begining of the list of children
*/
void FormulaNode::PrefixChild(LPFormulaNode pFN)
{
    pFN->pParent = this;
    // are there any kids?
    if(pChildren == NULL) {
        pChildren = pFN;
    }
    else {
        LPFormulaNode pKids = pChildren;
        pChildren = pFN;
        pFN->pSibling = pKids;
    }
}
/*
* Change the expression at a particular node
*/
void FormulaNode::ChangeExpression(LPSTR pNewExpression)
{
    DeleteChildren();
    NodeText.Replace(pNewExpression);
    Type = NodeTypeUnknown;
    Expand(TRUE);                          // show fully nasty expanded expression
}
```

10

Copyright © 1994 Borland International

```
/*-----------------------------------------
 * Change the current node if it is a function node
 */
void FormulaNode::ChangeFunction(LPSTR pNewExpression)
{
if(Type == NodeTypeFunction) {
    NodeText.Replace(pNewExpression);
} }
/*-----------------------------------------
 * Delete the current children
 */
void FormulaNode::DeleteChildren()
{
LPFormulaNode pFN;
LPFormulaNode pNext;
for(pFN = pChildren; pFN != NULL; pFN = pNext) {
    // collapse the child
    pFN->Collapse();
    // get pointer to next child
    pNext = pFN->pSibling;
    // delete this child
    delete pFN;
    }
pChildren = NULL;          // all the kids have moved away
}
/*-----------------------------------------
 * Determine the precedence of an operator
 */
static WORD GetPrec(LPSTR OpText, BOOL IsBinary)
{
WORD Which;
for(Which = 0; OText[Which] != NULL; Which++) {
    if(StrICmp(OText[Which], OpText) == 0) {
        return IsBinary ? BinaryPrec[Which] : UnaryPrec[Which];
} }
return 0;
}
/*-----------------------------------------
 * Test for special cases requiring auto-adding of parenthesis
 */
BOOL FormulaNode::TestForAutoParen(BOOL IsBinary)
{
BOOL Ret = FALSE;
if(pParent) {
    WORD OurPrec = GetPrec(NodeText.p(), IsBinary);
    WORD ParentPrec = 0;
    if(pParent->Type == NodeTypeBinary) {
        ParentPrec = GetPrec(pParent->NodeText.p(), TRUE);
        }
    else {
        if(pParent->Type == NodeTypeUnary) {
            ParentPrec = GetPrec(pParent->NodeText.p(), FALSE);
        } }
    if(ParentPrec > OurPrec) {
        Ret = TRUE;
        }
    } }
return Ret;
}
/*
 * return a pointer to the collapsed form of a node - don't
 * collapse the node though
 */
LPSTR FormulaNode::GetExpression()
{
DynamicString Ret(NULL);

if(     (   pOutline->pNodes == this    ) &&
            pOutline->StartsWithEqual &&
            pOutline->pNodes->pChildren         ) {
    Ret.Append("=");
    } switch(Type) {
    case NodeTypeBinary: {
        LPFormulaNode pLeft = pChildren;
        if(pLeft) {
            LPSTR pLeftStr = pLeft->GetExpression();
            if(pLeftStr) {
                LPFormulaNode pRight = pLeft->pSibling;
                if(pRight) {
```

Copyright © 1994 Borland International

```
pRight->GetExpression();
                    LPSTR pRightStr =
                                if(pRightStr) {
    BOOL AutoParenForSteven = TestForAutoParen(TRUE);
    if(AutoParenForSteven) Ret.Append("(");
                                    Ret.Append(pLeftStr);
                                    Ret.Append(NodeText.pl));
                                    Ret.Append(pRightStr);
    if(AutoParenForSteven) Ret.Append(")");
                                    delete pRightStr;
                            } }
                    delete pLeftStr;
        break;
        }
case NodeTypeUnary: {
    LPFormulaNode pOperand = pChildren;
    if(pOperand) {
            LPSTR pOpStr = pOperand->GetExpression();
            if(pOpStr) {
    BOOL AutoParenForSteven = TestForAutoParen(FALSE);
    if(AutoParenForSteven) Ret.Append("(");
                    Ret.Append(NodeText.pl));
                    Ret.Append(pOpStr);
    if(AutoParenForSteven) Ret.Append(")");
                    delete pOpStr;
            } }
        break;
        }
case NodeTypeFunction: {
        Ret.Append(NodeText.pl));
        LPFormulaNode pArg;
        for(pArg = pChildren; pArg != NULL;
pArg = pArg->pSibling) {
            LPSTR pArgStr = pArg->GetExpression();
            if(pArgStr) {
                    Ret.Append(pArgStr);
                    delete pArgStr;
            }
            if(pArg->pSibling) { // at least one more
                    Ret.Append(tostr(GBL_ArgumentSep));
                    // changed from chComma MJW 7/13
            }
            else {
                    Ret.Append(tostr(CHRPREN));
            } }
        break;
        }
case NodeTypeParens: {
        LPFormulaNode pOperand = pChildren;
        if(pOperand) {
            LPSTR pOperandStr = pOperand->GetExpression();
            if(pOperandStr) {
                    Ret.Append(NodeText.pl));
                    Ret.Append(pOperandStr);
                    Ret.Append(tostr(CHRPREN));
            } }
        break;
        }
default: {
        Ret.Append(NodeText.pl));
        } }
if( (pOutline->pNodes == this) &&
        pOutline->pComment &&
        pOutline->pNodes->pComment) {
    Ret.Append(";");
    Ret.Append(pOutline->pComment);
} return Ret.RelinquishString();
}
/* ------------------------------------------
 * collapse a particular node
```

12

Copyright © 1994 Borland International

```c
*/
void FormulaNode::Collapse()
{
    switch(Type) {
        case NodeTypeBinary:
        case NodeTypeUnary:
        case NodeTypeFunction:
        case NodeTypeParens:
            LPSTR p = GetExpression();
            NodeText.Replace(p);
            DeleteChildren();
            Type = NodeTypeCollapsed;
            break;
    }
}
/*
 * replace the current node with a new one
 * don't make any changes to pParent or pSiblings
 */
void FormulaNode::Replace(LPFormulaNode pNew)
{
    // delete children
    DeleteChildren();
    pChildren = pNew->pChildren;
    pNew->pChildren = NULL;

// delete expression
    NodeText.Replace(pNew->NodeText.p());

// update type information
    Type = pNew->Type;

// make all the children look up at us as their parent
    LPFormulaNode pFN;
    for(pFN = pChildren; pFN != NULL; pFN = pFN->pSibling) {
        pFN->pParent = this;
    }
}
/*
 * expand the node
 */
static BOOL JustAFunction(
    LPSTR p
)
{
    BOOL anseen = FALSE;
    char c = *p;
    while(TRUE) {
        if(IsAlphaNum(c) || (c == CHATSIGN) || (c == CHDOT)) {
            anseen = TRUE;
            p += 1;
            c = *p;
            continue;
        }
        if((c == CHLPREN) || (c == CHEOS)) {
            break;
        }
        return FALSE;
    }
    if(!anseen)
        return FALSE;

WORD Depth = 0;
    BOOL InQuotes = FALSE;
    while(TRUE) {
        if(c == CHDQUOTE)
            InQuotes = !InQuotes;
        if(c == CHEOS) {
            return TRUE;
        }
        if(!InQuotes) {
            switch(c) {
                case CHLPREN:
                case CHARRAY_BEGIN: {
                    Depth += 1;
                    break;
                }
                case CHRPREN:
```

```
        case CHARRAY_END: {
            Depth -= 1;
            if(Depth == 0) {
                return (p[1] == CHEOS);
            }
            c = *(++p);
        }
    }
}
/*
 * expand the node
 */
static BOOL ExtractFunctionArgument(
    LPSTR pBuf,
    WORD Max,
    WORD Which,
    LPSTR pFormulaText
    )
{
WORD S, E;
if(FindArgumentN(pFormulaText, Which, &S, &E)) {
    StrNCopy(pBuf, Max, pFormulaText + S, E - S);
    return TRUE;
}
return FALSE;
}
/*
 * expand the node
 */
static void ExtractFunctionNameAndParen(
    LPSTR pBuf,
    WORD Max,
    LPSTR p
    )
{
    // initialize the buffer
    *pBuf = CHEOS;
    // we don't go out of our way to verify that the
    // string actually looks like a function
    p = SkipSpaces(p);
    while(*p) {
        StrAppendChr(pBuf, Max, *p);
        if(*p == CHLPREN) return;
        p += 1;
    }
    return;
}
/*
 * expand the node
 */
void FormulaNode::Expand(BOOL ExpandKids)
{
LPFormulaNode pFN;
union ParserReturn result;
BOOL TopLevel = (pOutline->pNodes == this);
// June 21, 1994
// changed expansion algorithm to try two different approaches:
// first, we attempt to expand the outline as a function - in this
// case we don't care if it is syntactically correct or not.
// second, we attempt to expand the expression as a syntactically correct
// subexpression - bs.
if ((!(Type == NodeTypeUnknown) || (Type == NodeTypeCollapsed)) {
    WORD WhichArg = 0;
    WORD ArgBufferSize = StrLen(NodeText.p()) + 1;
    LPSTR ArgBuffer = new char[ArgBufferSize];
    if(ArgBuffer == NULL) return;
    LPFormulaNode pNew;
    if(IsJustAFunction(NodeText.p())) {
        while(ExtractFunctionArgument(ArgBuffer, ArgBufferSize,
                WhichArg, NodeText.p())) {
            pNew = new FormulaNode(ArgBuffer,
                NodeTypeUnknown, pOutline);
            if(pNew == NULL) {
                ThrowErr(eid_MemFull);
            }
            AppendChild(pNew);
            pNew->Expand(TRUE);
            if(!ExpandKids) {
                pNew->Collapse();
```

Copyright © 1994 Borland International

```
                }
                WhichArg += 1;
            }
            if(WhichArg != 0) {
                ExtractFunctionNameAndParen(ArgBuffer, MAXLABEL,
                        NodeText.pl);
                NodeText.Replace(ArgBuffer);
                Type = NodeTypeFunction;
                delete ArgBuffer;
                return;
            }
        }
        delete ArgBuffer;
    }

// second try - assume it's a syntactically correct subexpression
    // deal with this node first:
    switch(Type) {
        case NodeTypeUnknown:
        case NodeTypeCollapsed: {
            if(NodeText.pl) {
                Formula *pF = new Formula();
                if(pF == NULL) {
                    Type = NodeTypeSyntaxError;
                    return;
                }
                LPSTR p = NodeText.pl);
                // ignore '=' as a formula prefix if one is
present:
                if(TopLevel) {
                    if(*p == '=') {
                        p += 1;
                        pOutline->StartsWithEqual =
TRUE;
                    }
                    else {
                        pOutline->StartsWithEqual =
FALSE;
                    }
                }
                result.dword =
                    pF->ParseSubexpression(pOutline->pBase, p);
                if(result.parts.errorsize != 0) {
                    SetGlobErr(NOERR);
                    Type = NodeTypeSyntaxError;
                    delete pF;
                    return;
                }
                // unparse to a FormulaNode
                pOutline->AllowCommentInstallation =
                pFN = pF->UnparseOutline(pOutline->pBase,
TRUE, pOutline);
                // replace current node with this one:
                Replace(pFN);
                // free Temporary node
                delete pFN;
                // delete formula
                delete pF;
            }
        }
    }
    // now deal with the kids - if any:
    // now, collapse all the children:
    for(pFN = pChildren; pFN != NULL; pFN = pFN->pSibling) {
        // collapse the child
        if(ExpandKids) {
            pFN->Expand(ExpandKids);
        }
        else {
            pFN->Collapse();
        }
    }
}
/*----------------------------------------
 * Reexpand the formula - collapse if already expanded, then reexpand
 */
void FormulaNode::ReExpand()
```

15

Copyright © 1994 Borland International

```
{
switch(Type) {
    case NodeTypeBinary:
    case NodeTypeUnary:
    case NodeTypeFunction:
    case NodeTypeParens:
        Collapse();
        Expand();
        break;

case NodeTypeLeaf:
        break;

case NodeTypeUnknown:
    case NodeTypeCollapsed:
        Expand();
        break;

case NodeTypeSyntaxError:
        break;
} }
/*
 * return TRUE if the outline substructure is fully expanded
 */
BOOL FormulaNode::IsFullyExpanded()
{
    // return FALSE if no one has tried to expand us:
    switch(Type) {
        case NodeTypeUnknown:
        case NodeTypeCollapsed:
            return FALSE;
    }
    // return FALSE if any of our children hasn't been expanded
    LPFormulaNode pArg;
    for(pArg = pChildren; pArg != NULL; pArg = pArg->pSibling) {
        if(!pArg->IsFullyExpanded()) return FALSE;
    }
    // otherwise, return TRUE!
    return TRUE;
}
/*
 * fill out a portion of a template
 */
BOOL FormulaNode::TemplateFill(LPSTR pStr, WORD Which, LPAppliedMode pAM)
{
    // look in our text:
    WORD MaxLen = StrLen(NodeText.p()) + StrLen(pStr) + 3;
    LPSTR p = new char [MaxLen];
    if(p == NULL) {
        ThrowErr(eId_MemFull);
    }
    StrCopy(p, MaxLen, NodeText.p());
    if(SubstituteModeParameter(p, MaxLen, pStr, Which, pAM)) {
        NodeText.Replace(p);
        if(pChildren == NULL) {
            Type = NodeTypeUnknown;
            Expand(TRUE);          // show fully nasty expanded
            delete p;
            return TRUE;
        }
    }
    expression
    delete p;

LPFormulaNode pKid;
    for(pKid = pChildren; pKid != NULL; pKid = pKid->pSibling) {
        if(pKid->TemplateFill(pStr, Which, pAM)) {
            return TRUE;
        }
    }
    return FALSE;
}
/*
 * Clean up unused optional arguments
 */
BOOL FormulaNode::TemplateCleanUp()
{
```

16

```
LPSTR p = NodeText.p();
while(*p) {
    if(*p == SPECIAL_SUB_CHAR) {
        return TRUE;
    }
    p += 1;
}

LPFormulaNode pKid;
LPFormulaNode **ppPrev = &pChildren;
for(pKid = pChildren; pKid != NULL; pKid = pKid->pSibling) {
    if(pKid->TemplateCleanUp()) {
        delete pKid;
        *ppPrev = NULL;
        return TRUE;
    }
    ppPrev = &pKid->pSibling;
}
return FALSE;
}
/*
 * Create a formula composer
 */
FormulaOutline::FormulaOutline()
{
    pComment = NULL;
    FormulaChanged = FALSE;
    FollowSize = 0;
    pBase = NULL;
    FirstUndo = TRUE;

pComposerDialog = NULL;
    StartsWithEqual = FALSE;

// no focus yet;
    pFocus = NULL;

if(FormulaOutlineCache == NULL) {
        FormulaOutlineCache = new CacheEntry[FOUTLINE_CACHE_SIZE];
        if(!FormulaOutlineCache) {
            WORD Where;
            for(Where = 0; Where < FOUTLINE_CACHE_SIZE; Where++) {
                FormulaOutlineCache[Where].pFormulaText = NULL;
                FormulaOutlineCache[Where].pOutline = NULL;
            }
        }
    }
SetDirty();
}
/*
 * set pComposerDialog
 */
void FormulaOutline::SetDialog(ComposerDialog *pD)
{
    pComposerDialog = pD;
}
/*
 * reload formula at current base cell (pBase)
 */
BOOL FormulaOutline::LoadFormula(LPSSCellRef pBaseCell, LPSTR pDefault)
{
    char TempExp[MAXLABEL+1];
    FormulaChanged = FALSE;

pBase = new SSCellRef(pBaseCell->nbCell, pBaseCell->nbIdx);
    if(pBase == NULL) {
        ThrowErr(eid_MemFull);
    } if(pDefault) {
        StrCopy(TempExp, MAXLABEL, pDefault);
        FormulaChanged = TRUE;
    }
    else {
        TempExp[0] = '\0';    // in case we can't find a formula
        LPNotebook pNB = GblNBTable.GetNBPtr(pBase->nbIdx);
        if(pNB) {
            LPSSheet pSheet = pNB->GetSheetPtr(pBase->nbCell.sheet);
            if(pSheet) {
```

Copyright © 1994 Borland International

```
        SSCell *pCell = pSheet->GetCellPtr(pBase->nbCell.col,
pBase->nbCell.row);
    if(pCell) {
        LPSSCellInfo pCI = pCell->GetCellInfoPtr();
        if(pCI->GetEtyType() == SSC_LABEL) {
            if(QueryMsg(CompoConvertMessage, FALSE, IDYES) != IDYES) {
                return FALSE;
            }
            else {
                FormulaChanged = TRUE;     // changing to a formula
            }
        }
        if(pCI) {
            pCI->GetEntryStr( pNB, TempExp, TRUE, MAXLABEL);
        } } } }

// attempt to read formula outline from cache instead:
WORD Where;
if(FindCacheEntry(TempExp, pBase, &Where)) {
    pFocus = NULL;                          // default value
    LPCacheEntry pCE = &FormulaOutlineCache[Where];
    if(Read(pCE->pOutline, pCE->OutlineBytes)) {
        LPSTR pC = pCE->pFormulaText +
StrLen(pCE->pFormulaText) -
pCE->CommentLength;
        AllowCommentInstallation = TRUE;
        InstallComment(pC, pCE->CommentLength);
        if(pFocus == NULL) pFocus = pNodes;
        SetDirty();
        return TRUE;
    } } pNodes = new FormulaNode(TempExp, NodeTypeUnknown, this);
pFocus = pNodes;
SetDirty();
if(pNodes == NULL) {
    ThrowErr(eId_MemFull);
}

// expand the top level
    pNodes->Expand(FALSE);
    return TRUE;
}
/*--------------------------------------------------------------
 * store the current formula in the current cell - return FALSE
 * if an error occurred
 */
BOOL FormulaOutline::StoreFormula(LPSTR pF)
{
    if(!UnprotectedCell(pBase)) {
        return FALSE;
    }
    // save this cell in the undo list
    // SSNBRange TempNB(pBase->nbCell, pBase->nbCell);
    // SSRange BaseRange(TempNB, pBase->nbIdx);
    // SaveUndoRange(FirstUndo, &BaseRange,
    pComposerDialog->pCmd->cmdParameter);
    // FirstUndo = FALSE;

bUndefinedOkay = TRUE;
    return InstallValue(pBase, pF, TRUE, iv_general, iv_noretry, FALSE, TRUE) ==
INSTALLVALUE_OK;
    bUndefinedOkay = FALSE;
}
/*--------------------------------------------------------------
 * Destroy a formula composer
 */
FormulaOutline::~FormulaOutline()
{
    if(pBase) delete pBase;
    if(pNodes) delete pNodes;
}
/*--------------------------------------------------------------
 * calculate a line number given a particular node
 * line number is 0 based
 */
WORD FormulaOutline::LineNumber(LPFormulaNode pLookFor)
{
    RebuildLookupTable();
```

18

Copyright © 1994 Borland International

```
    return pLookFor->LineNumber;
}
/*
 * find the outline that corresponds to a line number -
 * return level too
 * line number is 0 based
 */
LPFormulaNode FormulaOutline::FindLine(WORD line, LPWORD pLevel)
{
    RebuildLookupTable();
    LPFormulaNode pWhich = Table[line];
    *pLevel = pWhich->LineLevel;
    return pWhich;
}
/*
 * return the number of lines in the outline
 */
WORD FormulaOutline::GetLineCount()
{
    RebuildLookupTable();
    return LineCount;
}
/*
 * return the text for the entire expression
 */
void FormulaOutline::GetExpression(LPSTR pText, WORD Max)
{
    if(pNodes) {
        LPSTR p = pNodes->GetExpression();
        if(p) {
            StrCopy(pText, Max, p);
        } } }
/*
 * return the text for the expression which currently has focus
 */
void FormulaOutline::GetSubExpression(LPSTR pText, WORD Max)
{
    if(pFocus) {
        LPSTR p = pFocus->GetExpression();
        if(p) {
            StrCopy(pText, Max, p);
        } } }
/*
 * compute the value of a string
 */
void FormulaOutline::EvaluateString(LPSTR EvString, LPSTR pText, WORD Max)
{
    // to fix bug #41372 (actually, a variation on this bug)
    if(EvString[0] == CHEOS) {
        *pText = CHEOS;
        return;
    }

DWORD ret;
    FmlValue fv;

if(EvString) {
        Formula F;
        union {
            DWORD dword;
            struct {
                WORD errorsize;
                FML_FMLSTATE fmlstate;
            } parts;
        } result;

bIgnoreNB = TRUE;
        result.dword = F.ParseNoAtAtArrays(pBase, EvString);
        bIgnoreNB = FALSE;

if(result.parts.errorsize != 0) {   // ignore error, if any
            SetGlobErr(NOERR);
            StrCopy(pText, Max, strERR);
        }
        if(result.parts.fmlstate_arrayfml) {
            StrCopy(pText, Max, CompoArrayResult);
        }
        else {
            (void)F.Eval(*pBase, &fv);
```

19

Copyright © 1994 Borland International

```
        SetGlobErr(NOERR);              // ignore error, if any
        if (((LPreal8)&fv)->isString()) {
                LPSTR pRes = GetStrVal(&fv);
                StrCopy(pText, Max, pRes);
                }
        else {
                Float2Str( &fv.number, pText, Max );
                }
    } } } } }
/*
 * compute the value of the whole formula, return it as a string
 */
void FormulaOutline::GetValue(LPSTR pText, WORD Max)
{
    LPSTR pEvText = NULL;
    if(pNodes) pEvText = pNodes->GetExpression();
    EvaluateString(pEvText, pText, Max);
}
/*
 * compute the value for the expression which currently has focus
 */
void FormulaOutline::GetSubValue(LPSTR pText, WORD Max)
{
    LPSTR pEvText = NULL;
    if(pFocus) pEvText = pFocus->GetExpression();
    EvaluateString(pEvText, pText, Max);
}
/*
 * Change the current sub expression - sets big wheels in motion..
 */
void FormulaOutline::ChangeSubExpression(LPSTR pSE)
{
    if(pFocus) {
        SetDirty();
        FormulaChanged = TRUE;
        pFocus->ChangeExpression(pSE);
        }
}
/*
 * TTIO Outline go to first (physical first)
 * line numbers (unsigned short) are 1 based, 0 is invalid for TTIONext
 */
unsigned short FormulaOutline::TTIOFirst(void)
{
    return 1;
}
/*
 * TTIO Outline advance to next
 * line numbers (unsigned short) are 1 based, 0 is invalid for TTIONext
 */
unsigned short FormulaOutline::TTIONext(unsigned short line)
{
    WORD w = GetLineCount();
    if(line < w) {
        return line+1;
        }
    return 0;
}
/*
 * TTIO Outline go back to previous
 */
unsigned short FormulaOutline::TTIOPrev(unsigned short line)
{
    if(line > 1) {
        return line-1;
        }
    return 0;
}
/*
 * TTIO Outline go to last (physical last)
 */
unsigned short FormulaOutline::TTIOLast(void)
{
    return GetLineCount();
}
/*
 * TTIO Outline return text at a particular line
 */
char *FormulaOutline::TTIOText(
        unsigned short line,          // 1 based line number
        char *buffer,
        int maxChars)
```

Copyright © 1994 Borland International

```
{
if(line > 0) {
    WORD Level;
    LPFormulaNode pFN = FindLine(line - 1, &Level);
    if(pFN) {
        StrCopy(buffer, maxChars, pFN->NodeText.p());
        if((pFN->Type == NodeTypeFunction) || (pFN->Type ==
NodeTypeParens)) {
            StrCat(buffer, maxChars, DotDotDotParen);
        }
        return buffer;
    } }
// else...
return NULL;
}
/*
* TTIO Outline get indentation level
*/
unsigned short FormulaOutline::TTIOIndentation(
    unsigned short line)                                // 1 based line number
{
if(line > 0) {
    WORD Level;
    LPFormulaNode pFN = FindLine(line - 1, &Level);
    if(pFN) {
        return Level;
    } }
// else...
return 0;                                               // NTR what to return here
}
/*
* TTIO Outline return TRUE if there are no children
*/
int FormulaOutline::TTIOIsLeaf(
    unsigned short line)                                // 1 based line number
{
if(line > 0) {
    WORD Level;
    LPFormulaNode pFN = FindLine(line - 1, &Level);
    if(pFN) {
        return (pFN->Type == NodeTypeLeaf);
    } }                                                 // probably should assert instead
// else...
return FALSE;
}
/*
* TTIO Outline get status
*
* currently, only...
*       TTIOCollapsed
*       TTIOFocus
*/
char FormulaOutline::TTIOGetStatus(unsigned short line)
{
unsigned short Level;
if(line > 0) {
    WORD Level;
    LPFormulaNode pFN = FindLine(line - 1, &Level);
    if(pFN) {
        switch(pFN->Type) {
            case NodeTypeCollapsed:
            case NodeTypeUnknown:
            case NodeTypeSyntaxError:
                return TTIOCollapsed;
        }
    }
}
// else...
return 0;
}
/*
* TTIO GetFocus -- Return the line that has focus
*/
unsigned short FormulaOutline::TTIOGetFocus(void)
{
if (pFocus) {
    return LineNumber(pFocus) + 1;
}
return 0;
}
/*
* TTIOHasNextSibling - Check for the presence of a next sibling
```

Copyright © 1994 Borland International

```c
 *
 */
BOOL FormulaOutline::TTIOHasNextSibling(unsigned short line)
{
if (line > 0) {
    WORD Level;
    LPFormulaNode pFN = FindLine(line - 1, &Level);
    if (pFN && pFN->pSibling) {
        return TRUE;
    }
}
return FALSE;
}
/*
 * TTIO Outline get status
 *
 * currently, only...
 *      #define TTIOCollapsed 0x01
 *
 *      never called when the node is a leaf
 *
 */
char FormulaOutline::TTIOGetType(unsigned short line)
{
unsigned short Level;
if(line > 0) {
    WORD Level;
    LPFormulaNode pFN = FindLine(line - 1, &Level);
    if(pFN) {
        switch(pFN->Type) {
            case NodeTypeSyntaxError:
                return OutlineNodeError;
            case NodeTypeLeaf:
            case NodeTypeZero:
                return OutlineNodeLeaf;
            case NodeTypeParens:
            case NodeTypeFunction:
            case NodeTypeUnary:
            case NodeTypeBinary:
                return OutlineNodeOpen;
            case NodeTypeCollapsed:
            case NodeTypeUnknown:
                return OutlineNodeClosed;
        } } }
// else...
return OutlineNodeError;
}
/*
 * TTIO Outline set status
 *
 * currently, only...
 *      #define TTIOCollapsed 0x01
 *
 */
void FormulaOutline::TTIOSetStatus(unsigned short line, char status)
{
if(line > 0) {
    WORD Level;
    LPFormulaNode pFN = FindLine(line - 1, &Level);
    if(pFN) {
        if(status & TTIOFocus) {
            pFocus = pFN;
            pComposerDialog->Upd(UpdAll ^ UpdOutline);
        }
        if(status & TTIOCollapsed) {
            SetDirty();
            pFN->Collapse();
        }
        else {
            SetDirty();
            pFN->Expand();
        }
    }
}
}
/*
 * TTIO Outline - return line number of a node's parent
 */
unsigned short FormulaOutline::TTIONodeParent(unsigned short line)
{
if(line > 0) {
    WORD Level;
```

22

```
LPFormulaNode pFN = FindLine(line - 1, &Level);
if(pFN) {
    if(pFN->pParent)
        return LineNumber(pFN->pParent) + 1;
    }
}
// else return something else
return 0;
}
/*
 * convert a text string to a CellReference
 * if notebook name is not included, then notebook index is returned as 0
 * returns TRUE if successfull
 */
BOOL FormulaOutline::ParseRangeReference(
    LPSTR pText,        // text to be parsed
    LPSSRange pRange
    )
{
    if(*pText != CHEOS) {
        LocalSSRef ThisRef;
        if(StringToRef(pText, ThisRef.Loc))) {
            SSCellRef ThisCellRef;
            if(RefToRange(ThisRef.Loc(), pRange) == NOERR) {
                // convert to absolute
                (void)pRange->Absolute(pBase);
                return TRUE;
            }
        }
    }
    return FALSE;
}
/*
 * Push a cell onto the follow stack
 */
void FormulaOutline::PushFollow(LPSSCellRef pCR)
{
    if(FollowSize >= MAX_FOLLOW) {
        // shift stack down
        WORD Where;
        for(Where = 0; Where < (MAX_FOLLOW - 1); Where++) {
            FollowStack[Where] = FollowStack[Where + 1];
        }
        FollowSize -= 1;
    }
    FollowStack[FollowSize] = *pCR;
    FollowSize += 1;
}
/*
 * pop a cell off the follow stack
 */
BOOL FormulaOutline::PopFollow(LPSSCellRef pCR)
{
    if(FollowSize > 0) {
        FollowSize -= 1;
        *pCR = FollowStack[FollowSize];
        return TRUE;
    }
    return FALSE;
}
/*
 * Convert a string to a single range
 * return TRUE if the conversion is successful
 */
static void AppendCellToString(LPSSCellRef pCellRef, WORD Max, LPSTR pBuf)
{
    SSCellRef BaseCell;
    GetCurrCell(&BaseCell);
    SSCellRef TempCellRef(pCellRef->nbCell, pCellRef->nbIdx);
    TempCellRef.Relative(&BaseCell, SSR_TLRELBITS + SSR_BRRELBITS);
    WORD Len = StrLen(pBuf);
    pBuf = TempCellRef.String(&BaseCell, &pBuf[Len], Max-Len);
    *pBuf = CHEOS;
}
/*
 * return a formatted version of the follow stack for
 * display on the title bar
 */
void FormulaOutline::GetFollowString(LPSTR pFS, WORD Max)
{
    WORD Which, Start;
    StrCopy(pFS, Max, CompoName);
```

Copyright © 1994 Borland International

```
StrAppendChr(pFS, Max, ' ');
StrAppendChr(pFS, Max, ' ');
StrAppendChr(pFS, Max, ' ');
if (FollowSize == 0) {
    if(pBase) {
        AppendCellToString(pBase, Max, pFS);
    }
}
else {
    // Always append the first
    AppendCellToString(&FollowStack[0], Max, pFS);
    StrAppendChr(pFS, Max, CHMINUS);              // NTR: Define a Symbol
    StrAppendChr(pFS, Max, '>');
    if (FollowSize > 4) {
        // only show 4. Indicate more to the left with ...
        StrAppendChr(pFS, Max, '.');
        StrAppendChr(pFS, Max, '.');
        StrAppendChr(pFS, Max, '.');
        Start = FollowSize - 3;
    }
    else {
        Start = 1;
    }
    for(Which = Start; Which < FollowSize; Which++) {
        AppendCellToString(&FollowStack[Which], Max, pFS);
        StrAppendChr(pFS, Max, CHMINUS);          // NTR: Define a Symbol
        StrAppendChr(pFS, Max, '>');
    }
    if(pBase) {
        AppendCellToString(pBase, Max, pFS);
    }
}
/*
 * attempt to 'close' the current cell.  Store changes, if any
 */
BOOL FormulaOutline::CloseCell()
{
    char FormulaText[MAXLABEL + 2];
    LPSTR pF = &FormulaText[1];

GetExpression(pF, MAXLABEL);
    // prefix the formula with a '+' if it needs one
    if(StrChr(strValuePrefix, *pF) == NULL) {
        pF -= 1;
        *pF = '+';
    };

WriteToCache(pF);                             // write to outline cache if(FormulaChanged) {
        if(StoreFormula(pF) {
            return TRUE;
        }
        ErrorMsg (GetGlobErr ());
        return FALSE;
    }
    return TRUE;
}
/*
 * Inspect entry point for Expand
 * We assume SetStatus has already been called to set the current line
 */
void FormulaOutline::UserExpand()
{
    if(pFocus) {
        SetDirty();
        pFocus->Expand();
    }
    pComposerDialog->Upd(UpdAll);
}
/*
 * Inspect entry point for ExpandFull
 */
void FormulaOutline::UserExpandFull()
{
    if(pFocus) {
        SetDirty();
        pFocus->Expand(TRUE);
    }
}
```

Copyright © 1994 Borland International

```
pComposerDialog->Upd(UpdAll);
}
/*
* Inspect entry point for Collapse
*/
void FormulaOutline::UserCollapse()
{
if(pFocus) {
    SetDirty();
    pFocus->Collapse();
    }
pComposerDialog->Upd(UpdAll);
}
/*
* GotoSelection : Bring window to top and set the selected range
*
* Use this instead of CuiSetSelectionList() as we need to do this operation
* in a covert (ie behind cdesk's back) manner as to allow pointmode to work
* I hope it works, because the alternatives are not pretty - Bret
*
* Current possibly incorrect behavior:
*   if old win is maximized it does not maximize new
*   if a minimized window is restored we will not re-minimize upon exit
*/
static BOOL GotoSelection(SSRange * pRange)
{
NBWin * pNBWin = GetNBWinForIdx(pRange->nbIdx, TRUE);
if (pNBWin) {
    if (pNBWin I = PROGRAM.cFrame->pCD->GetTopChild(TRUE))
        {
        if (IsIconic(pNBWin->hWnd))
            ShowWindow(pNBWin->hWnd,
                SW_SHOWNOACTIVATE);
        pNBWin->wdwBringToTop();
        }
    pNBWin->wdwPaintTitleBar(PROGRAM.cFrame->pCD->getCurMDIWin() == pNBWin);
    }

SSCellRef cr(pRange->nbRange.tl, pRange->nbIdx);
```

```
SelList sl;

// NTR: delete ssrgsel ?
sl.AddSelObj(new SSRgSel(pRange));
pNBWin->SelectReplaceList( &sl, &cr, nbf_MinMove );
return TRUE;
} return FALSE;
}
/*
* Inspect entry point for Follow
*/
void FormulaOutline::UserFollow()
{
if(!CloseCell()) {
    return;
    } char RefText[MAXSTRL];
GetSubExpression(RefText, MAXSTRL);

SSRange r;
if(ParseRangeReference(RefText, &r)) {
    if (NoteBookIsOpen (r))       // 'goto' this new cell
        {
#if 0
        if(CuiSetSelectionList(&r, TRUE)) {
#else
        if(GotoSelection(&r))
#endif
            {
            SSCellRef Temp(r.nbRange.tl, r.nbIdx);
            SSCellRef Save(pBase->nbCell, pBase->nbIdx);   // save old base cell
            PushFollow(&Save);
            pComposerDialog->SetBaseCell(&Temp);
            if(LoadFormula()) {
                pComposerDialog->UpdateCaption();
                pComposerDialog->Upd(UpdAll);
                }
            }
        else {
```

Copyright © 1994 Borland International    // MJW

```
                        PopFollow(pBase);
error loading formula. restore pBase
} } } } }
/*
 * Check for an open notebook
 */
BOOL FormulaOutline::NoteBookIsOpen (SSRange r)
{
    LPNotebook pNB = GblNBTable.GetNBPtr (r.nbIdx);
    return IsOpenedNB (pNB);
}
/*
 * Inspect entry point for Back
 */
void FormulaOutline::UserBack()
{
SSCellRef Temp;
if(PopFollow(&Temp)) {
    if(!CloseCell()) {
        return;
    }
    SSNBRange TempNBRange(Temp.nbCell, Temp.nbCell);
    SSRange TempRange(TempNBRange, Temp.nbIdx);
#if 0
    if(CUISetSelectionList(&TempRange, TRUE)) {
#else
    if(GotoSelection(&TempRange)) {
#endif
        pComposerDialog->SetBaseCell(&Temp);
        (void)LoadFormula(&Temp);
        pComposerDialog->UpdateCaption();
    } }
pComposerDialog->Upd(UpdAll);
}
/*
 * Inspect entry point for ReplaceWithValue
 */
void FormulaOutline::UserReplaceWithValue()
{
char ValueBuffer[MAXLABEL + 1];
    GetSubValue(ValueBuffer, MAXLABEL);
    ChangeSubExpression(ValueBuffer);
    pComposerDialog->Upd(UpdAll);
}
/*
 * Inspect entry point for ReplaceWithFunction
 */
void FormulaOutline::UserReplaceWithFunction()
{
char Buffer[MAXPROPSTR];
BOOL Ret = pComposerDialog->pCmd->FunctionPicker(Buffer, MAXPROPSTR);
if(Ret) {
    switch(pFocus->Type) {
        case NodeTypeUnknown:
        case NodeTypeSyntaxError:
        case NodeTypeCollapsed:
        case NodeTypeLeaf:
        case NodeTypeZero:
            ChangeSubExpression(Buffer);
            break;
        case NodeTypeFunction:
            FormulaChanged = TRUE;
            SetDirty();
            pFocus->ChangeFunction(Buffer);
            break;
    }
}
pComposerDialog->Upd(UpdAll);
}
/*
 * Convert a string to a single range
 * return TRUE if the conversion is successful
 */
void FormulaOutline::RangeToString(LPSSRange pRange, WORD Max, LPSTR pBuf)
{
if(pRange->nbRange.IsACell()) {
    SSCellRef TempCell(pRange->nbRange.tl, pRange->nbIdx);
    TempCell.Relative(pBase, SSR_TLRELBITS + SSR_BRRELBITS);
    pBuf = TempCell.String(pBase, pBuf, Max);
}
```

26

Copyright © 1994 Borland International

```
else {
    SSRange TempRange(pRange->nbRange, pRange->nbIdx);
    TempRange.Relative(pBase, SSR_TLRELBITS + SSR_BRRELBITS);
    pBuf = TempRange.String(pBase, pBuf, Max);
    }
*pBuf = CHEOS;
}
/*----------------------------------------------------------------
 * Inspect entry point for ReplaceWithCellReference
 */
void FormulaOutline::UserReplaceWithCellReference()
{
SSNBRange BaseNBRange(pBase->nbCell, pBase->nbCell);
SSRange BaseRange(BaseNBRange, pBase->nbIdx);
LPSSRange pDefault = &BaseRange;

// attempt to convert the current selection to a range
// and use it as the default range if appropriate:
char RefText[MAXSTRL];
GetSubExpression(RefText, MAXSTRL);
SSRange CurrentRange;
if(ParseRangeReference(RefText, &CurrentRange)) {
    if(NoteBookIsOpen (CurrentRange)) {
        pDefault = &CurrentRange;
        }
    }

SSRange MyRange(pDefault->nbRange, pDefault->nbIdx);
SSRange BackRange(pDefault->nbRange, pDefault->nbIdx);

SList RangeNameList(8);
GetRangeNames(pBase->nbIdx, &RangeNameList, TRUE);

if(GetRange(CompoPointPrompt, &MyRange, &BackRange, &RangeNameList,
            FALSE, FALSE, FALSE, FALSE ) ==
CUIEnter) {
    char Buffer[MAXLABEL + 1];
    RangeToString(&MyRange, MAXLABEL, Buffer);
    ChangeSubExpression(Buffer);
    pComposerDialog->UpdIUpdAll);
    }
}
/*----------------------------------------------------------------
 * Inspect entry point for ReplaceWithNameReference
 */
void FormulaOutline::UserReplaceWithNameReference()
{
char Buffer[MAXLABEL + 1];
WORD keyExit;
if(GetBlockName(Buffer, &keyExit) == CUIEnter) {
    ChangeSubExpression(Buffer);
    pComposerDialog->UpdIUpdAll);
    }
}
/*----------------------------------------------------------------
 * dispatch to a command
 */
void FormulaOutline::Dispatch(WORD Which)
{
switch(Which) {
    case ComposerCommandExpand:
        UserExpand();
        break;
    case ComposerCommandFull:
        UserExpandFull();
        break;
    case ComposerCommandCollapse:
        UserCollapse();
        break;
    case ComposerCommandFollow:
        UserFollow();
        break;
    case ComposerCommandBack:
        UserBack();
        break;
    case ComposerCommandValue:
        UserReplaceWithValue();
        break;
    case ComposerCommandFunction:
        UserReplaceWithFunction();
        break;
    case ComposerCommandPoint:
```

Copyright © 1994 Borland International

```
                UserReplaceWithCellReference();
                break;
        case ComposerCommandName:
                UserReplaceWithNameReferenceCell();
                break;
        } }
        /*
        * dispatch to a command
        */
BOOL FormulaOutline::AskDispatch(WORD Which)
{
        if(pFocus) switch(Which) {
        case ComposerCommandExpand:
                // deal with this node first:
                switch(pFocus->Type) {
                        case NodeTypeUnknown:
                        case NodeTypeCollapsed:
                                return TRUE;
                }
                return FALSE;
        case ComposerCommandFull:
                return lpFocus->IsFullyExpanded();
        case ComposerCommandCollapse: {
                switch(pFocus->Type) {
                        case NodeTypeBinary:
                        case NodeTypeUnary:
                        case NodeTypeFunction:
                        case NodeTypeParens:
                                return TRUE;
                }
                return FALSE;
        }
        case ComposerCommandFollow: {
                char RefText[MAXSTRL];
                GetSubExpression(RefText, MAXSTRL);
                SSRange r;
                if(ParseRangeReference(RefText, &r)) {
                        if (NoteBookIsOpen (r)) {
                                return TRUE;
                        } }
                return FALSE;
        }
        case ComposerCommandBack:
                return FollowSize > 0;
        case ComposerCommandValue: {
                char OldValueBuffer[MAXLABEL + 1];
                char NewValueBuffer[MAXLABEL + 1];
                GetSubExpression(OldValueBuffer, MAXLABEL);
                GetSubValue(NewValueBuffer, MAXLABEL);
                if(StrCmp(OldValueBuffer, NewValueBuffer) == 0) {
                        return FALSE;
                }
                else {
                        return TRUE;
                } }
        case ComposerCommandFunction:
                switch(pFocus->Type) {
                        case NodeTypeUnknown:
                        case NodeTypeSyntaxError:
                        case NodeTypeCollapsed:
                        case NodeTypeLeaf:
                        case NodeTypeFunction:
                        case NodeTypeZero:
                                return TRUE;
                }
                return FALSE;
        case ComposerCommandPoint:
                return (pBase != NULL);
        case ComposerCommandName: {
                if(pBase) {
                        SList * pMyList = new SList(8);
                        if(pMyList == NULL) {
                                ThrowErr(eid_MemFull);
```

Copyright © 1994 Borland International

```
        }
        GetRangeNames(pBase->nbldx, pMyList, FALSE);
        WORD nNames = pMyList->numElements();
        delete pMyList;
        return nNames > 0;
    }
    return FALSE;
}
/*
* write the outline data structure to a character buffer
*/
WORD FormulaOutline::Write(LPSTR pBuf, WORD Max)
{
    WORD Where = 0;
    if(pNodes->Write(pBuf, Max, &Where)) {
        return Where;
    }
    else {
        return 0;
    }
}
/*
* write the outline data structure to a character buffer
*/
BOOL FormulaOutline::Read(LPSTR pBuf, WORD Size)
{
    // nuke the existing structure
    // pNodes->Nuke();
    // delete pNodes;

SetDirty();

// have to make the root node by hand (it won't have siblings)
    WORD Where = 0;
    pNodes = new FormulaNode(pBuf, Size, &Where, this);
    if(pNodes == NULL) {
        ThrowErr(eid_MemFull);
    }
    if(!pNodes->ReadChildren(pBuf, Size, &Where)) {
        // pNodes->Nuke();
        // delete pNodes;
        pNodes = new FormulaNode("", NodeTypeUnknown, this);
        if(pNodes == NULL) {
            ThrowErr(eid_MemFull);
        }
    }
    return TRUE;
}
/*
* Compare a formula string in a cell to a formula string in a cache
*/
BOOL FormulaOutline::CompareCacheStrings(LPSTR pCe, LPSTR pCa)
{
    if((*pCe == '=') || (*pCe == '+')) {
        pCe += 1;
    }
    if((*pCa == '=') || (*pCa == '+')) {
        pCa += 1;
    }
    return StrICmp(pCe, pCa) == 0;
}
/*
* find a cache entry
*/
BOOL FormulaOutline::FindCacheEntry(
        LPSTR pText,
        LPSSCellRef pFooCell,
        WORD *p\Where
        )
{
    WORD Where;
    for(Where = 0; Where < FOUTLINE_CACHE_SIZE; Where++) {
        LPCacheEntry pLook = &FormulaOutlineCache[Where];
        LPSTR pLookStr = pLook->pFormulaText;
        if(pLookStr) {
            if(CompareCacheStrings(pLookStr, pText) {
                if(pLook->BaseCell == *pFooCell) {
```

Copyright © 1994 Borland International

```
            *pWhere = Where;
            return TRUE;
          } } } }
  return FALSE;
}
/*
 * delete a cache entry
 */
void FormulaOutline::DeleteCacheEntry(
     WORD WhichEntry
     )
{
  LPCacheEntry pLook = &FormulaOutlineCache[WhichEntry];
  if(pLook->pFormulaText) {
        delete pLook->pFormulaText;
        pLook->pFormulaText = NULL;
  }
  if(pLook->pOutline) {
        delete pLook->pOutline;
        pLook->pOutline = NULL;
  }
}
/*
 * allocate a cache entry
 */
WORD FormulaOutline::AllocateCacheEntry()
{
  WORD Where;
  LPCacheEntry pLook;

// increment ages
  for(Where = 0; Where < FOUTLINE_CACHE_SIZE; Where++) {
     pLook = &FormulaOutlineCache[Where];
     pLook->Age += 1;
  }

// look for an unallocated entry:
  for(Where = 0; Where < FOUTLINE_CACHE_SIZE; Where++) {
     pLook = &FormulaOutlineCache[Where];
     if(pLook->pFormulaText == NULL) {
        return Where;
     }
  }

// look for the oldest entry
  WORD MaxAge = 0;
  WORD Oldest = 0;
  for(Where = 0; Where < FOUTLINE_CACHE_SIZE; Where++) {
     pLook = &FormulaOutlineCache[Where];
     if(pLook->Age > MaxAge) {
        Oldest = Where;
        MaxAge = pLook->Age;
     }
  }
  return Oldest;
}
/*
 * write a cache entry
 */
void FormulaOutline::WriteCacheEntry(
     LPCacheEntry pCE
     )
{
  WORD Where = AllocateCacheEntry();
  LPCacheEntry pNew = &FormulaOutlineCache[Where];
  *pNew = *pCE;
}
/*
 * return TRUE if the outline contains an error node
 */
BOOL FormulaOutline::ContainsError()
{
  ScanParams sp;
  for(ScanInit(&sp); !sp.Done; ScanNext(&sp)) {
     if(sp.pNode->Type == NodeTypeSyntaxError) {
        return TRUE;
     }
  }
  return FALSE;
}
/*
 * write the current outline, formula text and base cell to the cache
 */
```

30

Copyright © 1994 Borland International

```
void FormulaOutline::WriteToCache(LPSTR pF)
{
   if(!ContainsError()) {
      WORD nToAllocate = StrLen(pF) + 1;
      char buf[MAXLABEL + 1];
      CacheEntry ce;
      ce.Age = 0;
      ce.CommentLength = pComment ? StrLen(pComment) : 0;
      // store the formula text in a cache entry
      ce.pFormulaText = new char [nToAllocate];
      if(ce.pFormulaText) {
         StrCopy(ce.pFormulaText, MAXLABEL, pF);

// store the base cell in the cache entry
         ce.BaseCell = *pBase;

// now, finish filling in the cache entry:
         ce.OutlineBytes = Write(buf, MAXLABEL);
         if(ce.OutlineBytes != 0) {
            ce.pOutline = new char [ce.OutlineBytes];
            MemCpy(ce.pOutline, buf, ce.OutlineBytes);
         }

// search for a cache entry matching this one
         // and delete it if we find one
         WORD WhichEntry;
         if(FindCacheEntry(ce.pFormulaText, &ce.BaseCell,
                            &WhichEntry) {
            DeleteCacheEntry(WhichEntry);
         }

// now, write this new cache entry:
         WriteCacheEntry(&ce);
      }
   }
}
/*
 * Create a new subtree based on a template (mode string)
 */
void FormulaOutline::Template(LPSTR pStr)
{
   PrepareExpressionForSubstitution(pStr);
   if(pFocus) {
      FormulaChanged = TRUE;
      SetDirty();
      pFocus->ChangeExpression(pStr);
   }
}
/*
 * fill out a portion of a template
 */
void FormulaOutline::TemplateFill(LPSTR pStr, WORD Which, LPAppliedMode pAM)
{
   if(pFocus) {
      if(pFocus->TemplateFill(pStr, Which, pAM)) {
         return;
      }
      else {
         LPFormulaNode pNew = new FormulaNode(pStr,
                                NodeTypeUnknown, this);
         if(pNew == NULL) {
            ThrowErr(eid_MemFull);
         }
         pFocus->AppendChild(pNew);
         pNew->Expand(TRUE);
         SetDirty();
      }
   }
}
/*
 * finish filling out a template
 */
void FormulaOutline::TemplateCleanUp()
{
   if(pFocus) {
      (void)pFocus->TemplateCleanUp();
      SetDirty();
   }
}
/*
 * Install a comment into the outline
 */
void FormulaOutline::InstallComment(LPSTR pChars, WORD Length)
{
   if(AllowCommentInstallation) {
```

31

Copyright © 1994 Borland International

```
    if(pComment != NULL) {
        delete pComment;
        pComment = NULL;
    }
    if(Length) {
        pComment = new char [Length + 1];
        if(pComment) {
            StrCopy(pComment, Length + 1, pChars);
        }
    }
}
/*
* remember that the outline is dirty
*/
void FormulaOutline::SetDirty()
{
    Dirty = TRUE;
}
/*
* remember that the outline is dirty
*/
void FormulaOutline::RebuildLookupTable()
{
    if(!Dirty)
        return;

Dirty = FALSE;

ScanParams sp;
    WORD Line = 0;
    for(ScanInit(&sp); !sp.Done; ScanNext(&sp)) {
        Table[Line] = sp.pNode;
        sp.pNode->LineNumber = Line;
        sp.pNode->LineLevel = sp.Level;
        Line += 1;
    }

LineCount = Line;
}
/*
* initialize scanning of the outline data structure
*/
void FormulaOutline::ScanInit(LPScanParams pSP)
{
    pSP->pNode = pNodes;
    pSP->Level = 0;
    pSP->Done = FALSE;
}
/*
* scan the outline data structure
*/
void FormulaOutline::ScanNext(LPScanParams pSP)
{
    if(pSP->pNode->pChildren) {
        pSP->Level += 1;
        pSP->pNode = pSP->pNode->pChildren;
    }
    else {
LookAgain:
        if(pSP->pNode->pSibling) {
            pSP->pNode = pSP->pNode->pSibling;
        }
        else {
            if(pSP->pNode->pParent) {
                pSP->pNode = pSP->pNode->pParent;
                pSP->Level -= 1;
                goto LookAgain;
            }
            else {
                pSP->Done = TRUE;
            }
        }
    }
}
```

What is claimed is:

1. In an electronic spreadsheet system for modeling user-specified information in a data model comprising a plurality of formulas entered by a user, each of said formulas evaluating to a result, a method for assisting the user with correctly entering formulas, the method comprising:

(a) storing syntax rules specifying valid syntax for formulas;

(b) receiving user input for entering a formula;

(c) parsing said user input, based on said syntax rules, into at least one formula node, said at least one node storing a subexpression of the formula;

(d) creating, based on said at least one formula node, an outline view of the formula; and (e) displaying said outline view to the user.

2. The method of claim 1, wherein step (e) comprises:

for each of said at least one formula node, displaying its subexpression as a node on a hierarchical outline.

3. The method of claim 1, further comprising:

receiving a user request for selecting one of said nodes; and displaying in an edit field the subexpression stored by the selected node.

4. The method of claim 3, further comprising:

receiving user input at the edit field for modifying the subexpression; and updating the outline view of the formula based on the modified subexpression.

5. The method of claim 3, further comprising:

computing a result for the subexpression; and displaying said computed result to the user.

6. The method of claim 5, further comprising:

if a result cannot be correctly computed, displaying an error value as the result for the subexpression.

7. The method of claim 6, wherein said error value is a spreadsheet "ERR" value.

8. The method of claim 1, wherein step (c) includes:

tokenizing said user input into a sequence of opcodes; and scanning said sequence of opcodes for building a tree of formula nodes.

9. The method of claim 1, wherein step (c) includes:

displaying as a node of the outline view each subexpression of said at least one formula node; and displaying a folder icon next to some of the nodes of the ouline for indicating to the user that the nodes can be expanded and collapsed.

10. A data processing system for creating syntactically-correct formulas from data entered by a user, each of said formulas evaluating to a result, the system comprising:

a computer having a processor and a memory;

means for storing in said memory information specifying valid formulas;

input means for receiving user input for entering a particular formula comprising a plurality of subexpressions;

means for parsing said input into a plurality of formula nodes for representing said plurality of subexpressions, based on said rules, each formula node storing a subexpression of said particular formula; and means for presenting to the user said subexpressions in outline format, by presenting an outline comprising said plurality of formula nodes.

11. A data processing system for creating syntactically-correct formulas from data entered by a user, each of said formulas evaluating to a result, the system comprising:

a computer having a processor and a memory;

means for storing in said memory information specifying valid formulas;

input means for receiving user input for entering said formulas;

means for parsing said input into a plurality of subexpressions, based on said rules, wherein said means for parsing comprises:

means for compiling said user input into a sequence of opcodes, and means for creating a tree of formula nodes based on said sequence of opcodes; and means for presenting to the user said subexpressions in outline format.

12. The system of claim 11, wherein said sequence of opcodes comprises a binary representation of the formula, said binary representation being stored in Reverse-Polish Notation (RPN) format.

13. The system of claim 11, wherein said means for creating a tree of formula nodes includes:

a stack memory for storing on a stack a first formula node which is dependent on a second formula node; and means for removing said first formula node from the stack when opcode corresponding to said second formula node is encountered in the sequence of opcodes, said means storing a reference from said first node to said second node.

14. A data processing system for creating syntactically-correct formulas from data entered by a user, each of said formulas evaluating to a result, the system comprising:

a computer having a processor and a memory;

means for storing in said memory information specifying valid formulas, wherein said means for storing information specifying valid formulas includes:

means for storing templates for built-in functions, and means for comparing user input against said templates, for identifying a particular one of the built-in functions;

input means for receiving user input for entering said formulas;

means for parsing said input into a plurality of subexpressions, based on said rules; and means for presenting to the user said subexpressions in outline format.

15. The system of claim 14, wherein some of the built-in functions have more than one template, so that the system can identify particular forms of user input common to a given built-in function.

16. A data processing system for creating syntactically-correct formulas from data entered by a user, each of said formulas evaluating to a result, the system comprising:

a computer having a processor and a memory;

means for storing in said memory information specifying valid formulas;

input means for receiving user input for entering said formulas;

means for parsing said input into a plurality of subexpressions, based on said rules; and means for presenting to the user said subexpressions in outline format, wherein said means for presenting said subexpressions in outline format includes:

means for displaying said subexpressions in collapsible outline format, so that level of detail displayed can be varied by the user.

17. The system of claim 16, further comprising:

input means for selecting a particular subexpression from the outline format; and edit means for displaying the particular subexpression in an edit field, so that it can be edited in isolation from other subexpressions of the formula.

18. The system of claim 16, further comprising:

input means for selecting a particular subexpression of the outline format for expansion into individual tokens which comprise the subexpression.

19. The system of claim 16, further comprising:

input means for selecting a particular subexpression from the outline format;

means for computing a result for said particular subexpression; and means for indicating to the user an error in the particular subexpression, if a correct result cannot be computed.

20. An information system for entering syntactically-correct subexpressions from data entered by a user, the subexpressions combining to form a formula, the system comprising:

a computer having a processor and a memory;

means for storing in said memory information specifying valid subexpressions;

input means for receiving user input for entering subexpressions for a particular formula being created;

means for parsing said user input into a plurality of formula nodes for representing said plurality of subexpressions, based on said information specifying valid subexpressions, each formula node storing a subexpression of said particular formula; and means for presenting the formula being created as a formula outline comprising said plurality of formula nodes.

21. The system of claim 20, wherein said input means for receiving user input includes:

an input device;

a display device for displaying an edit field; and means for updating the formula outline based on input received at said edit field which affects a particular subexpression, by updating the formula node which stores the particular subexpression.

22. The system of claim 21, wherein said input device comprises a keyboard device.

23. The system of claim 21, wherein said input device comprises a pointing device.

24. An information system for entering syntactically-correct subexpressions from data entered by a user, the subexpressions combining to form a formula, the system comprising:

a computer having a processor and a memory;

means for storing in said memory information specifying valid subexpressions;

input means for receiving user input for entering subexpressions for a formula being created, wherein said input means for receiving user input includes:

an input device, a display device for displaying an edit field, and means for updating the formula outline based on input received at said edit field; and means for presenting the formula being created as a formula outline;

wherein said means for updating the formula outline includes:

means for deleting a portion of the formula outline corresponding to a subexpression which has been deleted from the formula in response to said input received at said edit field;

means for parsing said input received at said edit field; and means for updating the formula outline to display an outline representation illustrating a new subexpression which has been added to the formula, based on the parsed input.

25. An information system for entering syntactically-correct subexpressions from data entered by a user, the subexpressions combining to form a formula, the system comprising:

a computer having a processor and a memory;

means for storing in said memory information specifying valid subexpressions:

input means for receiving user input for entering subexpressions for a formula being created;

means for presenting the formula being created as a formula outline;

pattern matching means for comparing user input against function templates stored in the memory, so that a particular function can be identified in the user input; and means for displaying function input fields for an identified function, said input fields for receiving user input for specific parameters of the identified function.

26. The system of claim 25, wherein each said template comprises a function name, information describing parameters to the function, and help information about the function.

27. The system of claim 26, wherein said information describing parameters to the function includes information designed to minimize common user input errors.

28. The system of claim 20, further comprising:

means for isolating a particular subexpression from the formula outline, said means for isolating operating in response to user input for selecting with an input device a formula node from the formula outline which stores said particular subexpression; and means for displaying said isolated particular subexpression in an edit field, so that the user can edit the subexpression apart from other subexpressions which comprise the formula.

29. An information system for entering syntactically-correct subexpressions from data entered by a user, the subexpressions combining to form a formula, the system comprising:

a computer having a processor and a memory;

means for storing in said memory information specifying valid subexpressions;

input means for receiving user input for entering subexpressions for a formula being created;

means for presenting the formula being created as a formula outline;

error detection means for detecting an error in a particular subexpression which has been entered for a formula; and error indication means for indicating on the formula outline the particular subexpression which is in error.

30. In a system for processing formulas entered by a user, the formulas including built-in functions having parameters for receiving user-supplied information, an improved method for entering a formula comprising:

(a) storing for each function information describing correct syntax for entering functions, wherein said information describing a correct syntax includes for each function a function name and information describing parameters for the function;

(b) entering a formula having at least one function;

(c) receiving user input for selecting a particular function in said entered formula;

(d) identifying said selected function by comparing it against said information describing a correct syntax for entering the function;

(e) if said selected function is identified in step (d), displaying input fields for parameters of said selected function;

(f) receiving user input at said input fields; and (g) completing entry for the formula by substituting the user input of step (f) into said selected function;

wherein said information describing parameters for the function comprise a template for that function, and wherein at least some of the functions have multiple templates, so that common input formats for a given function can be detected automatically by the system.

31. In a system for processing formulas entered by a user, the formulas including built-in functions having parameters for receiving user-supplied information, an improved method for entering a formula comprising:

(a) storing for each function information describing correct syntax for entering functions;

(b) entering a formula having at least one function;

(c) receiving user input selecting a particular function in said entered formula;

(d) identifying said selected function by comparing it against said information describing a correct syntax for entering the function;

(e) if said selected function is identified in step (d), displaying input fields for parameters of said selected function;

(f) receiving user input at said input fields;

(g) completing entry for the formula by substituting the user input of step (f) into said selected function;

(h) displaying a list of range names proximate the input fields, each of said range names specifying a particular set of information cells which can serve as input to a function;

(i) receiving a request from the user for selecting one of the range names from the list while editing an input field; and (j) copying the selected range name into the input field being edited.

32. In a system for processing formulas entered by a user, the formulas including built-in functions having parameters for receiving user-supplied information, an improved method for entering a formula comprising:

(a) storing for each function information describing correct syntax for entering functions;

(b) entering a formula having at least one function;

(c) receiving user input selecting a particular function in said entered formula;

(d) identifying said selected function by comparing it against said information describing a correct syntax for entering the function;

(e) if said selected function is identified in step (d), displaying input fields for parameters of said selected function;

(f) receiving user input at said input fields;

(g) completing entry for the formula by substituting the user input of step (f) into said selected function;

(h) performing a substring match between the selected function and said information describing a correct syntax for entering the function;

(i) assigning a score to each match, based on correlation between substrings; and (j) determining a correct syntax based on a match having a highest score.

33. In an electronic spreadsheet system for modeling user-specified information in a data model, said data model comprising information cells storing user-supplied data and user-supplied formulas operative on said data, some of said cells having user-supplied range names, a method for assisting the user with correctly entering formulas, the method comprising:

(a) receiving user input for entering a formula;

(b) displaying said user input in an edit field;

(c) displaying a drop-down list of range names proximate said edit field;

(d) receiving a user request selecting a particular range name from said list of range names; and (e) completing entry for the formula by copying the particular range name into said formula being entered.

34. The method of claim 33, wherein step (d) comprises:

positioning a screen cursor over a desired range name; and generating a signal from an input device while said cursor is positioned over the desired range name.

* * * * *